United States Patent
Goto et al.

(10) Patent No.: US 6,430,147 B1
(45) Date of Patent: Aug. 6, 2002

(54) DISK CARTRIDGE AND ADAPTER

(75) Inventors: Yoshikazu Goto, Hirakata; Yukio Nishino, Ikoma-gun; Kuniko Nakata, Kadoma; Shigeto Ueno, Toyonaka; Hitoshi Higaki, Takaishi; Ichirou Kawamura, Osaka, all of (JP)

(73) Assignee: Matushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/373,290

(22) Filed: Aug. 12, 1999

Related U.S. Application Data

(62) Division of application No. 09/269,352, filed as application No. PCT/JP98/05667 on Dec. 15, 1998, now Pat. No. 6,172,962.

(30) Foreign Application Priority Data

| Dec. 16, 1997 | (JP) | 9-346053 |
| Dec. 17, 1997 | (JP) | 9-347472 |
| Dec. 17, 1997 | (JP) | 9-348328 |
| Feb. 25, 1998 | (JP) | 10-43227 |
| Jun. 12, 1998 | (JP) | 10-164902 |

(51) Int. Cl.⁷ .............................................. G11B 23/03
(52) U.S. Cl. ...................................... 369/289; 369/291
(58) Field of Search ............................... 360/133, 132, 360/2; 369/291, 77.2, 289; 206/308.3; 216/307.1

(56) References Cited

U.S. PATENT DOCUMENTS

| 4,159,817 A | | 7/1979 | Torrington | 274/98 |
|---|---|---|---|---|
| 4,272,083 A | | 6/1981 | Tottington | 369/77 |
| 4,463,850 A | * | 8/1984 | Gorog | 206/309 |
| 4,724,962 A | | 2/1988 | Watanabe et al. | 206/444 |
| 4,849,958 A | * | 7/1989 | Douwes et al. | 369/77.2 |
| 4,899,238 A | | 2/1990 | Inoue et al. | 360/99.06 |
| 4,905,217 A | | 2/1990 | King et al. | 369/291 |
| 4,928,271 A | * | 5/1990 | Verhagen | 369/292 |
| 4,964,005 A | | 10/1990 | Uzuki | 360/99.06 |
| 4,980,883 A | * | 12/1990 | Mutou et al. | 369/291 |
| 5,048,008 A | | 9/1991 | Haruna | 369/291 |
| 5,062,100 A | * | 10/1991 | Verhoeven et al. | 369/291 |
| 5,140,489 A | | 8/1992 | Barnard | 360/133 |
| 5,331,627 A | | 7/1994 | Childers et al. | 369/291 |
| 5,530,691 A | | 6/1996 | Fujisawa | 369/291 |
| 5,715,233 A | * | 2/1998 | Yoshida et al. | 369/289 |
| 5,724,332 A | | 3/1998 | Ogusu | 369/77.2 |
| 5,923,630 A | * | 7/1999 | Yoshida et al. | 369/77.2 |
| 6,018,433 A | | 1/2000 | Thayne et al. | 360/69 |
| 6,044,058 A | * | 3/2000 | Miyazaki et al. | 369/291 |
| 6,172,962 B1 | * | 1/2001 | Goto et al. | 369/291 |
| 6,205,115 B1 | * | 3/2001 | Ikebe et al. | 369/291 |

FOREIGN PATENT DOCUMENTS

| EP | 0 219 980 | 9/1986 |
| EP | 0 267 644 | 10/1987 |
| EP | 0 308 012 | 9/1988 |
| EP | 308 012 | 3/1989 |
| EP | 0 308 012 | 3/1989 |
| EP | 0 332 214 | 3/1989 |
| EP | 0 335 461 | 3/1989 |

(List continued on next page.)

*Primary Examiner*—William Klimowicz
*Assistant Examiner*—Tianjie Chen
(74) *Attorney, Agent, or Firm*—Merchant & Gould PC

(57) ABSTRACT

A disk cartridge of the present invention comprises a case body (101) having a disk-storage portion and an opening/closing cover (201) having a pair of disk holding members (202) that hold a disk (10) in its inplane direction. The accommodated disk (10) is loaded together with the opening/closing cover (201) into an adapter having compatibility with a large disk cartridge. Thus, information can be, for example, reproduced from the disk (10) in a drive unit designed for a large disk cartridge via the adapter. Moreover, a series of operations can be conducted without touching the disk directly.

23 Claims, 70 Drawing Sheets

FOREIGN PATENT DOCUMENTS

| | | |
|---|---|---|
| EP | 0 407 140 | 7/1990 |
| EP | 0 617 425 | 3/1994 |
| EP | 0 794 532 | 9/1996 |
| EP | 0 768 664 | 10/1996 |
| EP | 0 795 866 | 3/1997 |
| EP | 0 838 819 | 10/1997 |
| EP | 0 843 310 | 11/1997 |
| EP | 0 921 526 | 3/1998 |
| EP | 0 902 428 | 10/1998 |
| EP | 959 471 | 11/1999 |
| GB | 2 272 990 | 11/1993 |
| JP | 63/271969 | 10/1988 |
| JP | 01/004668 | 1/1989 |
| JP | 2-121174 | 5/1990 |
| JP | 2-123582 | 5/1990 |
| JP | 2-152682 | 6/1990 |
| JP | 7-114782 | 5/1995 |
| JP | 9-297977 | 11/1997 |
| JP | 10-144031 | 5/1998 |
| JP | 2000-11578 | 1/2000 |
| WO | WO98/50918 | 5/1998 |

\* cited by examiner (a)

(b)

DISK CARTRIDGE AND ADAPTER

This application is a Divisional of application Ser. No. 09/269,352, filed Mar. 25, 1999, which is a 371 of PCT/JP98/05667, filed Dec. 15, 1998, now U.S. Pat. No. 6,172, 962B1, which application(s) are incorporated herein by reference.

FIELD OF THE INVENTION

First Invention

The present first invention relates to a disk cartridge accommodating a disc-shaped recording medium and to a cartridge adapter capable of recording information on and reproducing information from the disc-shaped recording medium accommodated in the disk cartridge using a drive unit designed for a larger disk cartridge than the disk cartridge.

Second Invention

The present second invention relates to a disk cartridge for double-sided recording that accommodates a disk as a disc-like recording and reproducing medium such as an optical disk. Particularly, the present second invention is suitable for providing a smaller and thinner disk cartridge.

Third Invention

The present third invention relates to a disk cartridge accommodating a disk for recording and reproducing information. Particularly, the present third invention relates to a disk cartridge comprising a shutter for exposing a disk surface in order to drive a disk for recording, reproduction and the like.

BACKGROUND OF THE INVENTION

First Invention

With the rapid progress of computer techniques, disc-shaped recording media have been used widely as means for recording, reproducing, and erasing various information. With respect to disc-shaped recording media, there are a plurality of standards that differ in recording density, size, recording and reproducing system, and the like respectively. Corresponding to the respective disc-shaped recording media according to the plurality of standards, there are also a plurality of drive units for recording information on and reproducing and erasing information from the respective disc-shaped recording media.

Under such circumstances, it is convenient for users when disc-shaped recording media according to a plurality of standards can be driven for recording, reproducing, and erasing information with one drive unit. Therefore, various systems have been proposed.

As a method for driving a plurality of disc-shaped recording media having different sizes for recording, reproducing, and erasing information with one drive unit, for example, a method in which a user inserts a bare disc-shaped recording medium into an adapter and then sets it into a drive unit has been proposed. Partially, this method has come into practical use for driving both a compact disc (CD) with a diameter of 12 cm and a single compact disc with a diameter of 8 cm.

As a method of recording information on and reproducing and erasing information from disc-shaped recording media with various sizes accommodated in cartridges with one drive unit, for example, as shown in FIG. 51, a method of recording, reproducing, and erasing information in a drive unit 1921 designed for a large disk cartridge by inserting a small-size disk cartridge 1901 into a cartridge adapter 1911 having the same size and the same external shape as those of the large disk cartridge has been studied (for instance, Publication of Japanese Unexamined Patent Application Hei 2-121174). In FIG. 51, numerals 1912 and 1913 indicate a head access opening and a shutter of the cartridge adapter 1911, respectively. The head access opening 1912 and the shutter 1913 are formed so as to have the same shapes and sizes as those of the cartridge for a large disc. Numerals 1902 and 1903 indicate a head access opening and a shutter of the small disk cartridge 1901, respectively. A numeral 1914 indicates an insertion portion into which the small disk cartridge 1901 is inserted, and a numeral 1924 indicates an insertion portion into which the large disk cartridge is inserted.

However, the method in which a user inserts a bare disc-shaped recording medium into an adapter and sets it into a drive unit is not suitable for the use that requires high reliability and high durability, since the user can put dirt and scratches on the disc-shaped recording medium easily.

Further, in the method of recording, reproducing, and erasing information in a drive unit designed for a large disk cartridge by inserting a small disk cartridge into a cartridge adapter having the same size and the same external shape as those of the large disk cartridge as shown in FIG. 51, for example, the following problems occur. The small disk cartridge is different from the large cartridge in shapes and sizes of the head access opening and the shutter that are provided in a disk cartridge, and in the opening/closing mechanisms of the shutter. Therefore, some problems occur, for example, a head of the drive unit comes into contact with the shutter 1903 and the exterior members around the head access opening 1902 of the small disk cartridge 1901 accommodated in the cartridge adapter 1911, and the mechanism for opening and closing the shutter is complicated. As a result, in disk cartridges with different sizes, it is difficult to record, reproduce, and erase information without any problems using such an adapter. Considering such use, it has been necessary to review the design of the drive unit itself in some cases.

Second Invention

Recently, disk drive units for optical disks or the like used as recording units of computers have been required to be smaller and thinner, as portable computers have become widespread. At the same time, disks for recording and reproduction have become smaller, and therefore the disks with high recording-density have been required. Such a disk is accommodated in a cartridge case so that fingerprints and dust, which are obstacles for recording and reproducing information at a high density, do not adhere to the disk.

An example of a conventional double-sided disk cartridge and a mechanism of opening and closing its shutter will be explained with reference to the drawings as follows.

FIG. 61 is a perspective structural view of a disk cartridge in conformity with the International Standard for a 130-mm optical disk. FIG. 62 is a perspective view showing a state in which a shutter of the disk cartridge shown in FIG. 61 is opened. FIG. 63 is a partially enlarged perspective view showing a configuration around the shutter of the disk cartridge shown in FIG. 61. In this conventional disk cartridge, an optical disk 2104 is accommodated in a case body 2103 having a substantially rectangular shape formed of an upper half 2101 and a lower half 2102. An opening 2105 into which a disk motor and an optical pickup can be inserted is provided in the upper and lower surfaces of the case body 2103. A U-shaped shutter 2106 for covering and uncovering the opening 2105 is slidably provided on the case body 2103. The shutter 2106 is formed in a manner such that a metal plate is folded in two. The shutter 2106 comprises two opposed shielding plates 2107 and a connecting plate 2108 interconnecting the two opposed shielding plates. The connecting plate 2108 fixes and holds a thin and long slider 2109 so as to cover the slider 2109. A receiving hole 2110 into which a shutter opener P1 is inserted is provided to a tail portion of the connecting plate 2108. The shutter opener P1 is provided in a loading mechanism of a recording and reproducing unit. Corresponding to the receiving hole 2110, a receiving hole 2111 is provided in the slider 2109. A roller R1 of the shutter opener P1 shown in FIG. 63 is engaged with the receiving hole 2111. A torsion coil spring 2114 is housed in the left side of the leading end of the case body 2103. This torsion coil spring 2114 urges the shutter 2106 in the direction in which the shutter 2106 covers the opening 2105.

At an end of the slider 2109, a slope 2115 is provided so that a roller R2 of a shutter opener P2 provided in the loading mechanism of the recording and reproducing unit as shown in FIG. 63 can pass over the slope 2115 smoothly.

When this conventional disk cartridge is inserted into the recording and reproducing unit, one shutter opener P1 is inserted into the receiving hole 2110 of the shutter 2106 and the receiving hole 2111 of the slider 2109. When the shutter opener P1 moves the shutter 2106 to the left to uncover the opening 2105 as shown in FIG. 62, the other shutter opener P2 crosses over and along the slope 2115 of the slider 2109. As a result, the shutter openers P1 and P2 cross each other.

Guide grooves 2116 for preventing erroneous insertion of a cartridge are formed at the leading ends of both side faces of the case body 2103. When the disk cartridge is inserted into a unit normally, auto-loading hooks (not shown in the figures) that are a loading means of the recording and reproducing unit are inserted into the guide grooves 2116, thus pulling the disk cartridge into the unit. On the other hand, when the disk cartridge is inserted into the recording and reproducing unit from its back, the auto-loading hooks come into contact with the back corners of the case body 2103. Therefore, the disk cartridge cannot be inserted any further, thus preventing the erroneous insertion. Consequently, damage to an optical head that is an information writing and reading means of the recording and reproducing unit and other mechanisms can be avoided.

At the rear of the both side faces of the case body 2103, grooves 2117 for engaging with a chucking (cramping) mechanism (not show in the figures) of a changer unit are formed. As widely known, one of a plurality of disk cartridges accommodated in a changer unit is selected and the chucking mechanism engages with grooves 2117 of the selected disk cartridge to hold and load it, thus enabling automatic selection and automatic recording/reproduction.

However, there have been the following problems in the double-sided disk cartridge having the above-mentioned conventional structure.

During the operation of opening and closing a shutter, the rollers at the ends of two shutter openers cross each other on the connecting plate 2108. Therefore, when a space is provided in order to avoid the contact between the two rollers, it is necessary to increase the thickness of the cartridge, which, as a result, goes against the trend to a thinner unit. Further, in order to obtain a thin unit, there is a cartridge in which the front-end center of the case body 2103 is formed of a bridge portion that is recessed from the two case faces so as to allow an optical head (not shown in the figure) of the unit and a cramp mechanism (not shown in the figure) for the disk to pass through. However, since such a bridge portion is further thinner than the cartridge, the rollers of the shutter openers cannot come into contact with the thinner bridge portion. Even if the rollers can come into contact with the bridge portion, the rollers are in contact with the bridge portion merely slightly. Consequently, in view of reliability, it has been difficult to apply such a cartridge to the double-sided disk cartridge.

Next, a conventional disk cartridge has a configuration in which one of the shutter openers (the shutter opener P2 in FIG. 63) shifts from the front end of the case body 2103 to the connecting plate 2108 of the shutter 2106. In the conventional disk cartridge, consideration is given to a smooth shift by providing the slope 2115 to the slider 2109. However, there has been a problem in that design errors and the like cause difference in level and therefore shift load resistance increases during the shift, resulting in bad operational feeling.

Since guide grooves 2116 for preventing erroneous insertion are provided at the leading ends of the both side faces of the case body, the space inside the case body becomes smaller. Therefore, the space in which the torsion coil spring 2114 that provides force to the shutter 2106 is moved and the moving distance of the slider 2109 are smaller and shorter than those in the case where no guide groove 2116 is provided. On the other hand, when the space required for the movement of the torsion coil spring 2114 is provided, the disk cartridge becomes bigger. Thus, it is not suitable for obtaining a smaller disk cartridge.

Further, since grooves 2117 for a changer unit are provided at the rear of the both side faces of the case body 2103, there is a possibility of damaging the peripheral surface of the disk 2104 through the contact with edges of the grooves 2117 during ejection of the disk 2104, when the disk 2104 is applied to a cartridge in which the disk 2104 is ejected from the back of the case body 2103. In order to avoid this, it is necessary to make the disk cartridge bigger so as to have an extra space at least for the grooves 2117, resulting in a bigger disk cartridge.

Thus, the configuration of the conventional double-sided disk cartridge does not enable the disk cartridge to be smaller and thinner. Therefore, there has been a problem in that it is difficult to obtain a smaller drive unit.

Third Invention

Recently, in view of large recording capacity, excellence in information search, easy handling, and the like, disks of disc-shaped recording media and disk recording and reproducing units that drive the disks have received much attention.

Such a disk is accommodated in a cartridge with a shutter so that the cartridge prevents a recording surface of the disk from being damaged or from being touched easily and keeps the recording surface away from dirt.

A configuration of a conventional disk cartridge will be explained with reference to the drawing as follows.

FIG. 68 shows plan views showing a structure of a conventional disk cartridge. FIG. 68(A) and (B) show the conventional disk cartridge with its shutter being closed and being opened, respectively.

In FIG. 68, a numeral 3101 indicates a cartridge body, which is made of synthetic resin. The cartridge body 3101 accommodates a disk 3103 of a recording medium rotatably. A numeral 3101a indicates an opening provided on both sides of the cartridge body 3101. The openings 3101a are used for exposing surfaces of the disk 3103 so that light can be irradiated onto the disk 3103 across its inner and outer peripheries for recording and reproduction. The cartridge body 3101 shown in FIG. 68 is provided so that a center hole is completely exposed through the openings 3101a, since it is necessary that a disk recording and reproducing unit holds the center hole to rotate the disk 3103. A numeral 3102 indicates a shutter that is formed of a thin plate made of metal such as aluminum, or a synthetic resin plate. The shutter 3102 is maintained by the cartridge body 3101 slidably so as to cover the openings 3101a completely to shield the disk 3103 or so as to uncover the openings 3101a to expose the disk 3103.

The operation of such a conventional disk cartridge will be explained.

When the cartridge body 3101 having the shutter 3102 is loaded in a disk recording and reproducing unit, a concave part 3102a provided in the shutter 3102 engages with an opener lever OL of the disk recording and reproducing unit as shown in FIG. 68(A) and the shutter 3102 slides to the right (in the direction indicated with an arrow O in FIG. 68). Thus, the openings 3101a are uncovered. On the other hand, when the cartridge body 3101 is drawn out from the recording and reproducing unit, the shutter 3102 slides to the left (in the direction indicated with an arrow S in FIG. 68) by a shutter return spring 3104 inside the cartridge as shown in FIG. 68(B) to return to the initial position. Thus, the shutter covers the openings 3101a and thus the disk surfaces are not exposed. The cartridge body 3101 has the above-mentioned configuration.

As shown in FIG. 68(B), the conventional disk cartridge had a configuration in which the shutter 3102 that has been moved to the side is not positioned outside the cartridge body 3101 beyond its peripheral end when the shutter 3102 is opened to expose the openings 3101a completely.

That is to say, as shown in FIG. 70, the conventional disk cartridge had a configuration in which L3=L2>L1≧L0 is satisfied, wherein with a closed shutter, L represents the width of the disk cartridge (cartridge body) in the sliding direction of the shutter, L0 represents the width of the opening, L1 is the width of the shutter, L2 is the distance between the leading end of the shutter in its sliding direction and the peripheral end of the cartridge body that is nearer to the above-mentioned leading end (the width of a region where the shutter is positioned when being moved to the side), and L3 represents the distance between the rear end of the shutter in its sliding direction and the peripheral end of the cartridge body that is nearer to the above-mentioned rear end (generally L3=L2). In this case, the width L of the whole cartridge had to be set to satisfy L3+L1+L2>3×L1 inevitably.

However, in the above-mentioned conventional disk cartridge, when the openings 3101a become larger, the shutter 3102 covering the openings 3101a also becomes larger. At the same time, the required space for positioning the shutter when the shutter is moved to the side becomes larger. Consequently, there has been a problem in that the cartridge itself comes to have a large size.

Especially, as shown in FIG. 69, in a disk cartridge for a small-diameter disk 3003 in which only its capacity is reduced by decreasing the disk diameter without changing its recording and reproducing system and drive system and in which its small size, light weight, and portability are considered as important, the size of an opening 3111a, especially its width in the sliding direction is fixed. Therefore, the width of a shutter 3112 and the width of the region where the shutter 3112 is positioned when being moved to the side are increased. As a result, only the cartridge size is larger than needed for the small-diameter disk 3003, which has been a disadvantage.

SUMMARY OF THE INVENTION

First Invention

The present first invention aims to solve the above-mentioned conventional problems. It is an object of the present first invention to provide a disk cartridge and an adapter. The disk cartridge and the adapter can secure reliability of information and durability of a disk by enabling that information is recorded on and reproduced and erased from a disc-shaped recording medium accommodated in a disk cartridge in a drive unit designed for a disk cartridge having a larger size than that of the disk cartridge via an adapter. At the same time great modification in a drive unit design is not required, and the disc-shaped recording medium is loaded to the adapter without being touched directly.

The present first invention employs the following configuration in order to attain the above-mentioned object.

A disk cartridge of the first present invention comprises a case body having an opening for ejecting a disk and a disk-storage portion provided continuously to the opening, and an opening/closing cover having a pair of disk holding members that hold the disk. The opening/closing cover is accommodated in the disk-storage portion in a withdrawal condition. When the opening/closing cover is withdrawn from the disk-storage portion, the pair of the disk holding members maintain the disk in its inplane direction.

According to the disk cartridge with the above-mentioned configuration, information can be recorded, reproduced, and erased by loading the disk cartridge to a drive unit designed for a disk cartridge having compatibility with the disk cartridge without any modification. At the same time, by providing a predetermined adapter as an intermediate, information can be recorded, reproduced, and erased even in a drive unit designed for a larger disk cartridge than the disk cartridge with the above-mentioned configuration. Furthermore, great design modification in the drive unit designed for a larger disk cartridge is not required, and the reliability of the information and the durability of the disk can be secured, since a user does not touch the disc-shaped recording medium directly.

The adapter of the present first invention comprises: an insertion portion into or from which a disk cartridge can be loaded or ejected; a first unlocking means that unlocks a first locking means that fixes and holds the opening/closing cover of the disk cartridge to the case body when the disk cartridge is inserted to a predetermined position in the insertion portion; an opening/closing-cover holding means that retains the opening/closing cover in a state in which the first locking means has been unlocked and holds the opening/closing cover at the predetermined position in the insertion portion after the case body is drawn out from the insertion portion; and a means for releasing the opening/closing-cover holding means that allows the opening/closing cover to be withdrawn from the insertion portion by releasing the opening/closing-cover holding means.

According to the adapter having the above-mentioned configuration, information can be recorded on and reproduced and erased from a smaller size disk in a drive unit designed for a larger disk cartridge having compatibility with the adapter described above. Moreover, great design modification in the drive unit designed for a larger disk cartridge is not required, and a user does not touch the disc-shaped recording medium directly, thus securing the reliability of information and the durability of the disk.

Second Invention

It is an object of the present second invention to provide a disk cartridge for double-sided recording and reproduction with a smaller and thinner size so as to obtain a small and thin drive unit.

In order to attain the above-mentioned object, the disk cartridge of the present second invention has the following configuration.

A disk cartridge according to a first configuration of the present second invention is a double-sided disk cartridge that can be used reversibly.

The disk cartridge comprises a case body and a U-shaped shutter. The case body comprises a disk-storage portion for accommodating a disk inside the disk cartridge and openings formed on two case faces opposing the disk. The U-shaped shutter comprises two shielding plates that cover and uncover the two openings and a connecting portion. The connecting portion interconnects the two shielding plates and is positioned so as to face the front end of the case body. The U-shaped shutter is guided movably along the front end of the case body. The shutter has an engagement portion formed continuously to the two shielding plates so as to cross the connecting portion. The engagement portion is capable of engaging with one of two shutter openers provided in a unit when the disk cartridge is loaded into the unit. A guide portion is provided at the front end of the case body and guides the shutter by coming into contact with the other shutter opener when the one shutter opener engages with the engagement portion to open and close the shutter. The engagement portion and the guide portion are arranged so that a region where the engagement portion is moved and the guide portion do not overlap each other. According to the first configuration, the disk cartridge can be formed so that rollers of the two shutter openers do not cross each other during the opening/closing operation of the shutter. Therefore, while the disk cartridge enables a smooth opening/closing operation, at the same time the cartridge can be made thin without decreasing the size of the disk-storage portion in which the disk is stored. This also enables the size and thickness of a drive unit to be decreased.

In the first configuration, it is preferable that the disk cartridge has a bridge portion that is recessed from the two case faces at the front-end side of the openings of the case body and the engagement portion is positioned movably along the front end of the case body including the bridge portion. According to such a preferable configuration, the thickness of a recording and reproducing unit can be decreased by forming the unit so that an optical head of the unit and a cramp mechanism of a disk pass over the bridge portion region that is recessed from the case faces.

In the first configuration, it is preferable that a notch is provided to the connecting portion, an engagement portion capable of engaging with the notch is formed in the guide portion, and the guide portion is at substantially the same level as that of the surface of the connecting portion or projects from the surface. According to such a preferable configuration, the shutter openers are guided only on the guide portion including the engagement portion, and therefore the difference in level in the region where the shutter openers are guided is avoided. Consequently, the shutter openers can be moved smoothly and moving load resistance does not increase, thus obtaining excellent operational feeling.

A disk cartridge according to a second configuration of the present second invention is a double-sided disk cartridge that can be used reversibly. The disk cartridge comprises a case body and a U-shaped shutter. The case body comprises a disk-storage portion for accommodating a disk inside the disk cartridge and openings formed in two case faces opposing the disk. The U-shaped shutter comprises two shielding plates that cover and uncover the two openings, and a connecting portion. The connecting portion interconnects the two shielding plates and is positioned so as to face the front end of the case body. The U-shaped shutter is guided movably along the front end of the case body. The shutter has an engagement portion formed continuously to the two shielding plates so as to cross the connecting portion. The engagement portion is capable of engaging with one of two shutter openers provided in a unit when the disk cartridge is loaded into the unit. The disk cartridge has a second guide portion capable of coming into contact with the shutter openers that is provided at the rear end side of the case body and a retaining portion that is formed continuously to the second guide portion and that retains the shutter openers. The second guide portion and the retaining portion are provided within the-moving range of the shutter opener. According to such a second configuration, in the case of erroneous insertion of the disk cartridge into a drive unit, the shutter openers come into contact with and are guided by the second guide portion to be retained by the retaining portion, thus regulating the insertion of the cartridge. Therefore, guide grooves for preventing erroneous insertion that are formed at the ends of both sides of a conventional case body can be omitted. Thus, the space where a torsion coil spring providing force to the shutter moves and the moving distance of a slider can be increased compared to those in the case where the guide grooves are provided. As a result, a smaller cartridge can be obtained.

In the second configuration, it is preferable that a pair of retaining portions are arranged symmetrically with respect to the center line of the case body. According to such a preferable configuration, erroneous insertion can be regulated by the shutter openers regardless of the side of the disk cartridge, and the bias of the load that is applied to only one of the two shutter openers at the time of the regulation can be avoided.

In the second configuration, it is preferable that the retaining portion has a hook-shaped part formed in a hook shape when it is seen from the case face side. According to such a preferable configuration, the hook-shaped part can engage with a chucking mechanism of a changer unit. Consequently, conventional grooves at the rear of the both sides of the case body can be omitted. As a result, a smaller disk cartridge can be obtained. Further, when such a disk cartridge is applied to a cartridge in which a disk is ejected from the back face of the case body, the damage to the disk caused by the contact of the peripheral side surface of the disk with edges of the grooves when the disk is ejected is avoided.

In addition, in the first and second configurations, it is preferable to form an opening/closing cover for ejecting a disk at the rear end of the case body. According to such a configuration, a disk can be ejected.

Third Invention

The present third invention aims to solve the above-mentioned problems. It is an object of the present third invention to provide disk cartridges having respective sizes conforming to disks having large and small diameters.

In order to attain the above-mentioned object, the disk cartridge of the present third invention is formed without increasing the width of a region where a shutter is positioned after being moved to the side, thus preventing the cartridge size from being increased.

The disk cartridge of the present third invention comprises a disk, a substantially rectangular cartridge body and a shutter. The disk is a disc-shaped recording medium. The cartridge body accommodates the disk rotatably and has an opening for exposing the disk. The shutter is slidably held along one side of the cartridge body and covers at least the opening completely. The opening is formed so as to be positioned substantially perpendicular toward one side of the periphery of the cartridge body from substantially the center of the disk with a predetermined width. In the disk cartridge of the present third invention, $L0 \geq L2$ is satisfied, wherein L0 indicates the width of the opening in a sliding direction of the shutter and L2 indicates the distance between the leading end of the shutter in its sliding direction and the peripheral end of the cartridge body that is nearer to the above-mentioned leading end when the shutter is closed. According to such a configuration, the width of the region where the shutter is positioned when being moved to the side is designed so as to be the same as or narrower than the width L0 of the opening. Therefore, when the disk cartridge accommodates a small-diameter disk, a small disk cartridge corresponding to the disk size can be obtained.

In the above-mentioned configuration, it is preferable that the disk cartridge accommodates a disk having the same recording and reproducing system as that of and a different outer diameter from that of a disk of a disc-shaped recording medium that is rotatably accommodated in an arbitrary disk having an opening for exposing the disk accommodated therein, and the disk cartridge has substantially the same opening width as that of the arbitrary disk cartridge. According to such a preferable configuration, a small disk cartridge corresponding to the size of an accommodated disk can be obtained while having a required opening size.

In the above-mentioned configuration, the cartridge can be designed so that at least a part of the shutter is positioned outside the cartridge body beyond its peripheral end when the shutter slides and the opening is completely uncovered. According to such a configuration, since the cartridge can have a size corresponding to the size of the accommodated disk regardless of the opening width, a disk cartridge having a small size in its width direction can be provided.

Furthermore, in the above-mentioned configuration, the shutter can be formed of shutter members divided into at least two parts substantially perpendicularly to the sliding direction. The shutter members divided into at least two parts can be formed so that each part slides in the same direction and is positioned one upon another, thus exposing the opening. Further, the shutter can be formed of a first shutter member and a second shutter member that are formed by dividing the shutter into two parts substantially perpendicularly to its sliding direction. The first shutter member and the second shutter member also can be formed so as to slide in the different direction from each other. According to these configurations, not only the disk can be accommodated without increasing the size of the cartridge body in its width direction, but also the shutter is not positioned outside the cartridge beyond its peripheral end even when the opening is in an uncovered state where the shutter is opened.

BRIEF DESCRIPTION OF THE DRAWINGS

FIGS. 4(*a*) and (*b*) are a plan view and a side view showing the same, respectively.

FIG. 6(*a*) shows the same in a locked state, and FIG. 6(*b*) shows the same in an unlocked state.

FIG. 20(a) is a partial cross-sectional view taken on a plane that is perpendicular to a disk surface and passes through the center of a third unlocking projection 607. FIG. 20(b) is a cross-sectional view taken on line I—I in the arrow direction of FIG. 20(a). FIG. 20(c) is a cross-sectional view taken on line II—II in the arrow direction of FIG. 20(a).

FIG. 37(a) shows the same in a locked state, and FIG. 37(b) shows the same in an unlocked state.

FIG. 48(a) is a schematic perspective view showing a state before an unlocking operation. FIG. 48(b) is a plan view showing the state before the unlocking operation. FIG. 48(*c*) is a plan view showing a state during the unlocking operation.

FIG. 54(*a*) shows a state before the disk cartridge comes into contact with the shutter opener. FIG. 54(*b*) shows a state at the moment the disk cartridge comes into contact with the shutter opener. FIG. 54(*c*) shows a state during opening of the shutter. FIG. 54(*d*) shows a state when the shutter is opened completely.

FIG. 56(*a*) shows a state before the shutter opener comes into contact with the cartridge. FIG. 56(*b*) shows a state in which the shutter opener is in contact with the cartridge. FIG. 56(*c*) shows a state in which the shutter opener engages with a retaining portion.

FIGS. 57(*a*) and (*b*) show a state before the chucking and a state in which the chucking mechanism is operated, respectively.

BEST EMBODIMENTS FOR ENABLING THE INVENTION

First Invention

A disk cartridge and an adapter of the present first invention will be explained with reference to the drawings as follows.

First Embodiment

Figure 1:
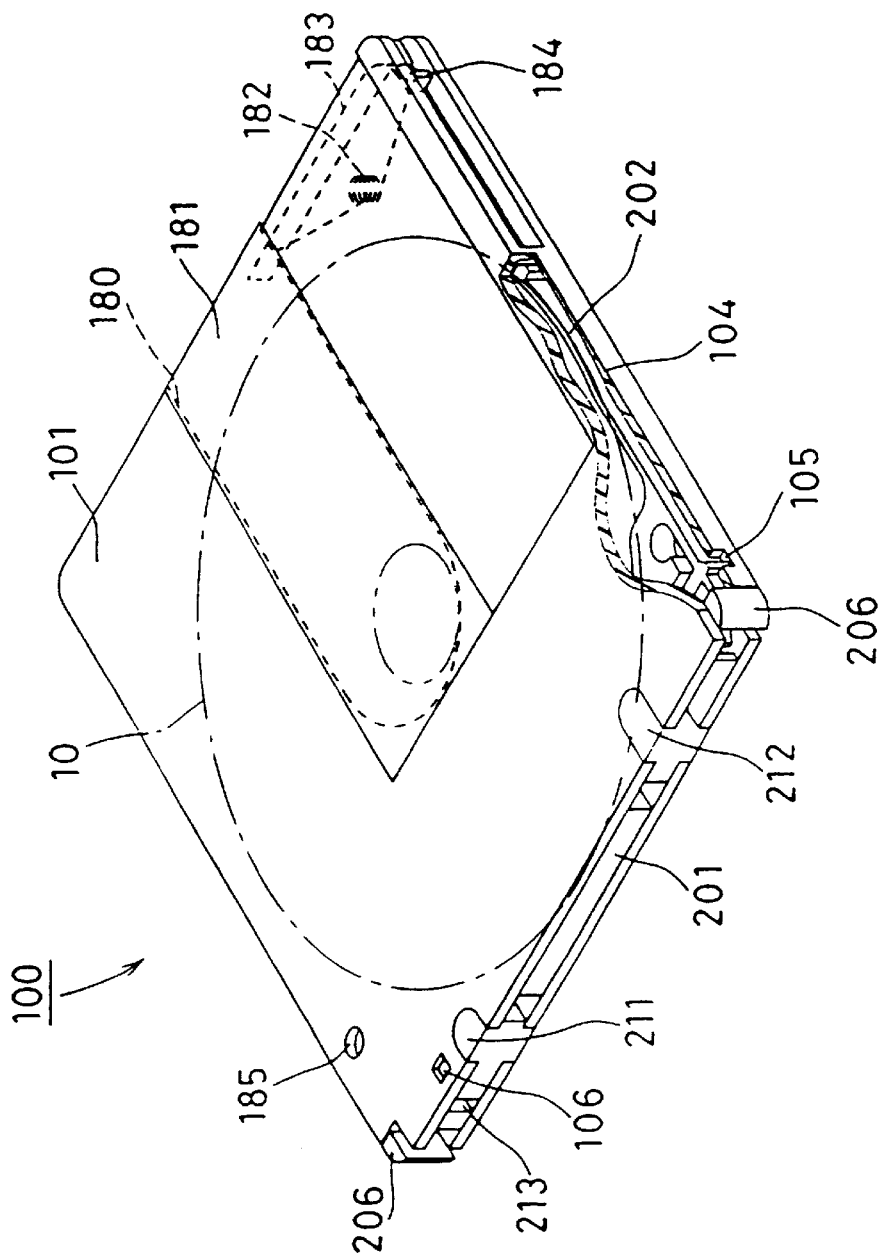
FIG. 1 is a schematic perspective view showing the appearance of an example of a disk cartridge according to a first embodiment of the present first invention.
Figure 2:
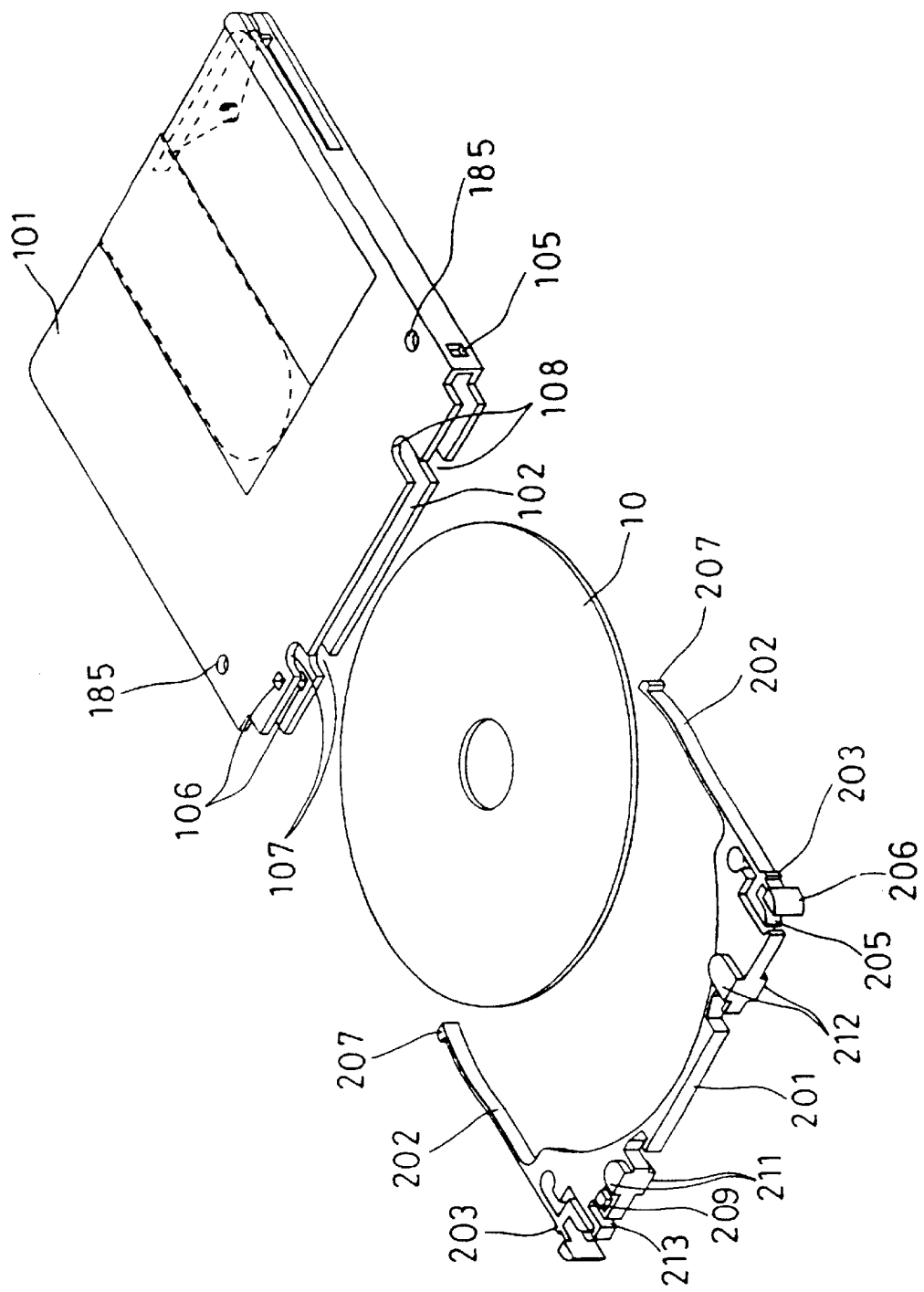
FIG. 2 is an exploded perspective view showing schematic shapes of the main components of the disk cartridge shown in FIG. 1.
Figure 3:
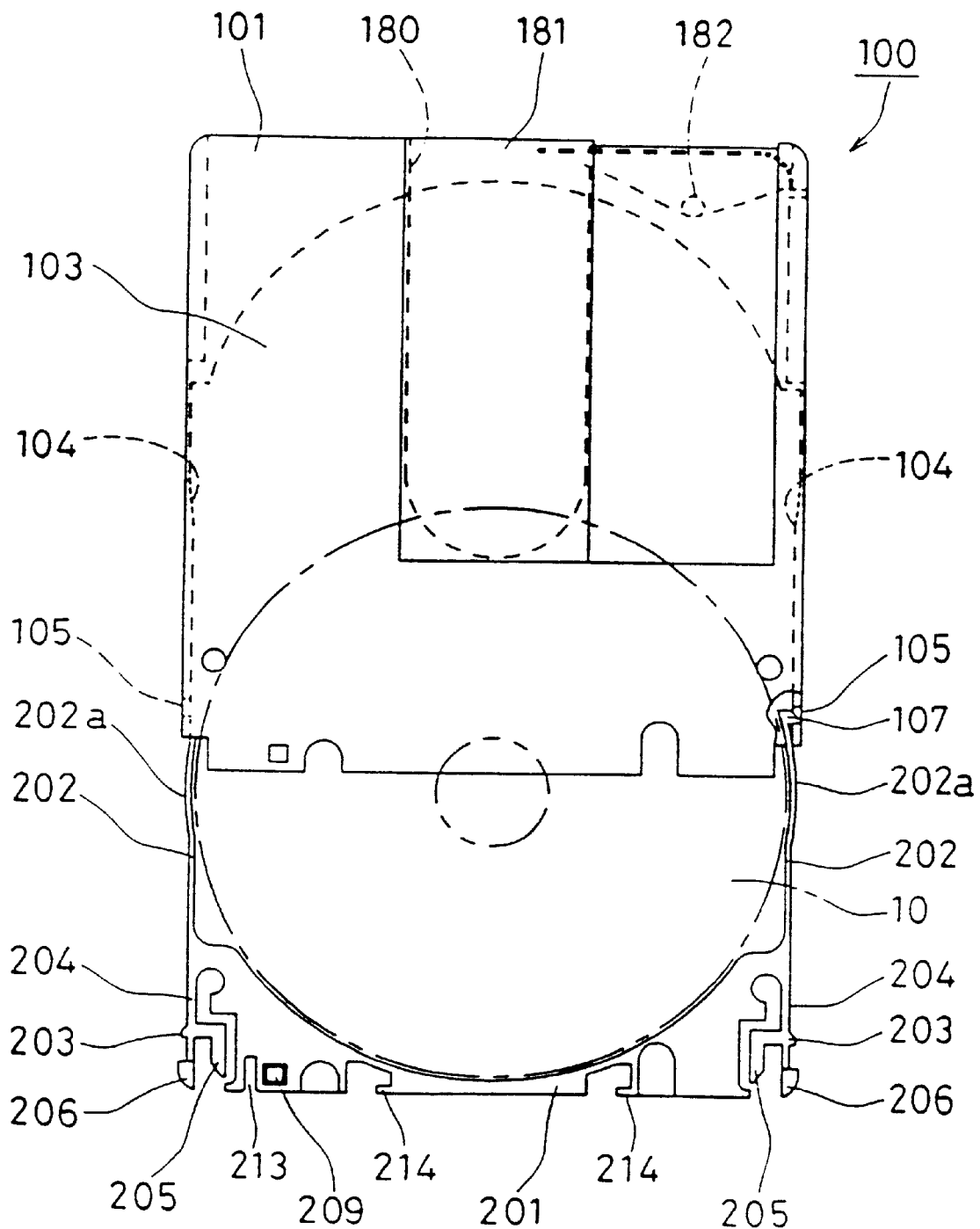
FIG. 3 is a schematic plan view showing the disk cartridge shown in FIG. 1 during its assembly or the disk cartridge with an opening/closing cover being withdrawn.

FIG. 1 is a schematic perspective view showing the appearance of an example of a disk cartridge according to a first embodiment of the present invention. FIG. 2 is an exploded perspective view showing schematic shapes of the main components of the disk cartridge shown in FIG. 1. FIG. 3 is a schematic plan view showing the disk cartridge shown in FIG. 1 during the assembly or when an opening/closing cover is withdrawn.

As shown in FIGS. 1–3, a disk cartridge 100 according to the first embodiment of the present invention comprises a case body 101 and an opening/closing cover 201 that is accommodated in the case body 101 in a withdrawable state.

The case body 101 is provided with an opening 102 into or from which a disc-shaped recording medium (hereafter also referred to simply as a "disk") 10 is inserted or ejected and a disk-storage portion 103 forming a space where the disk 10 is accommodated. The disk-storage portion 103 is provided adjoining the opening 102.

The opening/closing cover 201 has a pair of disk holding members 202 that adjust the position of the disk 10 in its inplane direction and maintain the disk 10. The disk holding members 202 have shapes in which portions 202*a* corresponding to the vicinity of the maximum width (diameter) portions of the disk 10 are curved outwards and their ends are curved inwards respectively as shown in FIG. 3. On the other hand, inner walls 104, opposed in a disk-diameter direction of a disk-storage portion 103 of the case body 101, are formed so that a space between the inner walls 104 is slightly widened in a back portion and a space between them in the vicinity of the opening 102 is narrowed as shown in FIG. 3. Therefore, as shown in FIG. 1, in the case of trying to withdraw the opening/closing cover 201 when the opening/closing cover 201 covers the opening 102 of the case body 101 completely, the portions 202*a* that are curved outwards in the disk holding members 202 of the opening/closing cover 201 come into contact with the inner walls 104 of the disk-storage portion 103 of the case body 101. Then, the portions 202*a* are elastically deformed so as to move toward each other, i.e. so as to hold the disk 10 in its inplane direction. Consequently, the ends of the disk holding members 202 hold the accommodated disk 10 without fail. Thus, the disk 10 can be ejected together with the opening/closing cover 201 in the state shown in FIG. 3.

The case body 101 has a head access opening 180 so that a head for recording information on the disk 10 or reproducing or erasing information recorded on the disk 10 can scan a disk surface. Further, the case body 101 comprises a shutter 181 for covering the head access opening 180 and an elastic spring 182 for maintaining the state in which the shutter 181 is closed when the disk cartridge is not loaded in a drive unit. In addition, the case body 101 has a belt opener 183 that is operated together with the shutter 181, and an opener hook 184 that is provided at an end of the belt opener 183 and that is held by the drive unit when the drive unit opens and closes the shutter 181. Moreover, the case body 101 has a positioning hole 185 for positioning the disk cartridge when the disk cartridge is loaded in the drive unit.

The external shape and size of the disk cartridge 100 including the case body 101, the head access opening 180, the shutter 181, and the like are designed so as to secure the perfect compatibility with a disk cartridge standardized for the accommodated disk 10. Therefore, the disk cartridge 100 shown in FIG. 1 can be loaded in a conventional disk drive unit prepared for a disk cartridge accommodating the disk 10 without any modification, and then information can be recorded, reproduced, and erased.

When the opening/closing cover 201 is accommodated in the case body 101 completely (FIG. 1), the portions 202a of the disk holding members 202 that are curved outwards come into contact with the portions of the inner walls 104 where the space between the opposed inner walls 104 of the disk-storage portion 103 of the case body is widened. Consequently, the disk 10 does not come into contact with the disk holding members 202 even when the disk 10 is rotated in a drive unit.

Further, the disk holding members 202 are not formed in a continuous shape (a circle) surrounding the whole periphery of the disk but with two components by cutting an end away. Thus, the disk holding members 202 are not present inside the head access opening 180, and therefore a head and the disk holding members do not bump together.

As described above, the disk cartridge of the present invention maintains the compatibility with a conventional disk cartridge standardized for an accommodated disk. On the other hand, the disk cartridge has a configuration in which the accommodated disk can be ejected together with the opening/closing cover 201. By loading the disk into the adapter to be described later, information can be recorded, reproduced, and erased in a drive unit designed for a larger-size disk cartridge.

In the disk cartridge of the present invention, it is preferable that a first locking means is formed for holding and fixing the opening/closing cover 201 to the case body 101 at a position where the opening/closing cover 201 is accommodated in the case body 101 and covers the opening 102 completely.

The first locking means is provided for preventing the opening/closing cover 201 from being withdrawn from the case body 101 at an undesired time. The first locking means prevents the accommodated disk from being exposed accidentally and avoids scratches on the disk and adhesion of dirt onto the disk.

In the case of the disk cartridge according to the present embodiment, the first locking means comprises locking holes 105 and first locking projections 203. The respective locking holes 105 are formed in the vicinity of the opening 102 of the opposed inner walls 104 forming a part of the disk-storage portion 103 of the case body. The first locking projections 203 are formed in the opening/closing cover 201 so as to engage with the locking holes 105 respectively at the position where the opening/closing cover 201 is accommodated in the case body 101 and covers the opening 102 completely.

The case body 101 and the opening/closing cover 201 are locked by the first locking means as follows. The opening/closing cover 201 is inserted into the disk-storage portion 103 of the case body 101 from the state shown in FIG. 3. When the first locking projections 203 reach the opening 102 of the case body 101, the first locking projections 203 come into contact with opening corners of the inner walls 104. Due to slopes formed in the contact portion side of the first locking projections 203, hinges 204 are elastically deformed inwards. Then, the opening/closing cover 201 is further inserted while the first locking projections 203 are in contact with the inner walls 104. When the first locking projections 203 reach the locking holes 105, the hinges 204 are elastically restored and the first locking projections 203 engage with the locking holes 105 to complete the lock (FIG. 1).

On the other hand, the first locking means is unlocked as follows.

When the disk cartridge locked as shown in FIG. 1 is inserted to a predetermined position inside an adapter of the present invention described later, first unlocking claws 205 that are elastically displaced together with the first locking projections 203 provided at the portions of hinges 204 come into contact with a first unlocking means (first unlocking bars 606) of the adapter described later. Then, the inclined surfaces formed at the ends of the first unlocking means with an acute angle provide external forces to both the first unlocking claws 205 in a direction of the inward displacement, and the hinges 204 are elastically deformed. As a result, the engagement between the first locking projections 203 and the locking holes 105 is released.

In the disk cartridge according to the present embodiment, the locking holes 105 are through holes leading to the outside of the case body 101. Therefore, it is possible to release the engagement between the first locking projections 203 and the locking holes 105 by inserting a pointed stick into the through holes from the outside of the case body.

Further, in the disk cartridge according to the present embodiment, first unlocking knobs 206 that are elastically displaced together with the first locking projections 203 provided at the portions of the hinges 204 are formed so as to be exposed to the outside of the case body in a locked state (see FIG. 1). Therefore, by holding both the first unlocking knobs 206 from the outside toward the inside so as to move toward each other, the hinges 204 are elastically deformed, thus releasing the engagement between the first locking projections 203 and the locking holes 105.

Thus, by allowing the first locking means to be unlocked even in the cases other than the case where the disk cartridge is inserted into the adapter described later, a user can eject an accommodated disk to check, clean or change it as required.

As shown in FIG. 3, it is preferable that the disk cartridge according to the present embodiment comprises a second locking means for limiting the movement of the opening/closing cover 201 in its withdrawal direction at a position where the disk 10 can be ejected by withdrawing the opening/closing cover 201 from the case body 101.

As described above, in the disk cartridge in which a user can unlock the first locking means, withdraw the opening/closing cover 201, and eject the accommodated disk 10, it is desirable that a safety mechanism for preventing the opening/closing cover 201 and the disk 10 from being dropped accidentally is provided. The second locking means functions for this effectively.

In the disk cartridge according to the present embodiment, the second locking means comprises the locking holes 105 and second locking projections 207. The locking holes 105 are formed on the respective opposed inner walls 104 in the vicinity of the opening 102. The opposed inner walls form a part of the disk-storage portion 103 of the case body. The second locking projections 207 are formed at the ends of the disk holding members 202 of the opening/closing cover 201 so as to engage with the locking holes 105 respectively at the positions where the opening/closing cover 201 is withdrawn so that the accommodated disk 10 can be ejected.

The second locking means can lock the opening/closing cover 201 in its withdrawal direction as follows. When the opening/closing cover 201 is withdrawn from the case body 101 from the state shown in FIG. 1, as described above, the portions 202a that are curved outwards of the disk holding members 202 of the opening/closing cover 201 come into contact with the inner walls 104 of the disk-storage portion 103 of the case body 101, and the opening/closing cover 201 is withdrawn with the portions 202a being elastically deformed so as to move toward each other. However, after the portions 202a of the disk holding members 202 that are curved outwards are drawn out from the case body, the opening/closing cover 201 is withdrawn with the second locking projections 207 formed at the ends of the disk holding members 202 being in contact with the inner walls 104. When the second locking projections 207 reach the locking holes 105, the disk holding members 202 are elastically restored. Then, the second locking projections 207 engage with the locking holes 105, thus limiting the further withdrawal of the opening/closing cover 201 (FIG. 3). Thus, a user cannot draw out the opening/closing cover 201 by gathering momentum and therefore the opening/closing cover 201 and the disk 10 cannot be dropped accidentally.

On the other hand, the second locking means are unlocked as follows.

As shown in FIG. 3, when the second locking means functions, by holding both the disk holding members 202 from the outside toward the inside so as to move toward each other, the disk holding members 202 are elastically deformed, thus releasing the engagement between the second locking projections 207 and the locking holes 105.

The second locking projections 207 are provided with a slope so as to have an acute angle at their ends as shown in the figure. Therefore, when the opening/closing cover 201 is inserted into the opening 102 of the case body 101, or when the opening/closing cover 201 is further inserted from the state in which the second locking projections 207 and the locking holes 105 are engaged with each other as shown in FIG. 3, both the disk holding members 202 are easily deformed elastically in the direction moving toward each other due to the slope. Consequently, second locking projections 207 do not hinder the insertion of the opening/closing cover 201.

Further, in the disk cartridge of the present embodiment, the locking holes 105 are used as both the locking holes engaging with the first locking projections 203 and the locking holes engaging with the second locking projections 207 as common locking holes. Therefore, the configuration can be simplified. Needless to say, there will be no problem even when the respective locking holes are provided separately.

Figure 4:
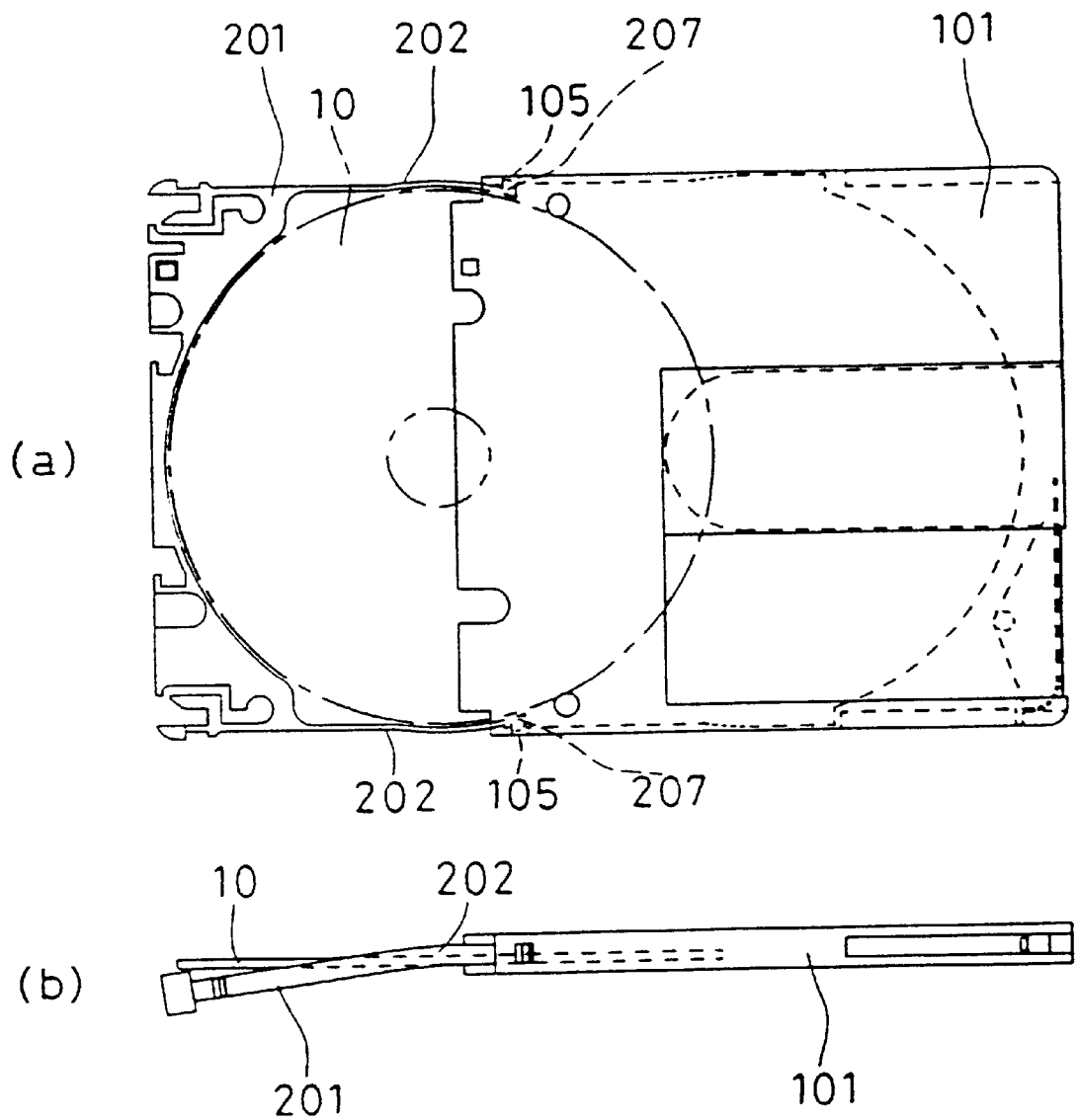
FIG. 4 shows schematic views illustrating the disk cartridge according to the first embodiment with its movement in the withdrawal direction of the opening/closing cover being limited by a second locking means.

In the disk cartridge of the present embodiment, it is preferable that the opening/closing cover 201 can be elastically deformed in the direction substantially perpendicular to a disk surface when the movement of the opening/closing cover 201 is limited in its withdrawal direction due to the function of the second locking means. FIG. 4 shows schematic views illustrating the state in which the movement of the opening/closing cover is limited in its withdrawal direction by the second locking means in the disk cartridge according to the present embodiment having such a configuration as described above. FIG. 4(a) is a plan view and FIG. 4(b) is a side view thereof. As shown in FIG. 4(b), the disk holding members 202 can be elastically deformed in the direction substantially perpendicular to a surface of the disk 10. Consequently, a user can eject the disk 10 easily.

In the disk cartridge according to the present embodiment, it is preferable that third locking means is provided for holding and fixing the opening/closing cover 201 to the case body 101 at the position where the opening/closing cover 201 is accommodated in the case body 101 completely and the opening 102 is covered. Further, it is preferable that the held and fixed state of the opening/closing cover 201 by the third locking means can be released by applying external force, but the state can be released only in an irreversible manner, i.e. once the state is released, it is not possible to recover the original state, which differs from the case of the first locking means.

Essentially, it is not desirable for a user to eject a disk accommodated in a disk cartridge in order to avoid adhesion of dirt and scratches, which is different from a disk having the premise that the disk is handled in a bare condition. The disk cartridge of the present embodiment is provided with a mechanism for unlocking the first locking means. Only a predetermined operation by a user enables the unlocking. However, it may be possible even for a user who does not intend to eject the disk to unlock the first locking means unintentionally during handling the disk cartridge. The third locking means provides a means for preventing the first locking means from being unlocked unintentionally. Therefore, the third locking mans must not have a configuration in which the third locking means can be unlocked unintentionally in an ordinal condition of use. In addition, only the application of external force enables the unlocking.

Further, it is preferable that the unlocking of the third locking means can be confirmed easily when the third locking means has been released. When the unlocking is confirmed in a disk cartridge, it means that a disk accommodated in the disk cartridge is exposed to the outside at least once by a user. Therefore, a user can surmise easily that the disk may have lower reliability of information than that in a disk cartridge in which a locking means has not been unlocked. The unlocking of the third locking means in this case does not include the unlocking in loading the opening/closing cover into the adapter described later. According to the present invention, a user can insert the opening/closing cover into the adapter without touching a disk at all. Consequently, the decrease in the reliability of information recorded on the disk due to the unlocking of the third locking means in this case is in an ignorable degree.

Figure 5:
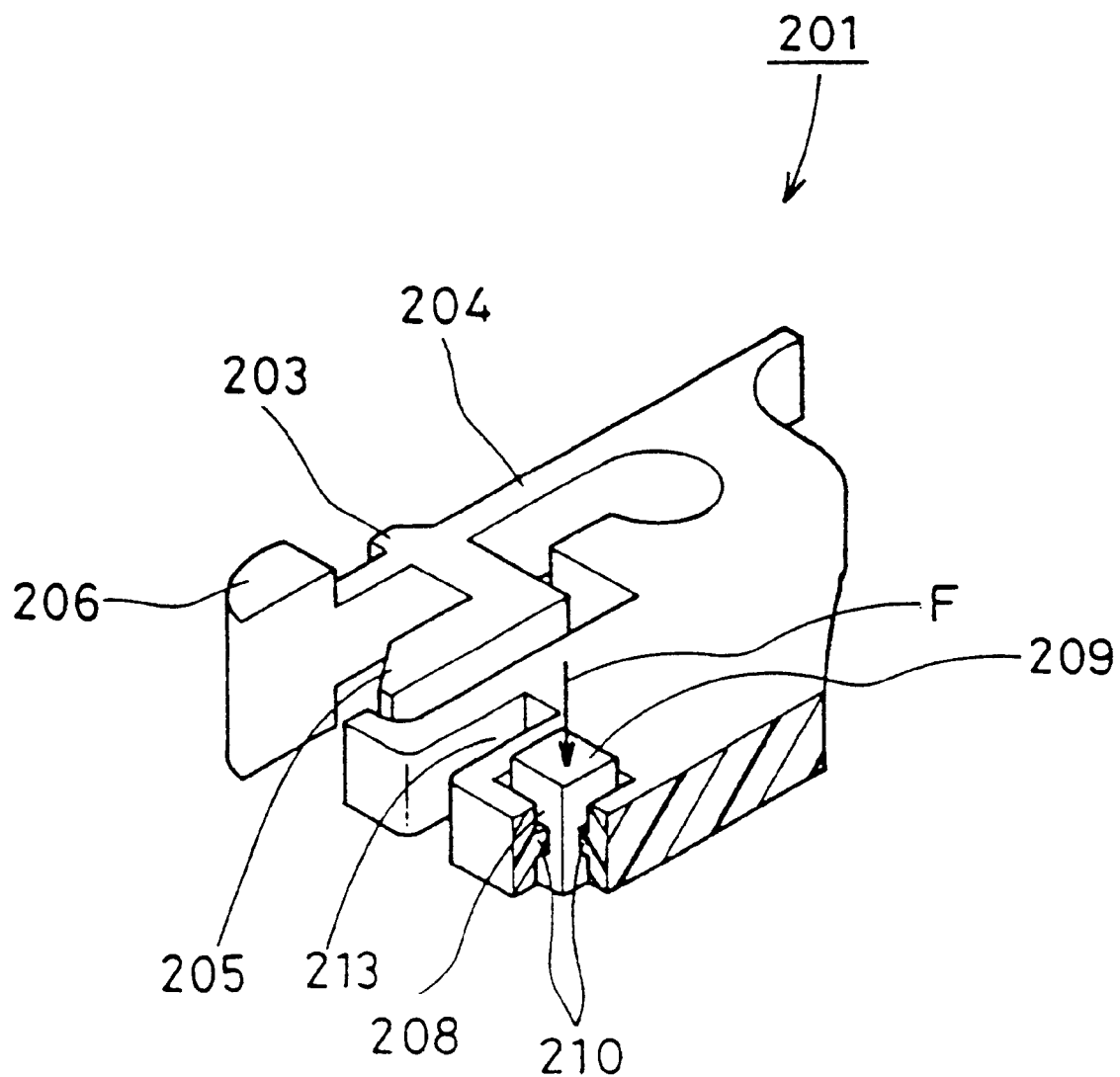
FIG. 5 is a partially enlarged perspective view showing an enlarged part of a third locking means of the opening/closing cover according to the first embodiment.
Figure 6:
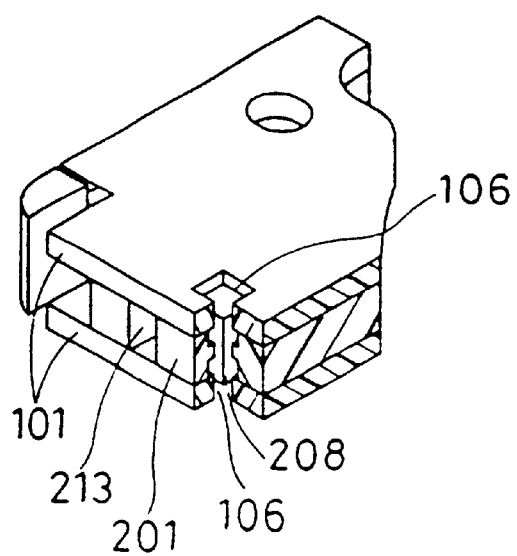
FIG. 6 shows partial cross-sectional perspective views illustrating an enlarged part of the third locking means of the disk cartridge according to the first embodiment.
Figure 6:
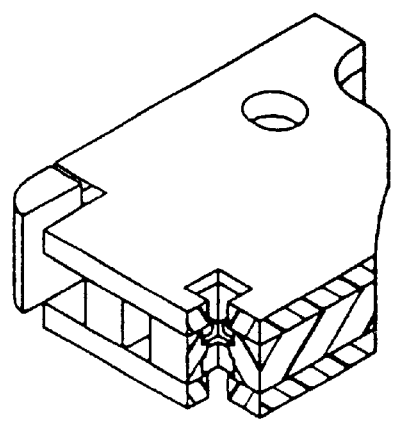
Figure 6:
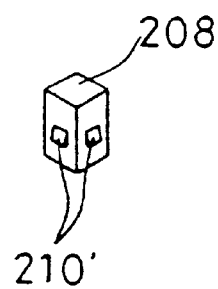

An example of a configuration of such a third locking means will be explained with reference to FIGS. 5 and 6. FIG. 5 is a partial cross-sectional perspective view showing an enlarged third locking means of the opening/closing cover according to the present embodiment. FIG. 6 shows partial cross-sectional perspective views illustrating an enlarged third locking means of the disk cartridge according to the present embodiment.

As shown in FIGS. 5 and 6(a), the third locking means according to the present embodiment comprises a third locking hole 106 and a third locking projection 209. The third locking hole 106 is formed in the vicinity of the opening 102 of the case body 101 so as to go through from an upper surface to a lower surface of the case body 101. The third locking projection 209 is formed in the opening/closing cover 201 so as to engage with the third locking hole 106 at the position where the opening/closing cover 201 is accommodated in the case body 101 to cover the opening 102 completely. More particularly, a lock key 208 is formed at a predetermined position in the opening/closing cover 201 via connecting portions 210 so as to be combined with the opening/closing cover 201 to be one component and so as to project from the upper surface and the lower surface of the opening/closing cover 201. The parts projecting from the opening/closing cover 201 of the lock key 208 form the third locking projection 209. The connecting portions 210 are formed so as to bridge between respective substantial centers of four surfaces of the lock key 208 and inner-wall faces of the opening/closing cover 208 surrounding the lock key 208 (see FIG. 20 described later).

The third locking means can be unlocked as follows.

Figure 7:
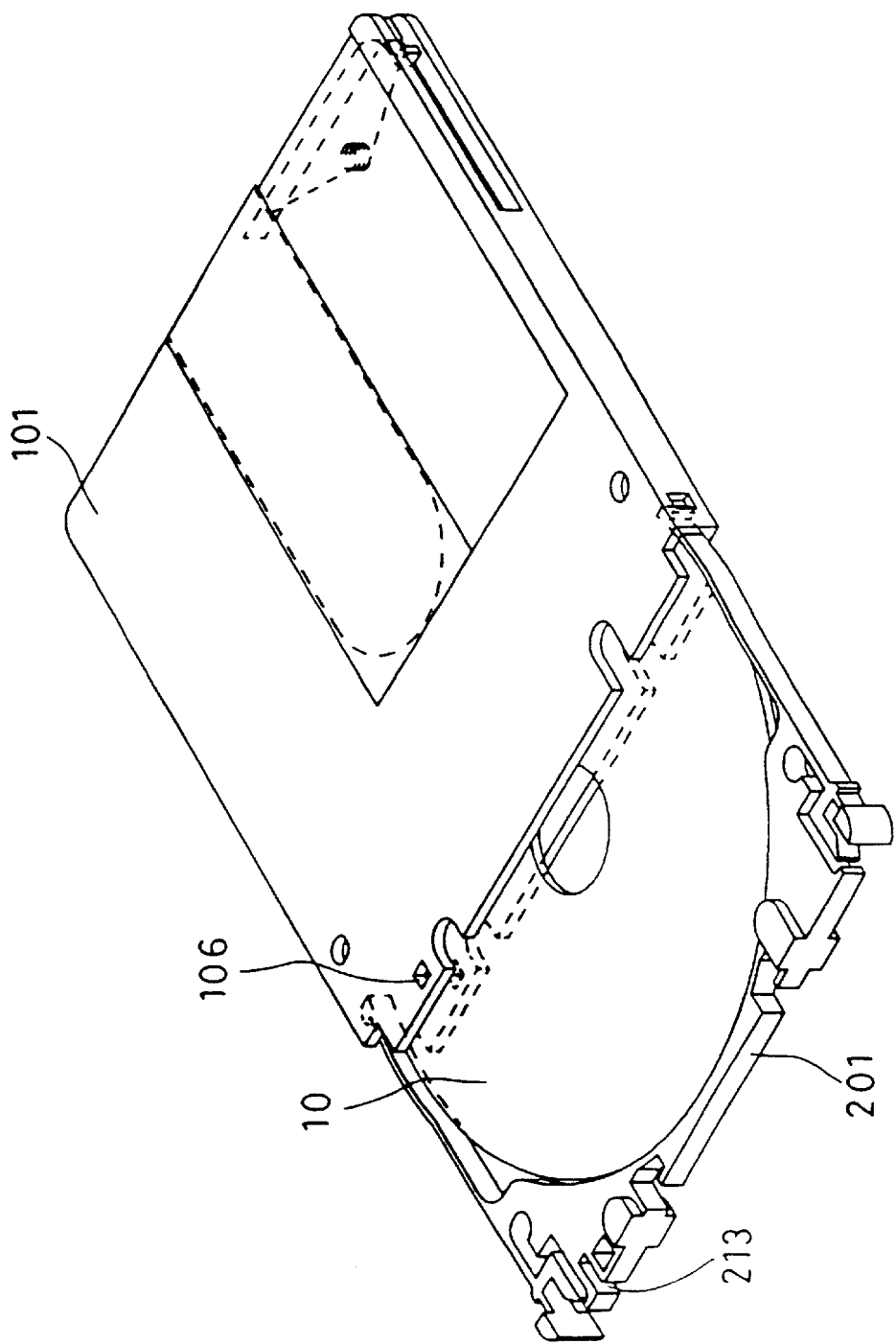
FIG. 7 is a schematic perspective view showing the third locking means of the disk cartridge according to the first embodiment in an unlocked state and when the opening/closing cover is withdrawn.

In the state shown in FIG. 6(a), a predetermined external force (shown by an arrow F in FIG. 5) is applied so as to push the third locking projection 209 positioned within the locking hole 106. As a result, the connecting portions 210 are disconnected and therefore the lock key 208 is removed to the outside through the third locking hole 106 in the lower surface as shown in FIG. 6(b), thus unlocking the third locking means. In FIG. 6(b), a numeral 210' indicates disconnected surfaces of the connecting portions 210. Further, by unlocking the first locking means, it is possible to draw out the opening/closing cover 201 from the case body 101 as shown in FIG. 7.

When the third locking means is unlocked as described above, the lock key 208 is removed to the outside. Therefore, it is not possible to recover the state before the unlocking. In addition, when the opening/closing cover 201 is accommodated in the case body 101, the third locking projection is not present within the third locking hole 106 and therefore it is possible to see the opposite side through the third locking hole 106. Consequently, a user can easily confirm that the third locking means has been unlocked before.

The unlocking of the third locking projection is also possible in a reversible manner by fitting a convex part (a third unlocking projection 607) of the third unlocking means of the adapter according to the present invention described later into a concave part 213 formed in the vicinity of the third locking means without using the above-mentioned irreversible means in which the lock key 208 is removed.

It is preferable to provide an erroneous-insertion preventing means so that the opening/closing cover 201 is inserted into the case body 101 with the correct orientation when being inserted into the disk-storage portion 103 of the case body 101 again after having been drawn out from the case body 101 as described above. It is preferable that the erroneous-insertion preventing means is formed so that the opening/closing cover 201 cannot be inserted into the opening 102 of the case body 101 at all when the opening/closing cover 201 is inserted with wrong orientation or even if the opening/closing cover 201 can be inserted into the opening 102 to some extent, the opening/closing cover 201 cannot be inserted into the case body 101 completely, thus finding out the insertion with wrong orientation easily.

The means for preventing the erroneous insertion of the opening/closing cover into the case body in the disk cartridge according to the present embodiment is formed of engagement members comprising notches 107 and 108 provided on the end faces of the opening 102 of the case body 101 and erroneous-insertion preventing projections 211 and 212 provided at predetermined positions of the opening/closing cover 201 as shown in FIG. 2.

When the opening/closing cover 201 is inserted into the case body 101 with correct orientation, the notches 107 and 108 engage with the erroneous-insertion preventing projections 211 and 212, respectively. Thus, as shown in FIG. 1, the opening/closing cover 201 is accommodated in the case body 101 completely and covers the opening 102.

Figure 8:
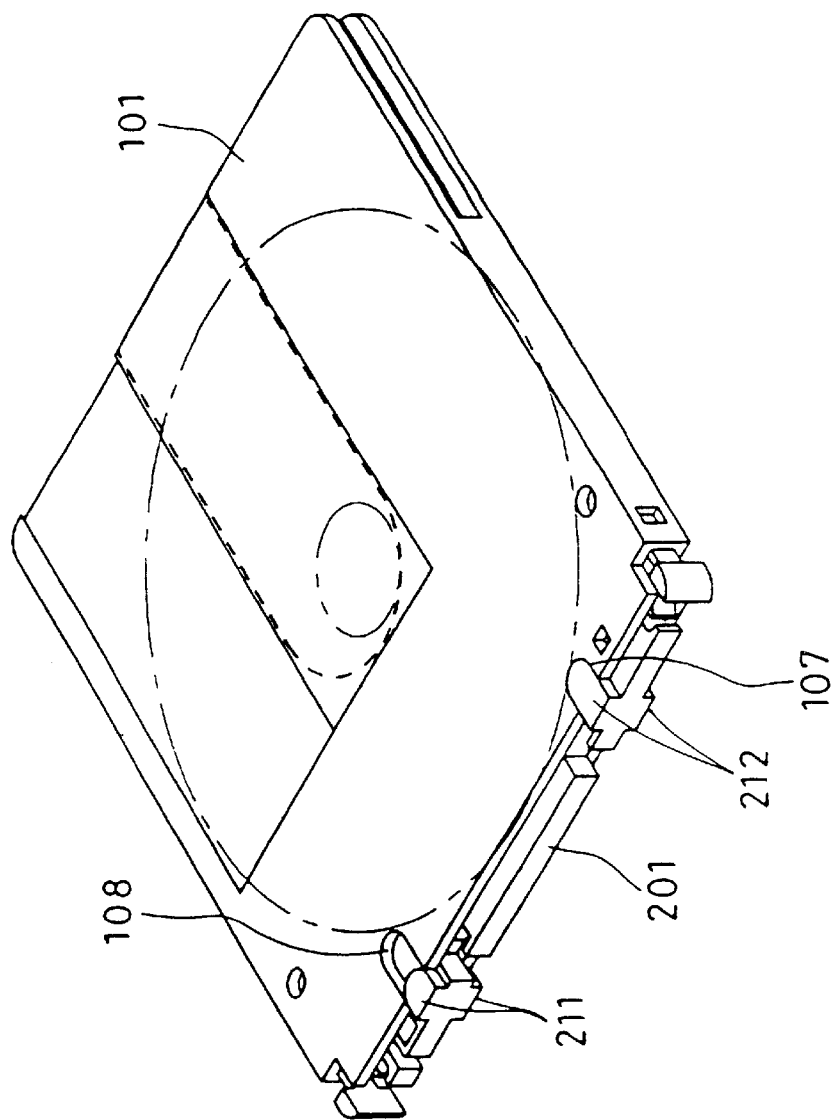
FIG. 8 is a schematic perspective view showing the disk cartridge according to the first embodiment with a case body being inserted upside down with respect to the opening/closing cover.

On the other hand, when the opening/closing cover 201 is inserted into the case body 101 upside down with respect to the opening/closing cover 201, the insertion of the opening/closing cover 201 is possible to some extent, but the opening/closing cover 201 cannot be accommodated in the case body 101 completely as shown in FIG. 8 due to the difference in depth between the notches 107 and 108. Thus, a user can easily notice the insertion with wrong orientation.

In the example described above, the engagement members are formed in asymmetrical shapes with respect to the center line of the case body in the insertion direction of the opening/closing cover 201 into the disk-storage portion. However, the erroneous-insertion preventing means is not limited to this. For instance, the engagement members may be formed at asymmetrical positions with respect to the center line.

The disk cartridge of the present invention is inserted into the adapter described later to be used. In this case, it is preferable to provide a means for preventing erroneous insertion of the disk cartridge into the adapter so that the disk cartridge can be inserted with correct orientation. It is preferable that such an erroneous-insertion preventing means is formed so that the cartridge cannot be inserted into the adapter at all when being inserted with wrong orientation, or even if the cartridge can be inserted into the adapter to some extent, the cartridge cannot be inserted to a predetermined position, thus easily finding out the insertion with wrong orientation.

The means for preventing erroneous insertion of the disk cartridge into the adapter according to the present embodiment comprises a concave part 213 formed on the leading end face of the disk cartridge in the insertion direction into the adapter as shown in FIG. 1 and at an asymmetrical position with respect to the center line in the insertion direction and a convex part (the erroneous-insertion preventing projection 607) formed inside the insertion portion of the adapter that engages with the concave part 213.

When the disk cartridge 100 is inserted into the adapter described later with correct orientation, the convex part formed inside the insertion portion of the adapter engages with the concave part 213 formed on the leading end face of the disk cartridge 100 in the insertion direction. Thus, the cartridge 100 can be inserted to a predetermined position in the adapter reliably.

On the other hand, when the disk cartridge 100 is inserted into the adapter upside down, the insertion of the disk cartridge 100 is possible to some extent, but the convex part formed inside the insertion portion of the adapter comes into contact with the leading end face of the disk cartridge 100 in the insertion direction and therefore further insertion of the disk cartridge 100 is not possible. Thus, a user can notice easily that the disk cartridge is inserted upside down.

In the example described above, the concave part is formed at the asymmetrical position with respect to the center line of the disk cartridge in the insertion direction.

However, the erroneous-insertion preventing means is not limited to this. For example, in the erroneous-insertion preventing means, the concave part may be formed in an asymmetrical shape with respect to the center line in the insertion direction.

Further, it is preferable that the space between the ends of the pair of disk holding members 202 is smaller than a disk diameter in order to prevent the disk 10 from falling off from the opening of the insertion portion of the adapter accidentally when the opening/closing cover 201 and the disk 10 are loaded in the insertion portion of the adapter by the method described later and the door of the adapter is not closed (see FIG. 19).

Moreover, hooks 214 that engage with an opening/closing-cover holding means of the adapter described later are formed in the opening/closing cover 201.

Second Embodiment

Figure 9:
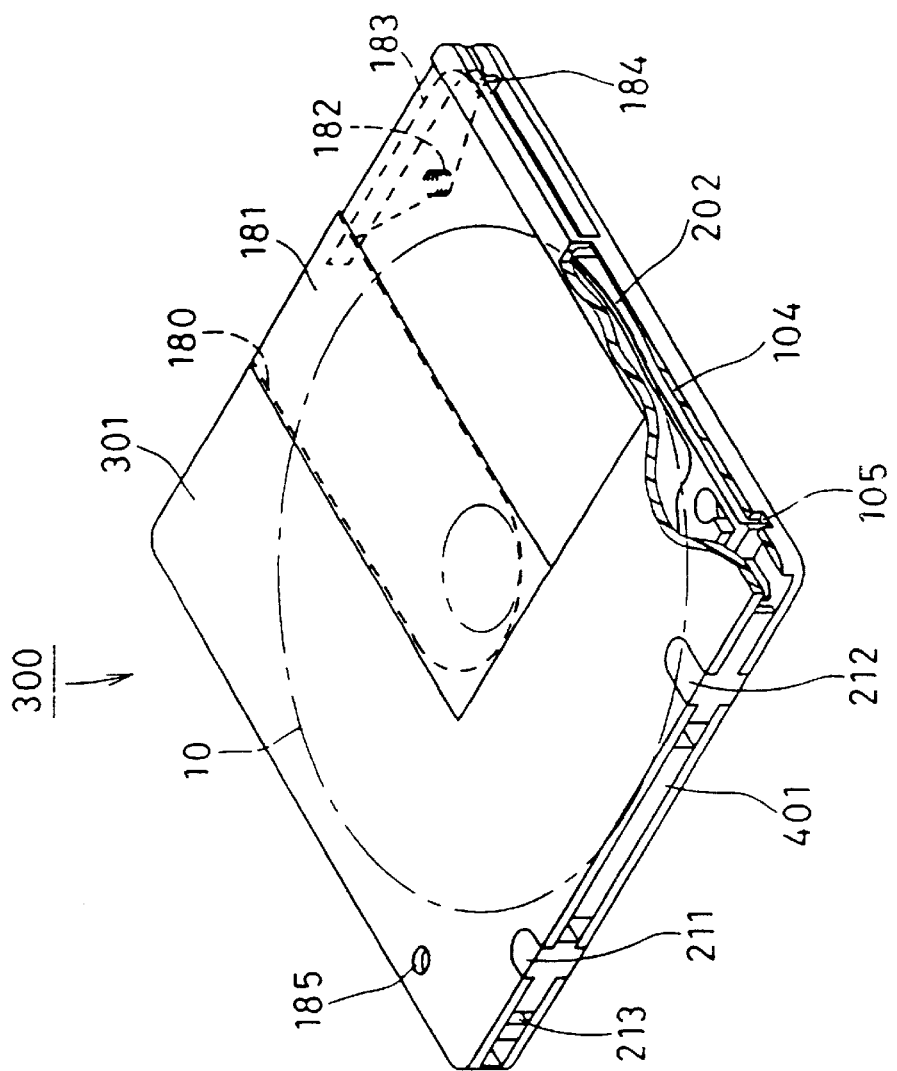
FIG. 9 is a partially cutaway schematic perspective view showing the appearance of an example of a disk cartridge according to a second embodiment of the present first invention.
Figure 10:
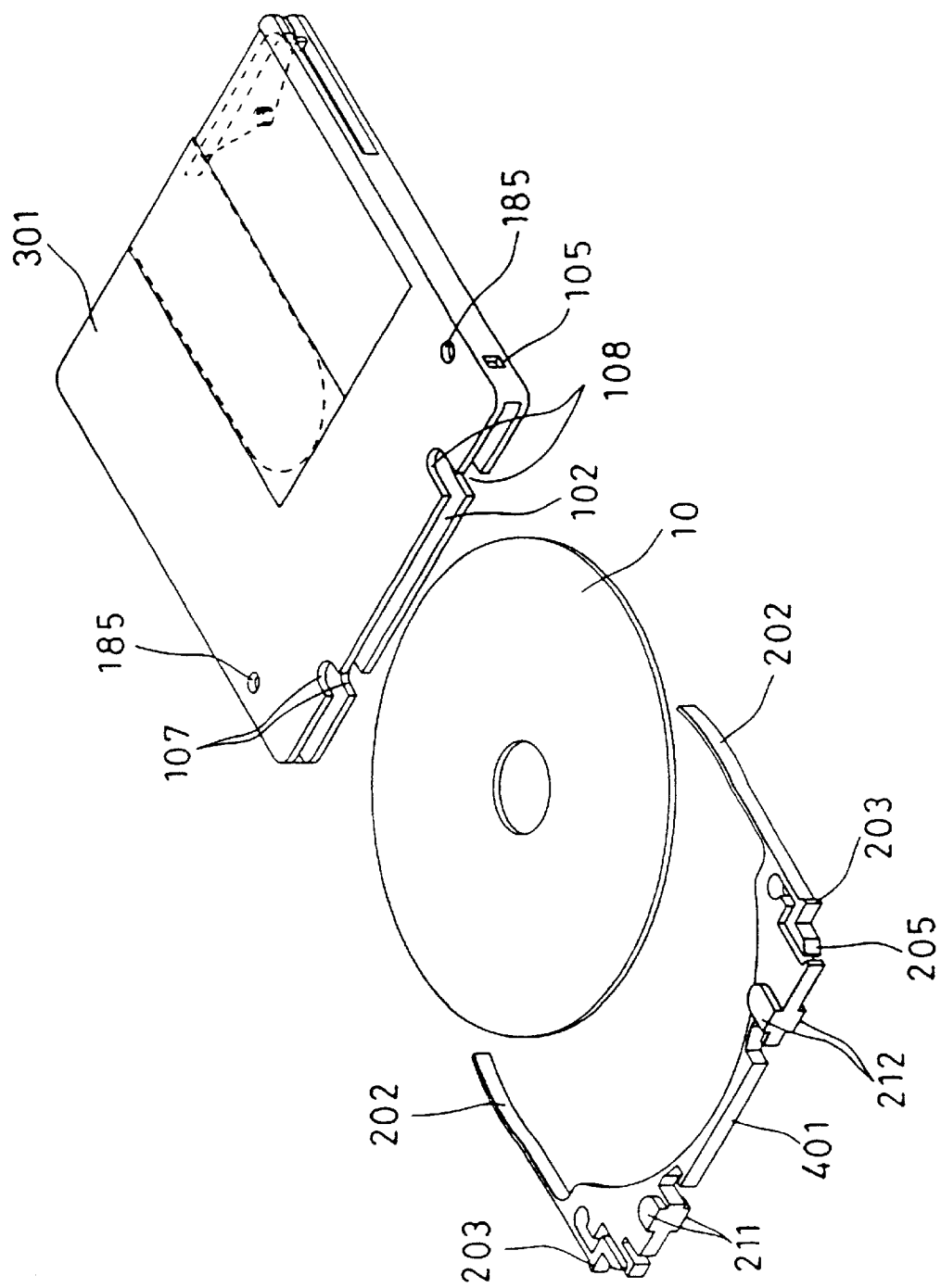
FIG. 10 is an exploded perspective view showing schematic shapes of the main components of the disk cartridge shown in FIG. 9.
Figure 11:
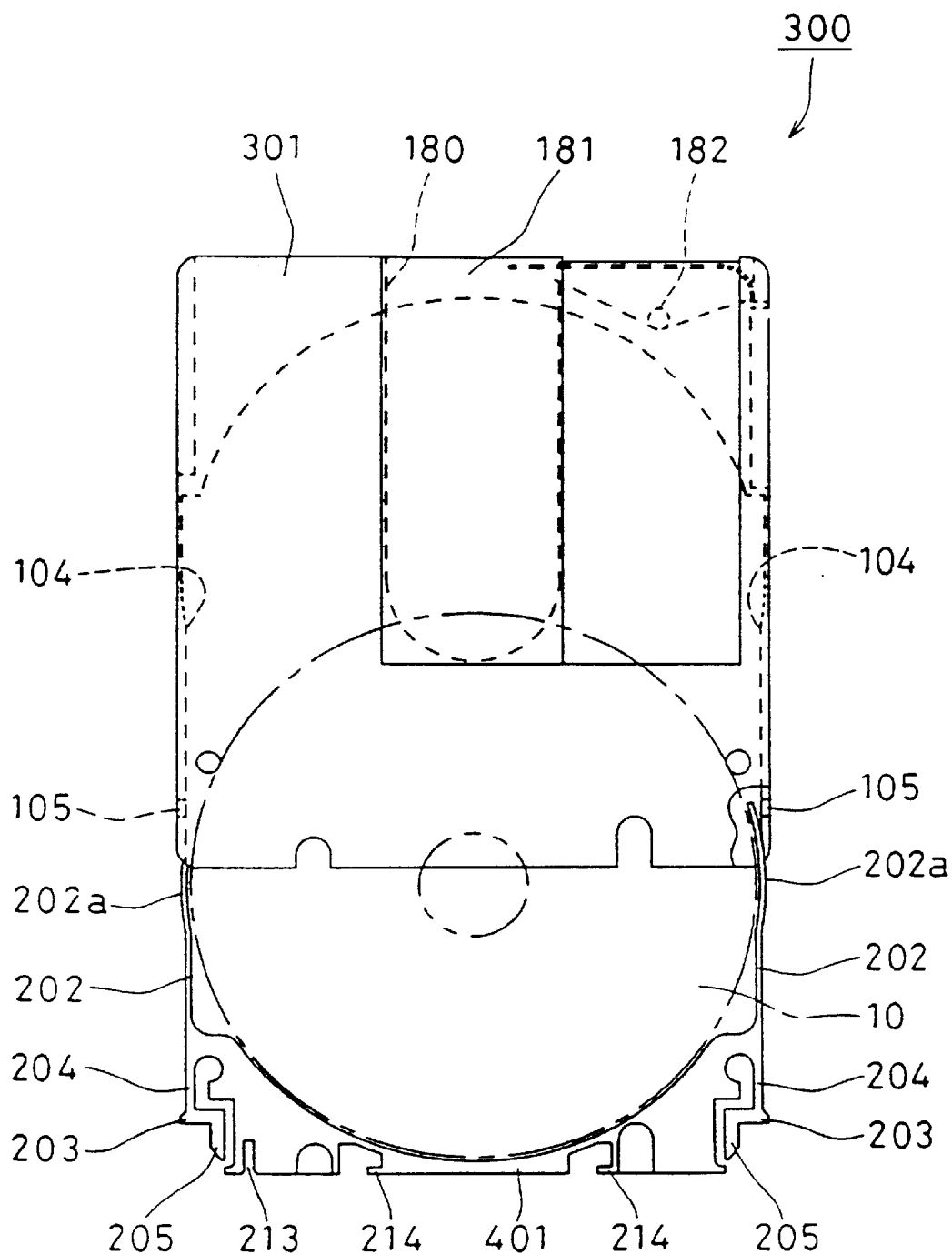
FIG. 11 is a schematic plan view showing the disk cartridge shown in FIG. 9 during its assembly or the disk cartridge with an opening/closing cover being withdrawn.

Next, a disk cartridge according to a second embodiment of the present invention will be explained. FIG. 9 is a schematic perspective view showing the appearance of an example of the disk cartridge according to the second embodiment of the present invention. FIG. 10 is an exploded perspective view showing schematic shapes of the main components of the disk cartridge shown in FIG. 9. FIG. 11 is a schematic plan view showing a state during the assembly of the disk cartridge shown in FIG. 9 or a state in which an opening/closing cover is withdrawn.

In FIGS. 9–11, a numeral 300 indicates a disk cartridge according to the present embodiment, and numerals 301 and 401 indicate a case body and an opening/closing cover, respectively. Other members having the same function as in the first embodiment are indicated with the same characters as in the first embodiment. The explanations for them are omitted here to avoid duplicate explanations.

The disk cartridge according to the second embodiment is different from the disk cartridge according to the first embodiment in that the former is designed assuming the case where a user ejects an accommodated disk by himself and on the other hand the latter is not designed assuming such a case. That is to say, in the disk cartridge according to the second embodiment, by avoiding the case where a user ejects an accommodated disk by himself, the possibility of scratching the disk or adhesion of foreign objects onto the disk is eliminated to the utmost, thus obtaining high reliability of recorded information and high durability of the disk.

Thus, in the disk cartridge according to the first embodiment, the components provided assuming the case where a user ejects the accommodated disk by himself are eliminated in the disk cartridge according to the second embodiment. Except for those components, the disk cartridge according to the second embodiment has the same configuration as that of the disk cartridge according to the first embodiment.

The components eliminated in the disk cartridge according to the second embodiment are those relating to the unlocking of the first locking means, those relating to the second locking means, and those relating to the third locking means in the disk cartridge according to the first embodiment. Those will be explained sequentially as follows.

The disk cartridge according to the second embodiment does not comprise some of the components relating to the unlocking of the first locking means of the disk cartridge according to the first embodiment. That is, the disk cartridge according to the second embodiment does not have first unlocking knobs (the first unlocking knobs 206 in the first embodiment) that are elastically deformed together with the first locking projections 203 provided at the portions of the hinges 204. In the disk cartridge according to the second embodiment, locking holes 105 are through holes leading to the outside of a case body. Consequently, it is possible to release the engagement between the first locking projections 203 and the locking holes 105 by inserting a pointed stick into the through holes from the outside of the case body in emergency.

The disk cartridge according to the second embodiment does not comprise the components relating to the second locking means included in the disk cartridge according to the first embodiment. That is, the disk cartridge according to the second embodiment does not have second locking projections (the second locking projections 207 in the first embodiment) engaging with the locking holes 105 provided at the ends of disk holding members 202 of an opening/closing cover 201. Since it is not assumed that a user draws out the opening/closing cover 201 by himself, it is not necessary to provide a safety mechanism for preventing the opening/closing cover 201 and an accommodated disk 10 from being dropped accidentally.

The disk cartridge according to the second embodiment does not comprise the components relating to the third locking means included in the disk cartridge according to the first embodiment. That is to say, the disk cartridge according to the second embodiment does not have the third locking hole 106, the third locking projection 209 engaging with the third locking hole 106, the lock key 208 forming the third locking projection 209, and the connecting portions 210 connecting the opening/closing cover 201 and the lock key 208 included in the disk cartridge according to the first embodiment. In the present embodiment, since the first unlocking knobs 206 are not provided, it is not assumed that a user unlocks the first locking means accidentally in an ordinary condition of use.

The configurations other than those described above in the present embodiment are the same as those in the previously described first embodiment. Therefore, detailed explanation of the present embodiment is omitted except for those described above.

Third Embodiment

An adapter according to the third embodiment of the present invention will be explained.

The method of using the adapter according to the third embodiment of the present invention will be described as follows. When a user inserts the disk cartridge described in the first or second embodiment into the adapter according to the third embodiment, the disk is shifted into the adapter. The adapter has compatibility in external shape with a larger disk cartridge than the disk cartridge described in the first and second embodiments. Therefore, by loading the adapter accommodating the disk that has been shifted into the adapter into a drive unit that is suitable for the adapter, it is possible to record information on the disk or to read out or erase recorded information from the disk. That is, needless to say, when a user has a drive unit designed for the disk cartridge having compatibility in external shape with the adapter according to the third embodiment of the present invention, recording, reproduction and erasure of information are possible by loading a disk cartridge suitable for the drive unit into the drive unit. In addition, when using the adapter according to the third embodiment of the present invention, information can be recorded, reproduced, and erased by loading a disk accommodated in a smaller disk cartridge into the drive unit via the adapter.

Moreover, the disk can be shifted into the adapter without being touched directly by a user. Therefore, the possibility of adhesion of foreign objects onto the disk or scratching the disk can be avoided, thus securing the reliability of information and durability of the disk.

The adapter according to the third embodiment of the present invention will be explained with reference to the drawings as follows.

Figure 12:
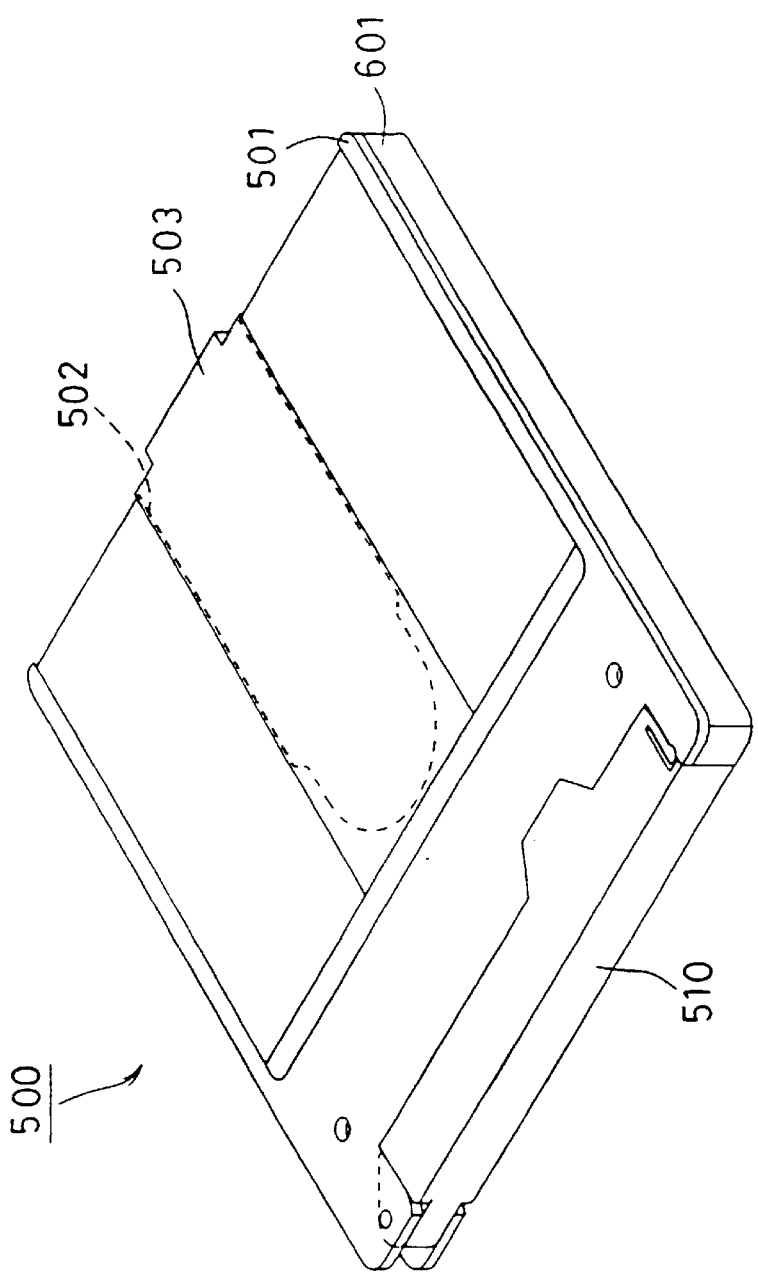
FIG. 12 is an entire perspective view showing the appearance of an example of an adapter according to a third embodiment of the present first invention.
Figure 13:
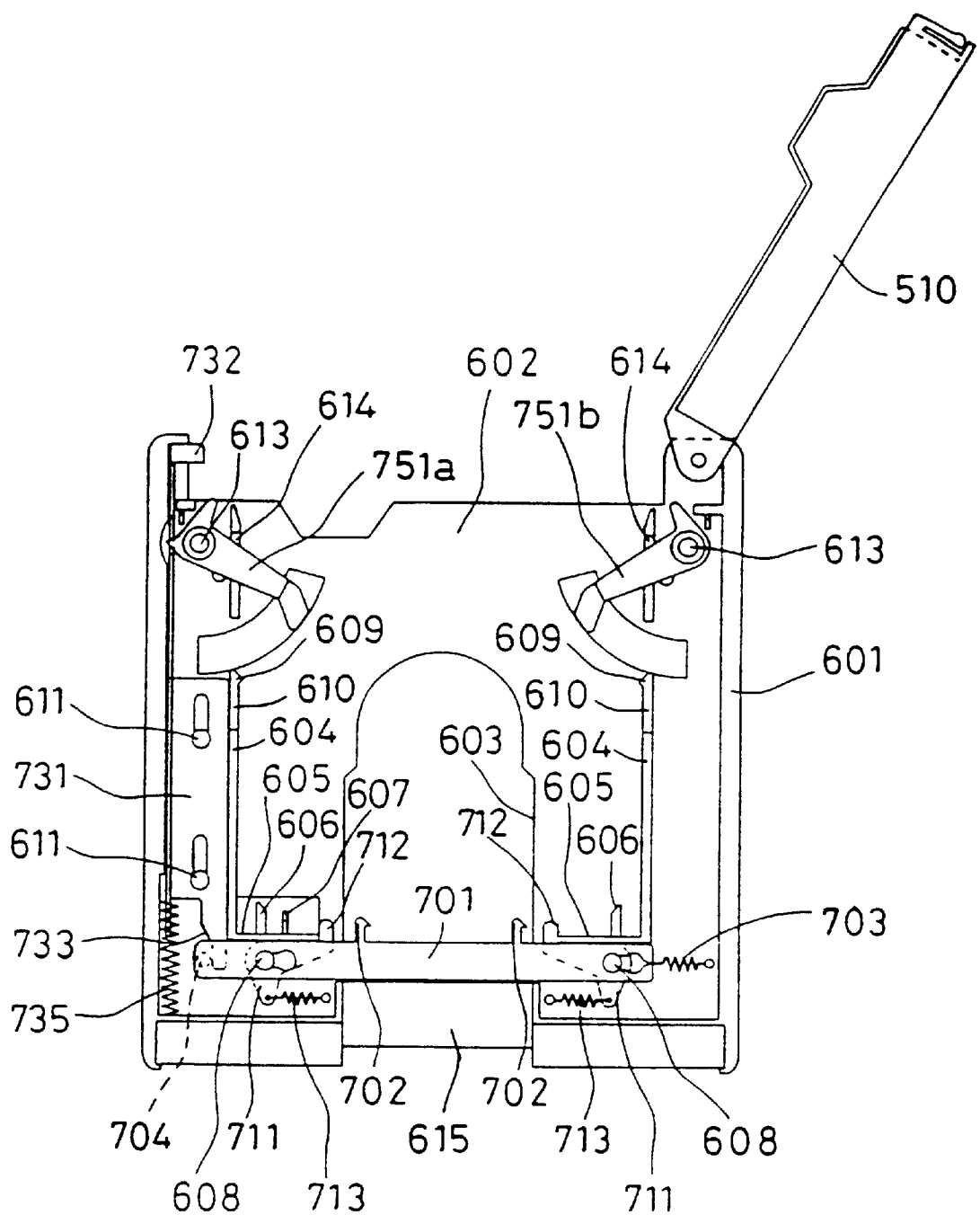
FIG. 13 is a schematic plan view showing the internal structure after removing an upper case and a shutter of the adapter shown in FIG. 12.
Figure 14:
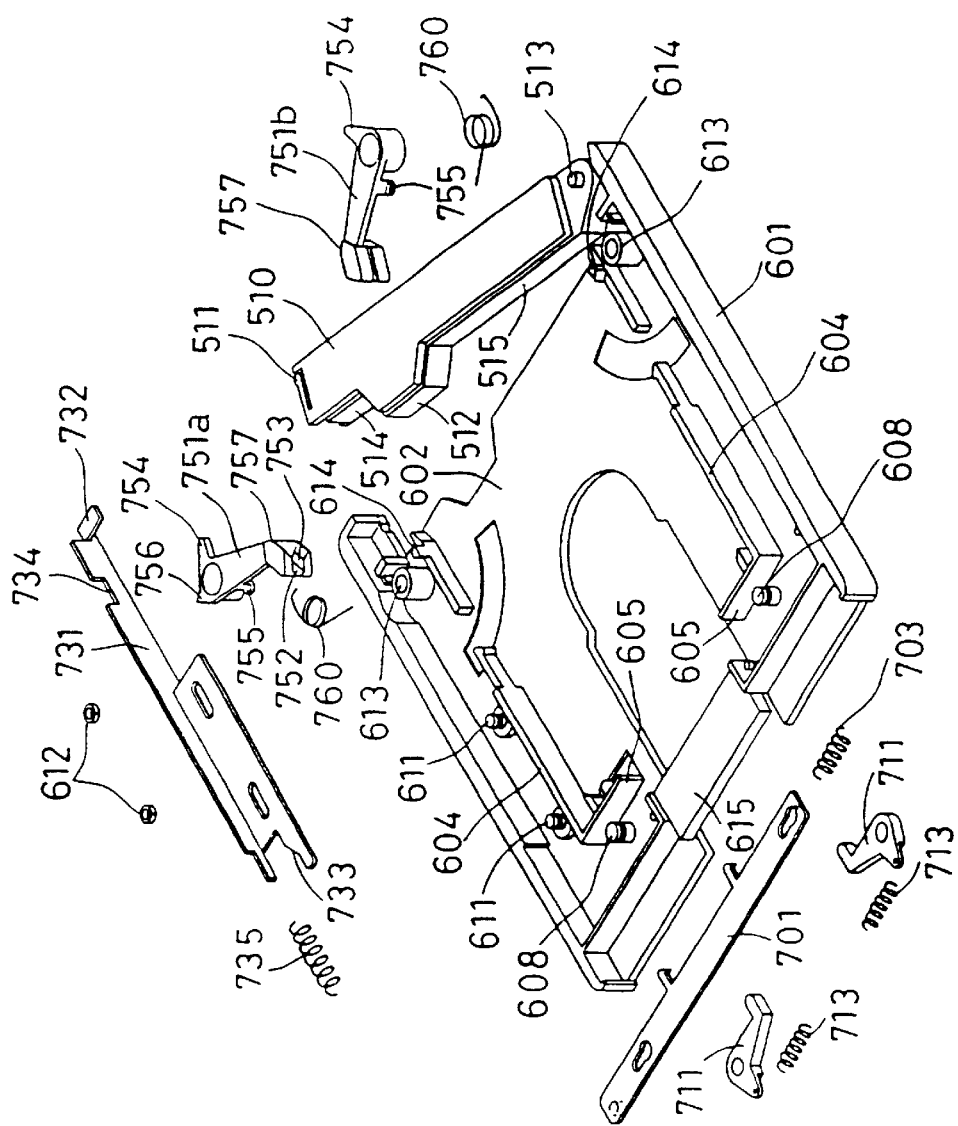
FIG. 14 is an exploded perspective view showing components (except for the upper case and the shutter) of the adapter shown in FIG. 12.

FIG. 12 is an entire perspective view showing the appearance of an example of the adapter according to the third embodiment of the present invention. FIG. 13 is a schematic plan view showing the internal structure after removing an upper case and a shutter of the adapter shown in FIG. 12. FIG. 14 is an exploded schematic perspective view showing components (except for the upper case and the shutter) of the adapter shown in FIG. 12.

An adapter 500 of the present embodiment is formed by engaging an upper case 501 and a lower case 601 with each other. The adapter 500 comprises an insertion portion 602 to be a space where a disk cartridge is inserted. The insertion portion 602 is surrounded by inner walls of the upper case 501 and the lower case 601, a pair of opposed guide walls 604, and a pair of contact walls 605 formed on the lower case. Further, a door 510 capable of being opened and closed is provided at the entrance of the insertion portion 602. Head access openings 502 and 603 are formed in the upper case 501 and the lower case 601 respectively in order to allow a disk surface to be scanned by a head for recording information on or reproducing or erasing recorded information from a disk accommodated in the adapter. The adapter 500 further comprises a shutter 503 for covering the head access openings and an elastic spring (not shown in the figures) for maintaining the shutter 503 in a closed state when the adapter is not loaded on the drive unit.

An outline of a method of loading a disk into the adapter according to the third embodiment of the present invention will be explained using FIGS. 15–19 as follows. The disk cartridge shown in the figures is the one explained in the first embodiment. Needless to say, the adapter of the present embodiment also can be used for the disk cartridge described in the second embodiment.

Figure 15:
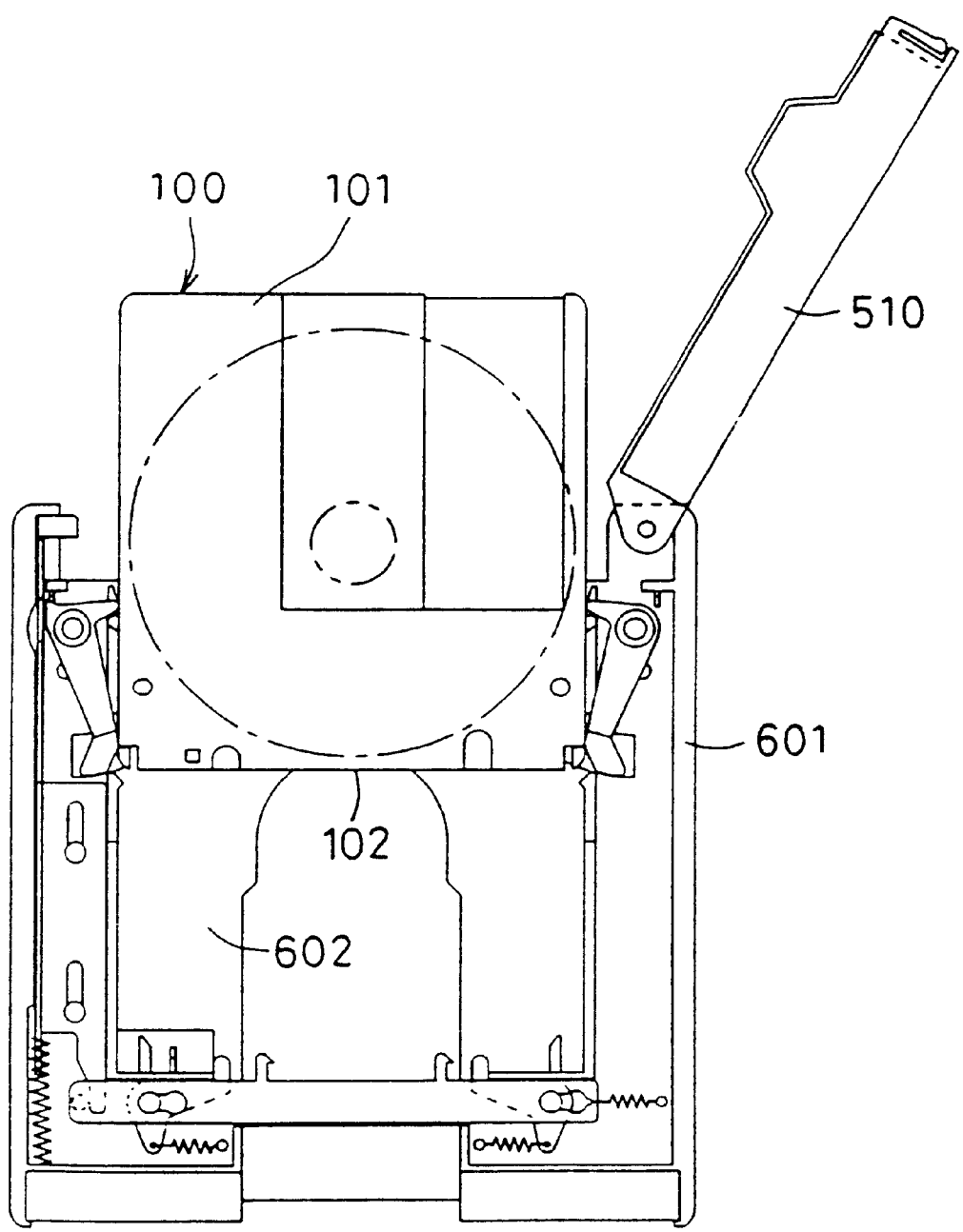
FIG. 15 is a schematic plan view showing a state in which a door of the adapter according to the third embodiment is opened and the disk cartridge according to the first embodiment is inserted into an insertion portion (wherein the upper case and the shutter are removed so that the internal structure can be seen).

The disk cartridge 100 described in the above embodiment is inserted into the insertion portion 602 with the entrance 102 of the case body 101 facing forward after the door 510 is opened (FIG. 15).

Figure 16:
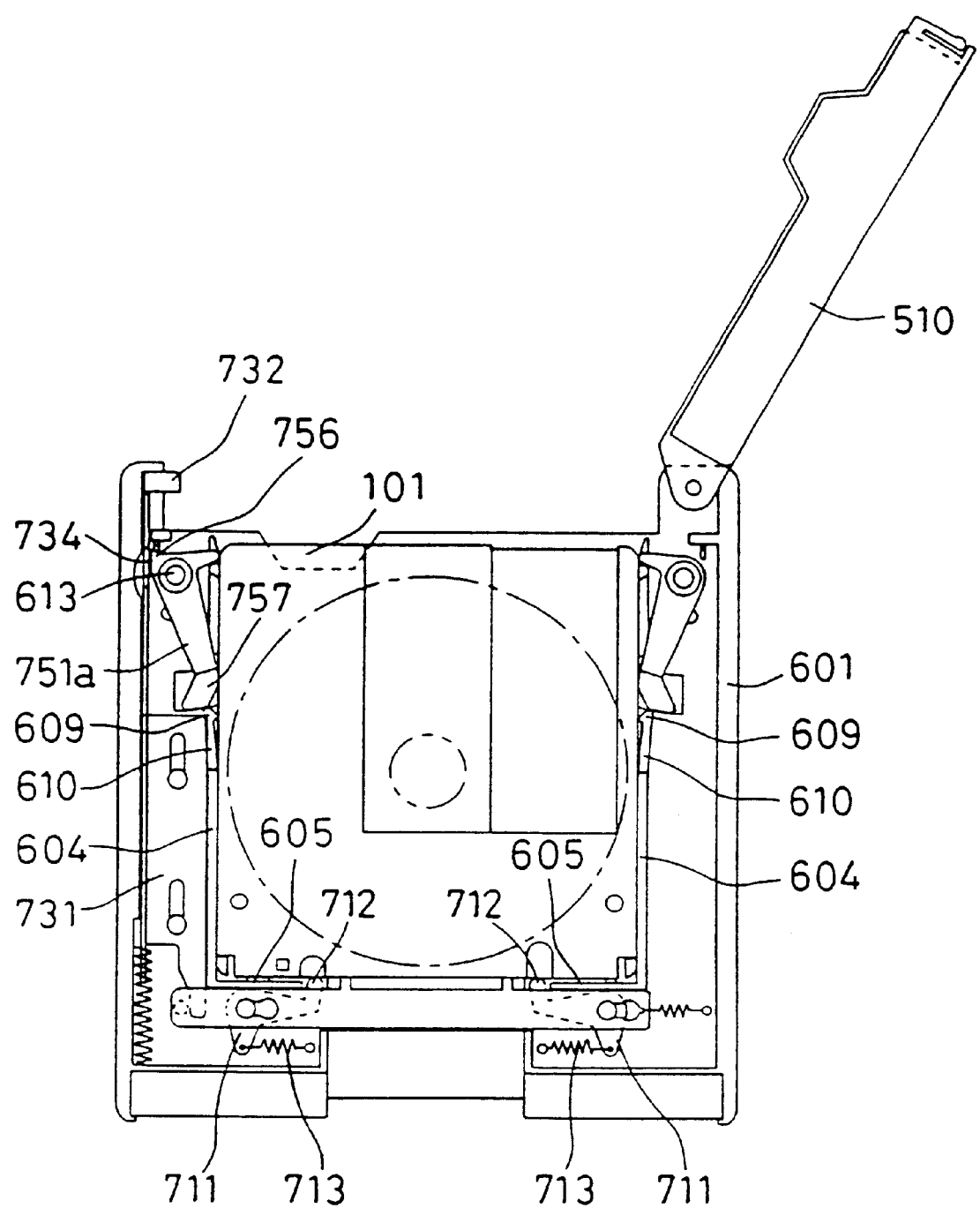
FIG. 16 is a schematic plan view showing a state in which the opening/closing cover of the disk cartridge according to the first embodiment is held by an opening/closing-cover holding means of the adapter according to the third embodiment (wherein the upper case and the shutter are removed so that the internal structure can be seen).

The disk cartridge 100 is guided by the opposed guide walls 604 and the respective inner walls of the upper case 501 and the lower case 601 and is inserted to the vicinity of a position where its end face comes into contact with the contact walls 605 (FIG. 16). Then, a first unlocking means operates for unlocking the first locking means that holds and fixes the opening/closing cover 201 of the disk cartridge to the case body 101, resulting in the state in which the opening/closing cover 201 can be withdrawn from the case body 101. In the case of the disk cartridge according to the first embodiment having the third locking means, the third locking means is unlocked in a reversible manner by a third unlocking means provided in the adapter 500. Further, the opening/closing cover 201 under such a state is retained in the adapter by an opening/closing-cover holding means provided in the adapter 500. The opening/closing-cover holding means maintains the opening/closing cover 201 at a predetermined position in the insertion portion 602 even after the case body 101 has been drawn out. In this case, the disk 10 accommodated in the disk cartridge 100 is drawn out from the case body 101 together with the opening/closing cover 201 by the pair of disk holding members 202 provided in the opening/closing cover 201, thus remaining inside the insertion portion 602 of the adapter.

Figure 17:
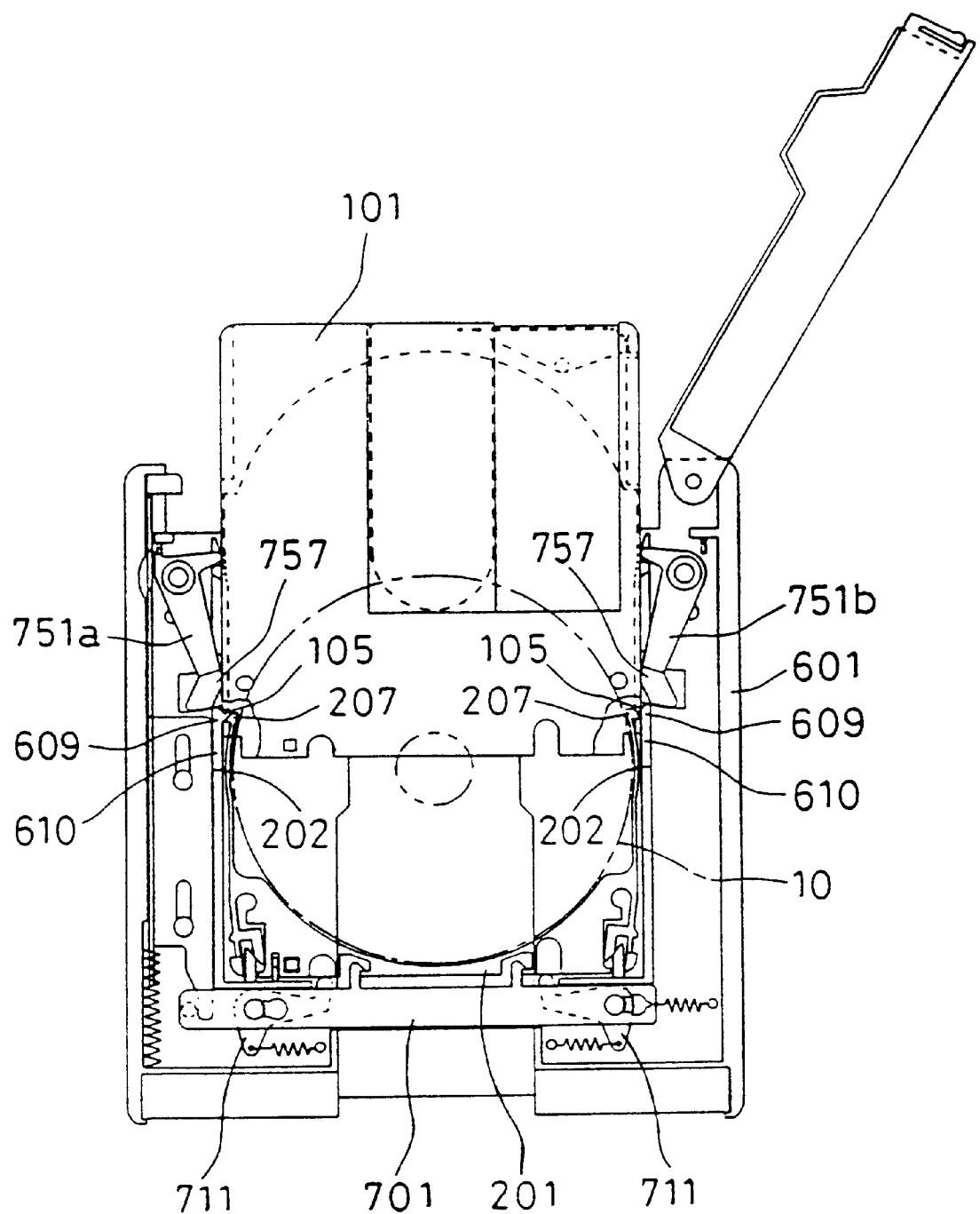
FIG. 17 is a partially cutaway schematic plan view showing a state in which a case body is drawn out after the opening/closing-cover holding means of the adapter according to the third embodiment was operated, or the case body is inserted into the adapter while the opening/closing-cover holding means is operated (wherein the upper case and the shutter are removed so that the internal structure can be seen).

Then, the case body 101 is drawn out from the insertion portion 602. In the case of the disk cartridge according to the first embodiment having the second locking means, the second locking means is unlocked by a second unlocking means provided in the adapter 500 (FIG. 17). Consequently, it is possible to separate the case body 101 and the opening/closing cover 201 completely.

Figure 18:
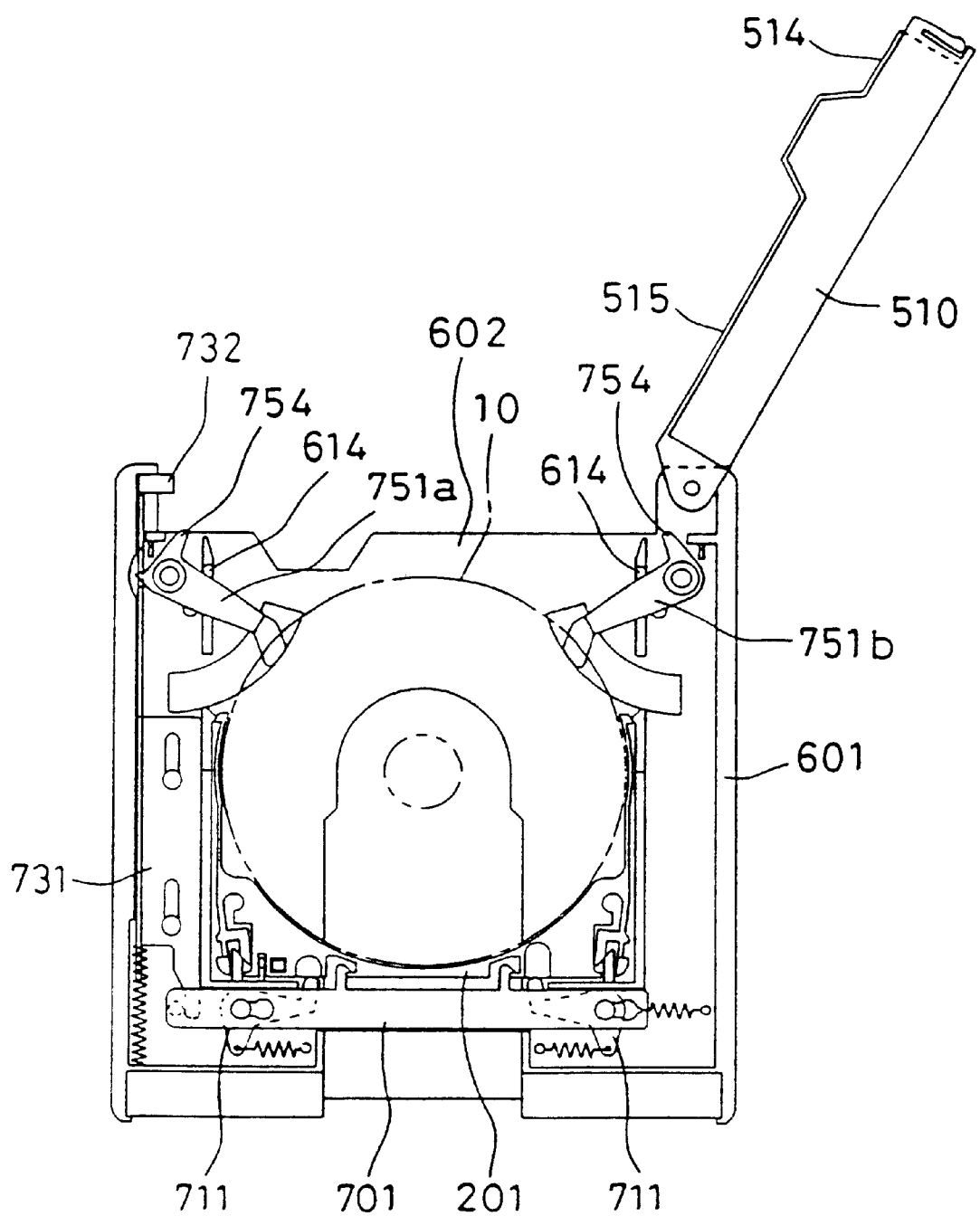
FIG. 18 is a schematic plan view showing a state in which the opening/closing cover of the disk cartridge according to the first embodiment is held by the opening/closing-cover holding means of the adapter according to the third embodiment and the case body is removed (wherein the upper case and the shutter are removed so that the internal structure can be seen).

The opening/closing cover 201 and the disk 10 held by the opening/closing cover 201 are left in the insertion portion 602, and the case body 101 is drawn out from the insertion portion 602 completely (FIG. 18). Then, the door 510 is closed (FIG. 19).

Thus, when the adapter 500 is loaded in a drive unit designed for a disk cartridge having compatibility in external shape with the adapter, it is possible to record information on or reproduce or erase recorded information from the disk accommodated in the adapter.

The configuration and function of the above will be explained sequentially as follows.

The first unlocking means of the present invention comprises a pair of first unlocking bars 606 formed on the contact walls 605 as shown in FIG. 13. The first unlocking bars 606 are provided at the positions coming into contact with the pair of first unlocking claws 205 (see FIG. 3) formed on the end face of the opening/closing cover 201 when the disk cartridge is inserted into the insertion portion 602. The points of the first unlocking bars 606 have a slope with an acute angle. Therefore, the slopes with an acute angle provided at the points of the first unlocking bars 606 come into contact with the slopes with an acute angle provided at the points of the first unlocking claws 205, which generates external force so as to displace the pair of first unlocking claws 205 inwards. As a result, the portions of hinges 204 are elastically deformed (see FIG. 17), and then the first locking projections 203 are displaced together with the first unlocking claws 205, thus releasing the respective engagement between the first locking projections 203 and the locking holes 105.

The first unlocking means of the present invention is a required element for separating the opening/closing cover from the case body by unlocking the lock in a disk cartridge having the first locking means as in the first and second embodiments.

Next, the third unlocking means of the adapter according to the third embodiment of the present invention will be explained.

The third unlocking means is a required element for separating the opening/closing cover from the case body by unlocking the lock in the disk cartridge having the third locking means according to the first embodiment of the present invention. It is necessary to unlock the third locking means by the third unlocking means in a reversible manner, which is different from the irreversible method of removing the lock key 208 described above.

The third unlocking means of the present invention is formed of a third unlocking projection 607 formed on the contact wall 605 as shown in FIG. 13.

Figure 20:
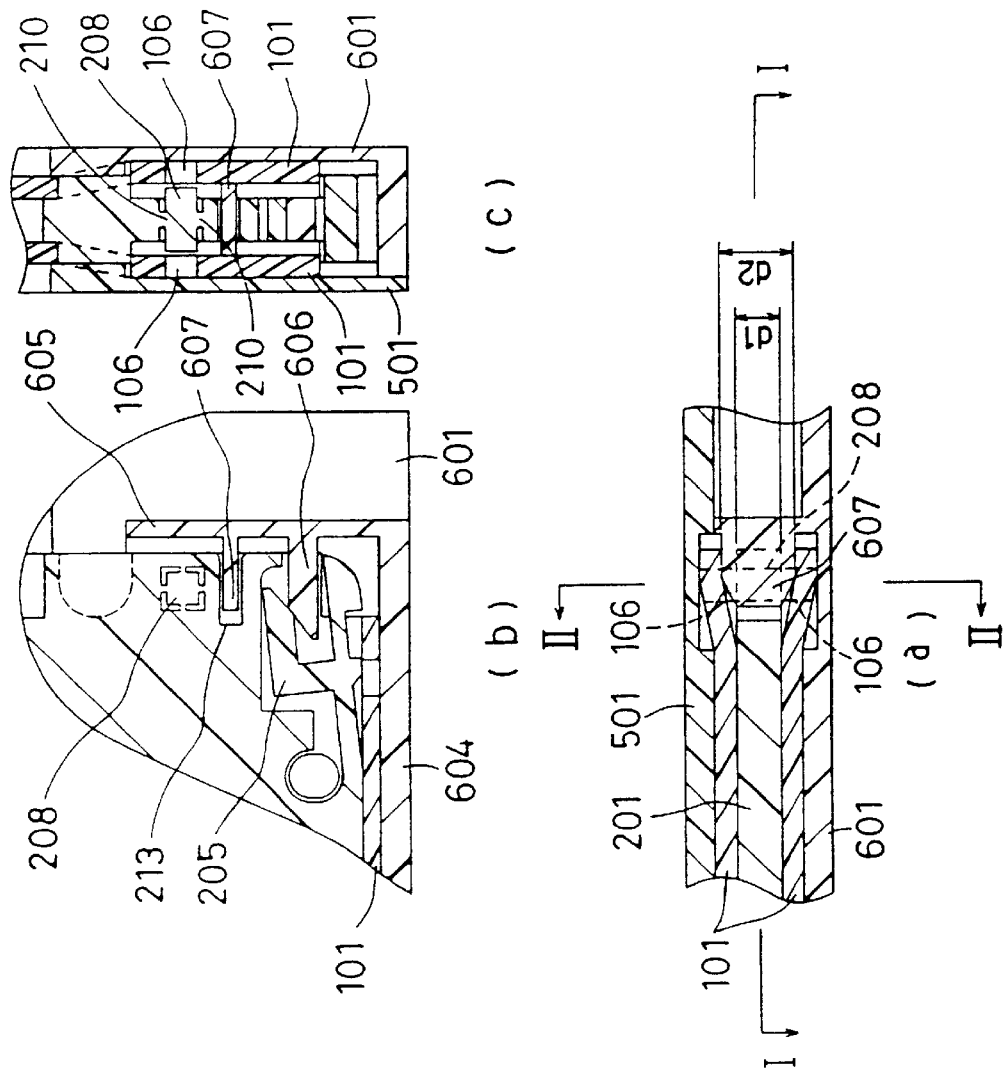
FIG. 20 shows partially enlarged views for explaining an operating state of a third unlocking means of the adapter according to the third embodiment.

FIG. 20 shows partially enlarged views for explaining an operating state of the third unlocking means of the present invention. FIG. 20(a) is a partial cross-sectional view taken on. a plane that is perpendicular to a disk surface and passes through the center of the third unlocking projection 607. FIG. 20(b) is a cross-sectional view taken on line I—I in the arrow direction of FIG. 20(a). FIG. 20(c) is a cross-sectional view taken on line II—II in the arrow direction of FIG. 20(a).

The third unlocking projection 607 is positioned on the contact wall 605 and at the position where the third unlocking projection 607 fits into a concave part 213 formed in the vicinity of the third locking means on the end face of the opening/closing cover 201 when a disk cartridge is inserted into the insertion portion 602. The third unlocking projection 607 has a slope formed so that its point is narrower than its bottom as shown in FIG. 20(a). More particularly, the third unlocking projection 607 is formed so that a width d1 of the point in the direction perpendicular to the disk surface is narrower than the distance between the inner walls of the case body 101, and a width d2 of the bottom is wider than a length of the lock key 208. Therefore, when the disk cartridge is inserted into the insertion portion 602, the point of the third unlocking projection 607 is inserted into the concave part 213. When the disk cartridge is further inserted, the inner walls of the case body of the disk cartridge are elastically deformed by the bottom of the third unlocking projection 607 so as to increase the distance between the inner walls. In this case, the distance between the pair of locking holes 106 formed in the vicinity of the concave part 213 of the case body 101 also is increased and exceeds the length of the lock key 208 at last. Consequently, the engagement between the locking holes 106 and the lock key 208 is released, thus unlocking the third locking means (see FIGS. 20(a) and (c)).

As described above, the third locking means is unlocked by the third unlocking means utilizing the elastic deformation of the case body 101. Therefore, the unlocking does not cause disconnection of the connecting portions 210 connecting the lock key 208 and the opening/closing cover 201, resulting in the unlocking in a reversible manner.

Next, a means for preventing erroneous insertion of the disk cartridge according to the third embodiment of the present invention will be explained.

It is preferable that a means for preventing erroneous insertion of the disk cartridge is provided for the adapter of the present invention. When the means is provided for the adapter, a user cannot insert the disk cartridge with wrong orientation at all or the disk cartridge cannot be inserted to a predetermined position even when being inserted to some extent. Thus, the insertion with wrong orientation can be found easily.

The means for preventing erroneous insertion of the disk cartridge into the adapter according to the present embodiment is formed of an erroneous-insertion preventing projection 607 and the concave part 213. The projection 607 is formed on the contact wall 605 at an asymmetrical position with respect to the center line of the disk cartridge in the insertion direction into the adapter. The concave part 213 is formed on the leading end face in the insertion direction of the disk cartridge so that the projection 607 fits into the concave part 213 when the disk cartridge is inserted with correct orientation.

In the present embodiment, the erroneous-insertion preventing projection 607 also has a function as the third unlocking projection 607 described above. However, needless to say, those may be provided separately.

When the disk cartridge is inserted into the insertion portion 602 with correct orientation, the erroneous-insertion preventing projection 607 formed inside the insertion portion of the adapter is engaged with the concave part 213 formed on the leading end face of the disk cartridge in its insertion direction, thus securing the insertion of the disk cartridge to the predetermined position in the adapter (FIG. 16).

On the other hand, when the disk cartridge is inserted into the adapter upside down, the insertion of the disk cartridge is possible to some extent. However, the erroneous-insertion preventing projection 607 formed inside the insertion portion of the adapter comes into contact with the leading end face of the disk cartridge in its insertion direction. Therefore, the disk cartridge cannot be inserted any further. Thus, a user can easily recognize the insertion with wrong orientation.

In the example described above, the erroneous-insertion preventing projection is formed at an asymmetrical position with respect to the center line of the disk cartridge in its insertion direction. However, the erroneous-insertion preventing means is not limited to this. For example, the erroneous-insertion preventing projection may be formed in an asymmetrical shape with respect to the center line in the insertion direction.

Next, an opening/closing-cover holding means of the adapter according to the third embodiment of the present invention will be explained.

The opening/closing-cover holding means of the present invention has a function of retaining the opening/closing cover 201 inside the insertion portion 602 of the adapter after the release of the engagement with the case body 101 by the first unlocking means and the third unlocking means described above and maintaining the opening/closing cover 201 at the predetermined position inside the insertion portion 602 even after the case body 101 has been drawn out.

As shown in FIGS. 13 and 14, the opening/closing-cover holding means comprises an opening/closing cover holding plate 701 that has holding hooks 702 and is maintained in the lower case 601 movably to the right and left on the paper showing FIG. 13 via guide pins 608, and a tensile spring 703 that provides force to the plate 701 in one direction (in the right direction on the paper showing FIG. 13) by its elasticity. The holding hooks 702 are provided at positions corresponding to the hooks 214 (see FIG. 3) formed on the end face of the opening/closing cover 201 when the disk cartridge is inserted into the insertion portion 602. As shown in FIG. 13, the point of each holding hook 702 has a slope formed with an acute angle. Therefore, when the disk cartridge is inserted into the insertion portion 602, first the slopes of the points of the holding hooks 702 come into contact with the ends of the hooks 214 of the opening/closing cover 201. When the disk cartridge is further inserted, the slopes of the points of the holding hooks 702 move the plate 701 to the left on the paper showing FIG. 13. Then the plate 701 is pulled back by the tensile spring 703, and thus the holding hooks 702 and the hooks 214 engage with each other. Concurrently with this, both the first locking means and the third locking means are unlocked. Therefore, even if the case body 101 is withdrawn from the insertion portion 602 after that, the opening/closing cover 201 is retained inside the insertion portion 602 (FIG. 17).

It is desirable that the opening/closing cover 201 held by the above-mentioned plate 701 is maintained at a predetermined position inside the insertion portion 602 stably. In the case where the opening/closing cover 201 is freely movable inside the insertion portion 602, the opening/closing cover 201 comes into contact with the disk in some cases when the adapter is loaded in a drive unit and the disk is rotated. It also is desirable to maintain the relative position of the opening/ closing cover 201 and the lower case 601 invariably and constantly in order to secure the function of the second unlocking means described later. In order to realize this, the adapter according to the third embodiment has a means for holding the opening/closing cover stably.

As shown in FIGS. 13 and 14, the means for holding the opening/closing cover stably comprises a press-rotating member 711 that is held on the lower case 601 rotatably around a guide pin 608 as its rotation center, and a tensile spring 713 providing force to the press-rotating member 711 in one direction by its elasticity. Two pairs of each member are provided. The press-rotating member 711 has a press portion 712 at an end. When the disk cartridge is inserted into the insertion portion 602, the press portion 712 comes into contact with the end face of the opening/closing cover 201 and presses the opening/closing cover 201 with the tensile elasticity of the tensile spring 713 in the direction (in the upper direction on the paper showing FIG. 13) of removing the opening/closing cover 201 from the insertion portion 602. The opening/closing cover 201 is maintained stably at the predetermined position inside the insertion portion 602 by the pressure provided by the press portion 712 and the opening/closing-cover holding means (see FIGS. 17–19).

When the opening/closing cover 201 is drawn out together with the case body as described later, the means for holding the opening/closing cover stably, which will be explained in detail later, provides the effects that the unlocked state of the opening/closing-cover holding means can be recognized clearly and that the opening/closing cover 201 can be drawn out easily.

Next, the second unlocking means of the adapter according to the third embodiment of the present invention will be explained.

The second unlocking means is a required element for separating the opening/closing cover from the case body completely by preventing the second locking means from functioning in the disk cartridge of the first embodiment of the present invention having the second locking means.

As shown in FIGS. 13 and 14, the second unlocking means of the present invention comprise elastic bars 610 and second unlocking projections 609. The elastic bars 610 are formed continuously to the guide walls 604 and are connected to the lower case 601 indirectly via the guide walls 604. The second unlocking projections 609 are formed at the points of the elastic bars 610 so as to have a projection toward the insertion portion 602.

Since the second unlocking projections 609 project toward the insertion portion 602, the second unlocking projections 609 come into contact with side walls of the case body 101 of a disk cartridge when the disk cartridge is inserted. Thus, the elastic bars 610 are elastically deformed so as to move away from the insertion portion 602. As shown in FIG. 16, the second unlocking projections 609 are formed at positions opposing the second locking projections 207 formed in the opening/closing cover 201 via the side walls of the case body 101 when the opening/closing cover 201 is stably maintained by the opening/closing-cover holding means.

After that, when the case body 101 is withdrawn from the insertion portion 602 in the state in which the opening/ closing cover 201 is maintained by the opening/closing-cover holding means, the second unlocking projections 609 fit into the locking holes 105 that are formed in the side walls of the case body 101 (FIG. 17). At the same time, the second locking projections 207 formed in the opening/closing cover 201 also are apt to fit into the locking holes 105. However, it is designed so that the elastic restoring moment of the elastic bars 610 is stronger than that of the disk holding members 202 of the opening/closing cover. Therefore, since the second locking projections 207 are pushed by the second unlocking projections 609, the second locking projections 207 cannot fit into the locking holes 105. Each second unlocking projection 609 has slopes on both sides in the moving direction of the locking holes 105 as shown in the figure. Therefore, when the case body 101 is further pulled from the insertion portion 602 in this state, the slopes of the second unlocking projections 609 come into contact with the edges of the locking holes 105. Thus, the elastic bars 610 are elastically deformed, and the second unlocking projections 609 are moved so as to escape to the outside of the insertion portion 602. Therefore, the case body 101 can be drawn out from the insertion portion 602 successively.

As described above, the second unlocking means acts so as to prevent the second locking means from functioning.

Next, the door 510 provided for the adapter according to the third embodiment of the present invention will be explained.

It is preferred to provide the door 510 that closes the opening of the insertion portion 602 to prevent the ingress of dust and to prevent the accommodated disk from falling off accidentally after loading the disk 10 into the adapter 500 and drawing out the case body 101 as described above.

In this case, when the door 510 can be closed even if a user forgets to draw out the case body 101 after inserting the disk cartridge into the insertion portion 602, i.e. even in the state shown in FIG. 16, it is possible for the user to load the adapter into a drive unit without drawing out the case body accidentally. In this case, it is possible that a head of the drive unit, a disk drive unit, and the like bump into the case body 101 and a shutter 181 that are left in the insertion portion, thus damaging the drive unit, the adapter, the case body, the disk, and the like.

Therefore, it is preferable that the door 510 has a configuration in which the door 510 cannot be closed when the case body 101 is inserted in the insertion portion 602. Further, it is more preferable that the door 510 is provided so that the external shape of the adapter 500 has compatibility with a corresponding disk cartridge in the state in which the door 510 is closed completely and so that the adapter 500 cannot be loaded into the drive unit when the door 510 is opened.

As shown in FIG. 14, the door 510 according to the present embodiment is provided pivotably upon a pivot 513 as the pivot center that is supported by the upper case 501 (not shown in FIG. 14) and the lower case 601. The door 510 comprises a door hook 511 and a contact surface 512. The door hook 511 is formed so as to hold the door 510 to the upper case 501 (not shown in FIG. 14) and the lower case 601 when the door 510 is completely closed. The contact surface 512 is formed so as to come into contact with a side face of the case body when the case body is inserted in the insertion portion 602.

Figure 19:
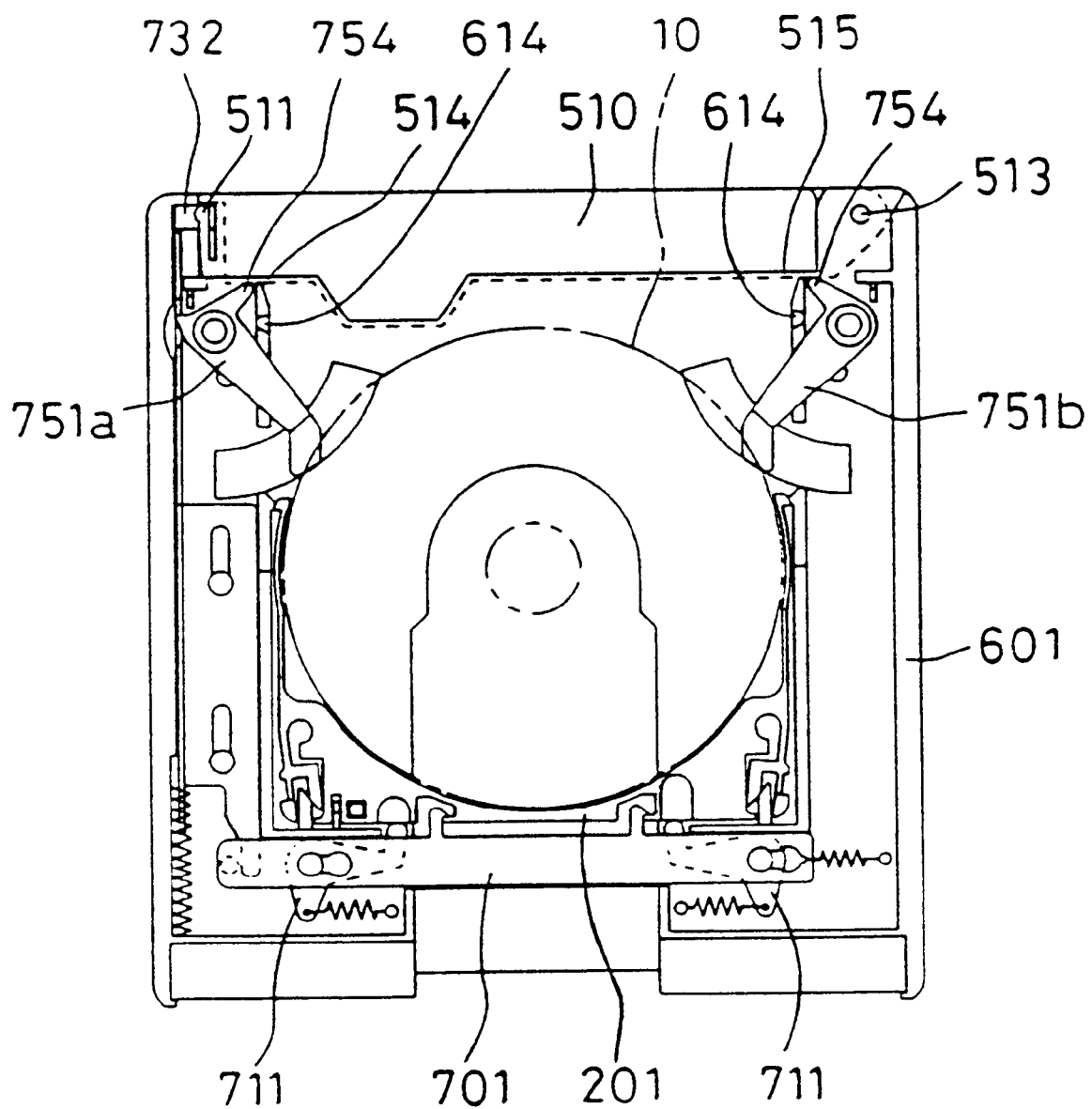
FIG. 19 is a schematic plan view showing a state in which the door is closed in the state shown in FIG. 18 (wherein the upper case and the shutter are removed so that the internal structure can be seen).

As shown in FIG. 19, after the disk 10 is accommodated in the adapter 500 and the case body is drawn out, the door 510 can be closed completely and the door hook 511 retains the door 510 to the upper case 501 (not shown in FIG. 19) and the lower case 601. Thus, the ingress of dust into the insertion portion 602 and accidental falling of the accommodated disk 10 can be avoided.

Figure 21:
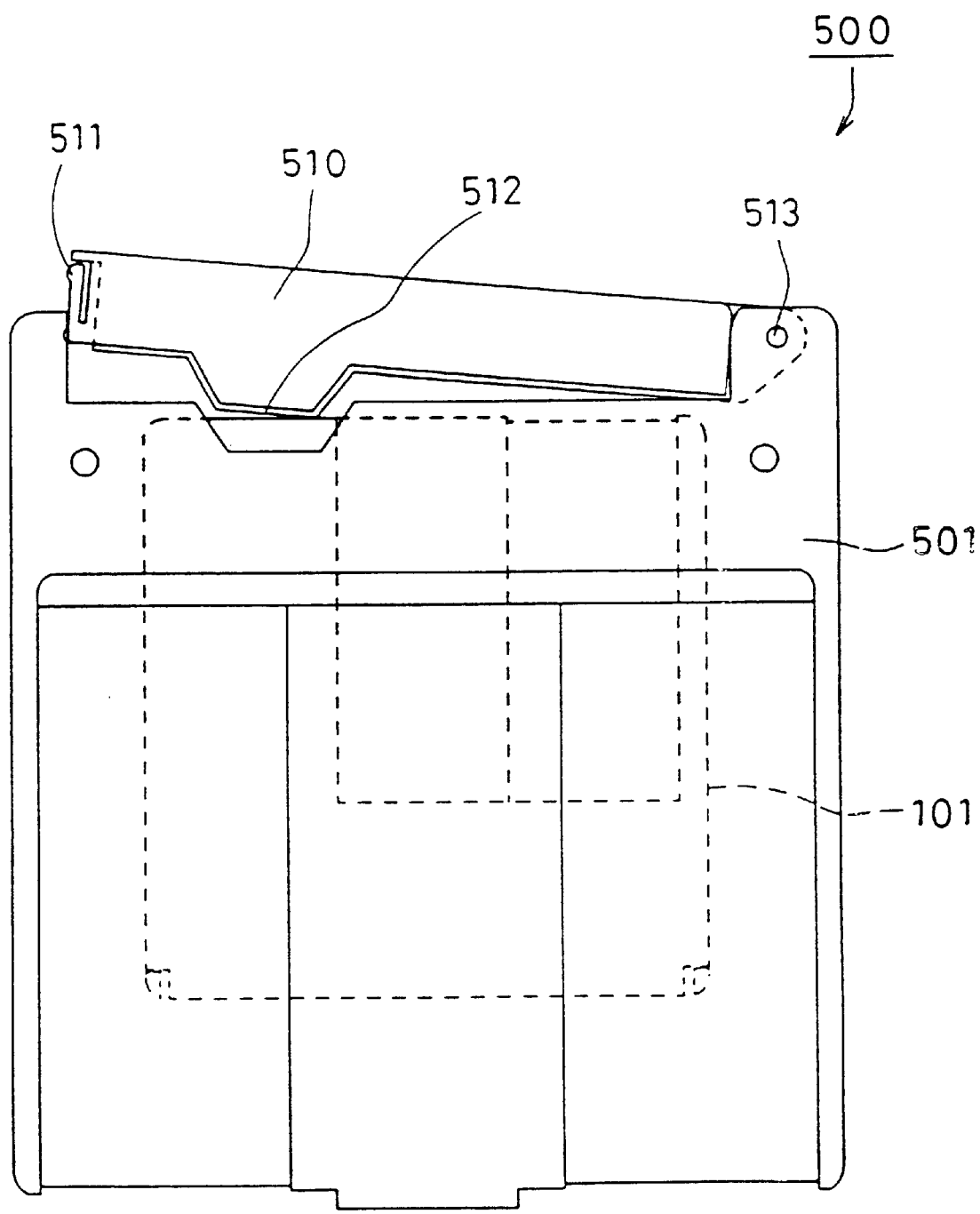
FIG. 21 is a schematic plan view showing a state in which the door is about to be closed while the case body is left inside the insertion portion in the adapter according to the third embodiment.

On the other hand, when the door 510 is closed while the case body 101 is left inside the insertion portion 602, the contact surface 512 comes into contact with one side face of the case body 101 and therefore the door 510 cannot be closed as shown in FIG. 21. Thus, a user can notice that he has forgotten to draw out the case body 101. Further, when the door 510 cannot be closed completely, the compatibility in external shape with a corresponding disk cartridge cannot be secured. Therefore, under this state the adapter cannot be loaded in some drive units. Thus, the possibility of accidentally damaging the drive unit, the adapter, the case body, the disk, and the like can be avoided.

Moreover, it is preferable that the adapter of the present invention is formed so that the state inside the insertion portion 602, particularly at least a part can be identified from the outside. In this case, the existence of a disk inside the insertion portion 602, the type of the disk, and the like can be identified. As such an identification means, an identification window may be provided at a suitable position in the upper case 501 and/or the lower case 601, and a part of or the whole part of the upper case 501 and/or the lower case 601 may be formed of a transparent member.

Next, an outline of a method of ejecting a disk accommodated in the adapter according to the third embodiment of the present invention will be explained.

The case body 101 is inserted into the insertion portion 602 (FIG. 17) after opening the door 510 (FIG. 18) from the state shown in FIG. 19. The disk 10 and the opening/closing cover 201 are inserted into the disk-storage portion 103 of the case body 101 sequentially. The case body 101 is inserted into the insertion portion 602 until the disk 10 and the opening/closing cover 201 are accommodated in the disk-storage portion 103 completely (FIG. 16).

When the opening/closing cover 103 is accommodated in the disk-storage portion 103 of the case body 101 completely, the first locking means of the disk cartridge is ready for functioning. That is to say, the locking holes 105 oppose the first locking projections 203 as described with reference to FIGS. 1–3. In the disk cartridge of the first embodiment having the third locking means, the third locking hole 106 opposes the third locking projection 209, thus making the third locking means ready for functioning.

In this condition, the engagement between the opening/closing cover 201 and the opening/closing-cover holding means is released by a means for releasing the opening/closing-cover holding means.

Thus, the first locking means and the third locking means operate, and the opening/closing cover 201 and the disk 10 can be removed to the outside together with the case body 101 (FIG. 15).

The configuration and function of the above will be explained sequentially as follows.

First, a means for releasing the opening/closing-cover holding means of the adapter according to the third embodiment of the present invention will be explained.

The means for releasing the opening/closing-cover holding means is used for releasing the engagement between the opening/closing cover 201 and the opening/closing-cover holding means, i.e. the engagement between the hooks 214 of the opening/closing cover 201 and the holding hooks 702 of the opening/closing cover holding plate 701. The means for releasing the opening/closing-cover holding means is used for drawing out the opening/closing cover from the adapter of the present invention having the opening/closing-cover holding means and is a required element in the adapter of the present invention.

As shown in FIGS. 13 and 14, the means for releasing the opening/closing-cover holding means comprises a bar 731 releasing the opening/closing cover holding means, a compression coil spring 735, and a release pin 704. The bar 731 is held to the lower cover 601 by two guide pins 611 fixed to the lower cover 601 and two fixing rings 612 so as to be movable up and down on the paper showing FIG. 13. The compression coil spring 735 provides force to the bar 731 in one direction (upward on the paper showing FIG. 13) by its elasticity. The release pin 704 is provided at an end of the plate 701.

At one end of the bar 731, an operating lever 732 is provided. When the door 510 is closed, the operating lever 732 is housed in the inside surrounded by the door 510, the upper case 501, and the lower case 601 (FIG. 19). Therefore, a user cannot touch the operating lever 732. On the other hand, when the door 510 is opened, the operating lever 732 is exposed through the opening of the insertion portion 602. Therefore, a user can operate the operating lever (FIG. 18). Further, in a normal condition a part of the operating lever 732 is in contact with a part of the inner wall of the lower cover 601 with the bar 731 being pressed and fixed by the elasticity of the compression coil spring 735.

At the other end of the bar 731, a slope guide 733 is formed. The slope guide 733 is formed so as to come into contact with the release pin 704 provided at an end of the opening/closing cover holding plate 701 when a user operates the operating lever 732 to push the bar 731 in a longitudinal direction (downward on the paper showing FIG. 13).

The means for releasing the opening/closing-cover holding means is operated as follows.

Figure 22:
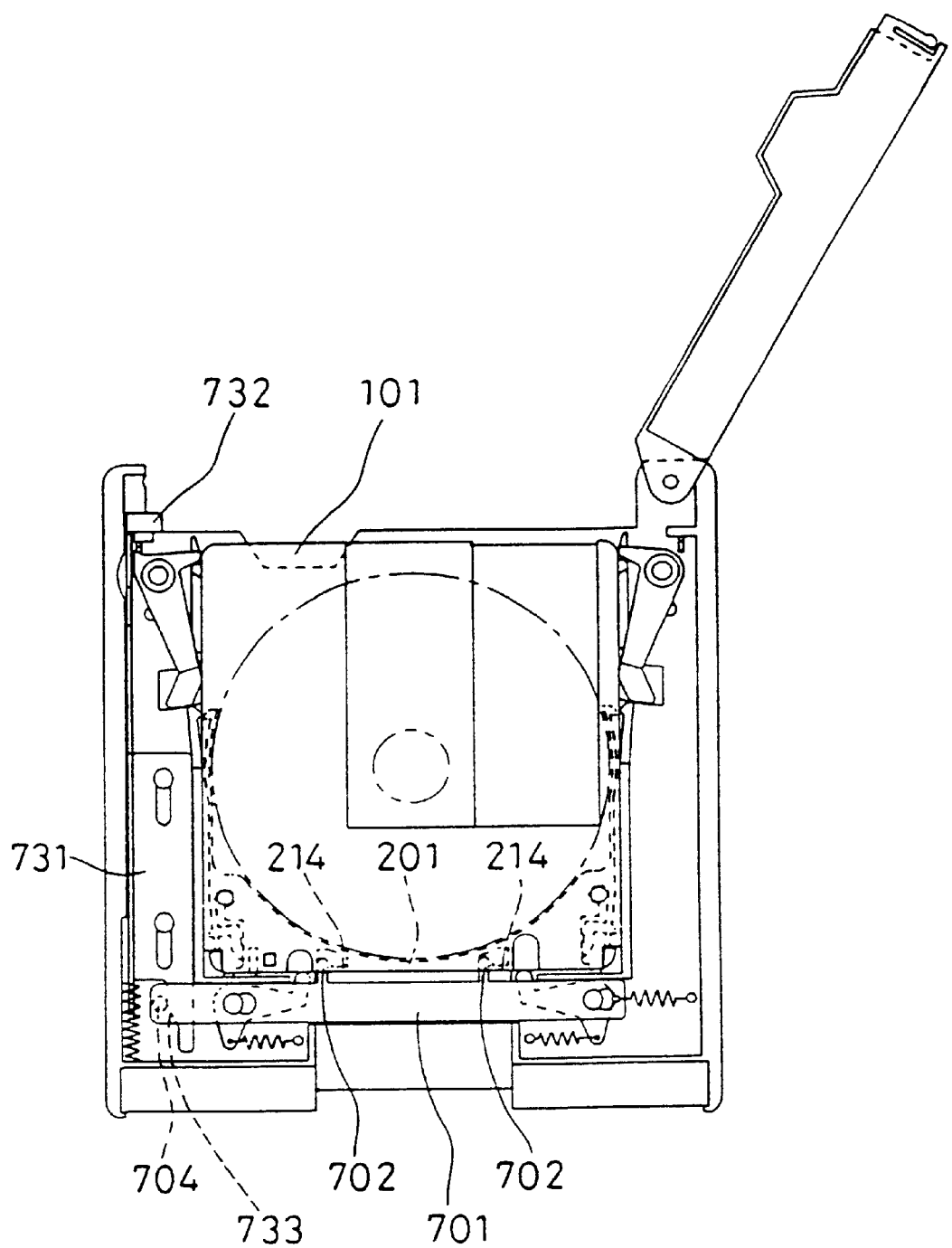
FIG. 22 is a schematic plan view showing an operating state of a means for releasing the opening/closing-cover holding means of the adapter according to the third embodiment (wherein the upper case and the shutter are removed so that the internal structure can be seen).

The operating lever 732 of the bar 731 is operated so as to be forced downward on the paper showing FIG. 16 when the opening/closing cover 201 is inserted into the disk-storage portion 103 of the case body 101 completely and the first locking means of the disk cartridge functions (FIG. 16). Then, as shown in FIG. 22, the slope guide 733 formed at the other end of the bar 731 comes into contact with the release pin 704 provided at an end of the plate 701, and the release pin 704 and the plate 701 combined with the release pin 704 are moved to the left on the paper showing FIG. 22. As a result, the engagement between the hooks 214 of the opening/closing cover 201 and the holding hooks 702 of the plate 701 is released.

In the adapter of the present embodiment, due to the above-mentioned means for holding the opening/closing cover stably, a user can clearly notice the above-mentioned operation of the means for releasing the opening/closing-cover holding means, and the disk cartridge can be drawn out further easily.

Before the release of the opening/closing-cover holding means, the opening/closing cover 201 is pressed and fixed by the press portion 712 of the press-rotating member 711 by the tensile elasticity of the tensile spring 713 with the opening/closing cover 201 being engaged with the holding hooks 702 of the opening/closing cover holding plate 701 (FIG. 16). Therefore, when the engagement between the hooks 214 of the opening/closing cover 201 and the holding hooks 702 of the plate 701 (FIG. 22) is released, the opening/closing cover 201 is pushed out from the insertion portion 602 in the ejection direction by the tensile elasticity of the tensile spring 713. Thus, the cartridge combined with the opening/closing cover 201 to be one component is moved to the ejection direction. Consequently, a user can notice the operation of the means for releasing the opening/closing-cover holding means, and the disk cartridge can be drawn out more easily since one end of the disk cartridge is exposed through the opening of the insertion portion 602.

When the engagement between the hooks 214 of the opening/closing cover 201 and the holding hooks 702 of the plate 701 is released and then the opening/closing cover 201 is pushed out from the insertion portion 602 to the outside, the hinges 204 of the opening/closing cover 201 recover their elasticity at the same time. Thus, the first locking projections 203 are engaged with the locking holes 105. In the disk cartridge of the first embodiment, the elastic deformation of the case body 101 around the third locking hole 106 is recovered, and thus the third locking projection 209 is engaged with the third locking hole 106. As a result, the case body 101 is combined with the opening/closing cover 201 to be one component, and they can be drawn out from the adapter 500.

On the other hand, when a user operates the means for releasing the opening/closing-cover holding means accidentally when the case body is not inserted in the insertion portion 602, i.e. in the state as shown in FIG. 18, there is a possibility that the user drops the exposed disk 10 from the insertion portion 602 accidentally. When the above-mentioned means for holding the opening/closing cover stably has a strong ejection power, it also is possible that the disk 10 springs out from the insertion portion 602 with great force (the disk 10 has a small mass since the disk 10 is not accommodated in the case body), which is a bigger problem. Therefore, in such a case, it is desirable to provide a safety mechanism of prohibiting the operation of the means for releasing the opening/closing-cover holding means.

In this point of view, the adapter according to the present embodiment has a means for locking the means for releasing the opening/closing-cover holding means.

As shown in FIGS. 13 and 14, the means for locking the means for releasing the opening/closing-cover holding means of the present embodiment comprises a disk-positioning member 751a, a fixed pin 614, a torsion coil spring 760, and a notch 734. The disk-positioning member 751a is maintained pivotably upon a supporting axis 613 fixed to the lower case 601 as a pivot center and has a locking projection 756 at one end. The fixed pin 614 is fixed to the lower case 601 and regulates the pivot of the disk-positioning member 751a by the contact with a part of the disk-positioning member 751a. The torsion coil spring 760 is engaged with a spring hook 755 of the disk-positioning member 751a and the lower case 601 and presses and fixes the disk-positioning member 751a to the fixed pin 614 by its elasticity. The notch 734 is formed on one side of the bar 731 so as to engage with the locking projection 756 of the disk-positioning member 751a.

The operation of the means for locking the means for releasing the opening/closing-cover holding means with such a configuration will be explained.

Figure 23:
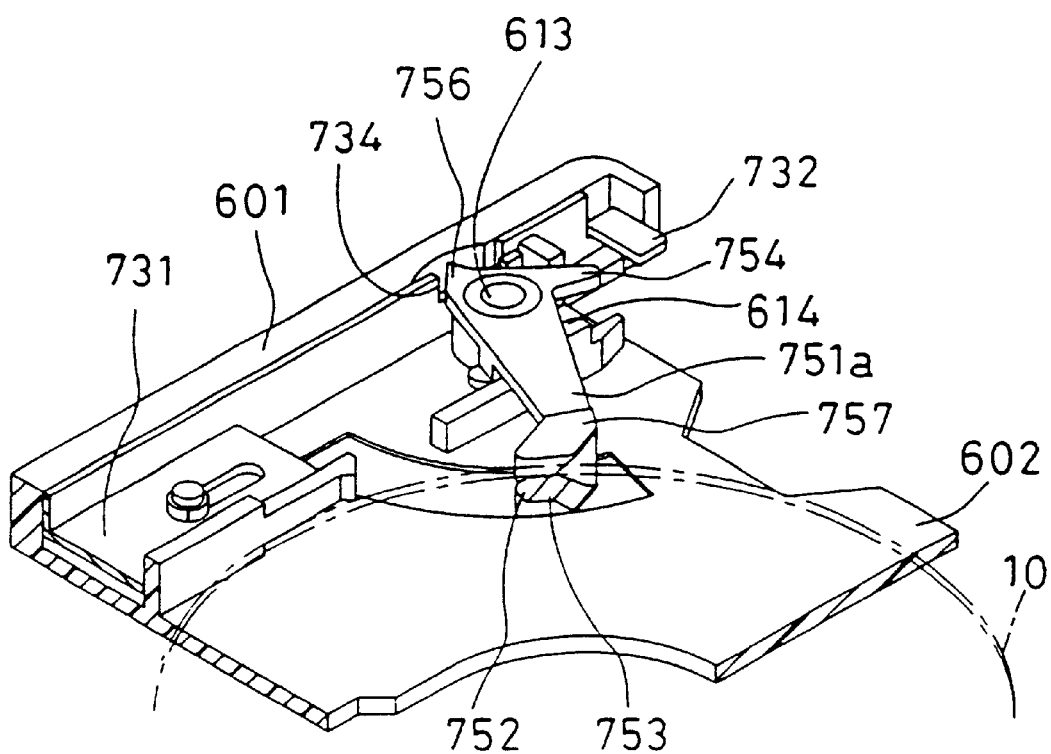
FIG. 23 is a partially enlarged perspective view showing a disk-positioning member with a door being opened in the adapter according to the third embodiment.
Figure 24:
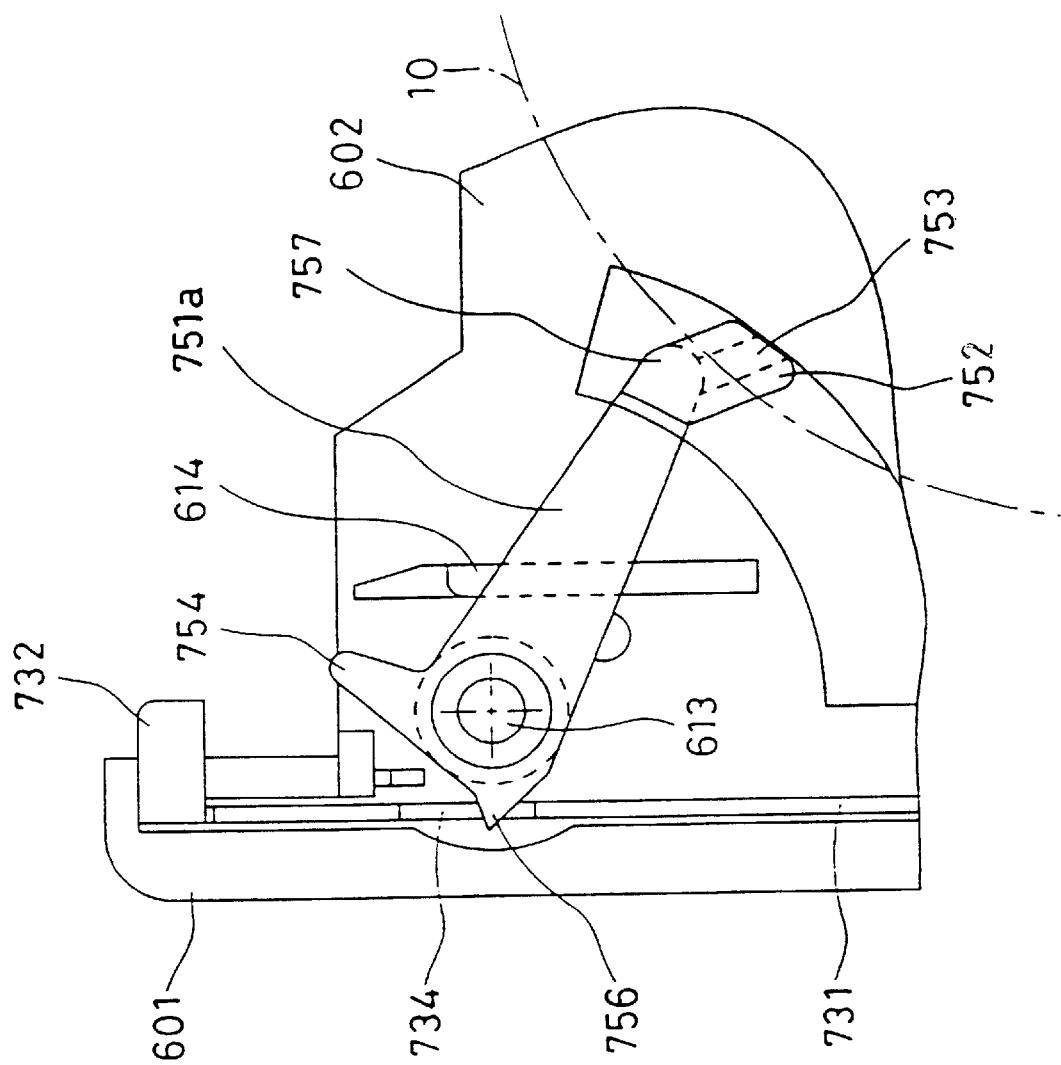
FIG. 24 is a partially enlarged plan view showing the disk-positioning member with the door being opened in the adapter according to the third embodiment.

As shown in FIG. 18, when the opening/closing cover 201 and the disk 10 are loaded into the adapter, the disk-positioning member 751a is pressed and fixed to the fixed pin 614 by the coil spring 760. FIG. 23 is a partially enlarged perspective view of the disk-positioning member 751a in this state. FIG. 24 is a plan view of the same. As shown in FIGS. 18, 23, and 24, in this case, the locking projection 756 of the disk-positioning member 751a is in the state in which the locking projection 756 enters the notch 734 formed on one side of the bar 731.

In this condition, suppose that a user pushed the operating lever 732 that is a means for releasing the opening/closing-cover holding means downward on the papers showing FIGS. 18 and 24. The bar 731 is moved to some extent, and then the edge of the notch 734 of the bar 731 comes into contact with the locking projection 756 of the disk-positioning member 751a.

Figure 25:
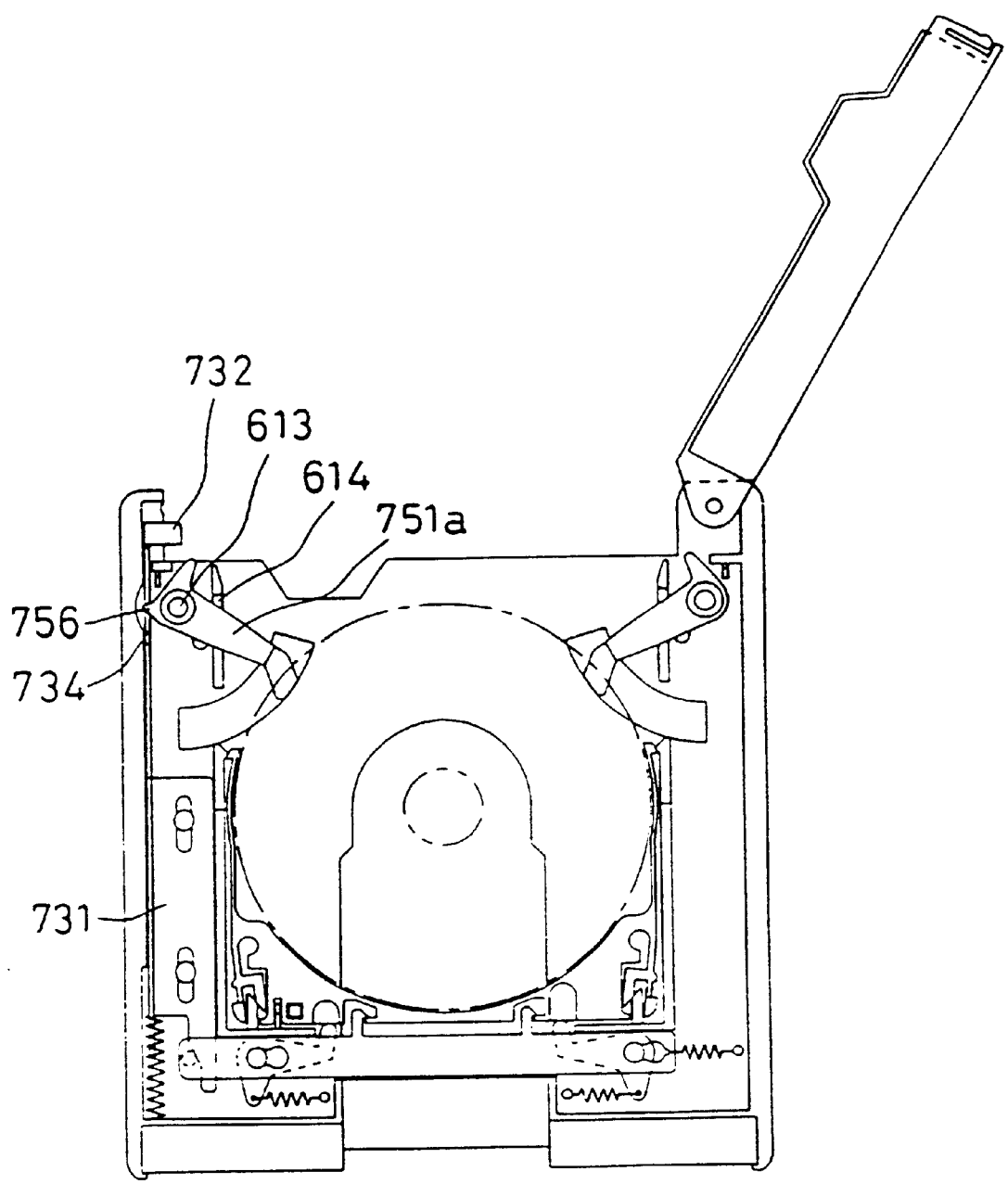
FIG. 25 is a schematic plan view showing an operating state of a means for locking the means for releasing the opening/closing-cover holding means of the adapter according to the third embodiment (wherein the upper case and the shutter are removed so that the internal structure can be seen).
Figure 26:
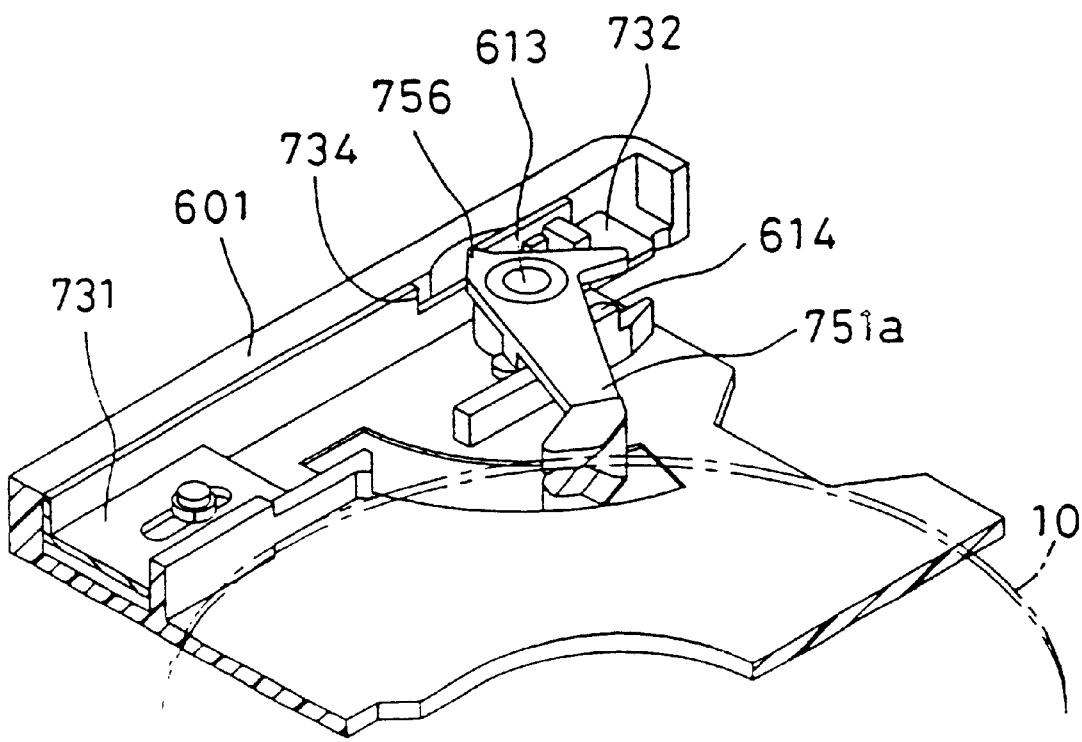
FIG. 26 is a partially enlarged schematic perspective view showing an operating state of the means for locking the means for releasing the opening/closing-cover holding means of the adapter according to the third embodiment.

FIG. 25 is a plan view showing a state in which the edge of the notch 734 of the bar 731 is in contact with the locking projection 756 of the disk-positioning member 751a and FIG. 26 is a partial perspective view of the same.

The edge of the notch 734 is apt to cause the disk-positioning member 751a to pivot counterclockwise in FIG. 25 upon a supporting axis 613 as the pivot center by the pushing force of a user. However, the disk-positioning member 751a cannot pivot, since the disk-positioning member 751a is in contact with the fixed pin 614. As a result, the bar 731 cannot move any further, which does not result in an operation of the means for releasing the opening/closing-cover holding means.

Thus, the possibility of the accidental operation of the means for releasing the opening/closing-cover holding means by a user when the case body is not inserted in the insertion portion 602 can be avoided.

When the case body 101 is inserted in the insertion portion 602, as shown in FIG. 16, the contact portion 757 formed on one end face of the disk-positioning member 751a is in contact with a side face of the case body 101. The disk-positioning member 751a pivots clockwise as shown in FIG. 16 upon the supporting axis 613 as the pivot center. As a result, the locking projection 756 of the disk-positioning member 751a is released from the notch 734. Thus, the means for locking the means for releasing the opening/closing-cover holding means does not function. Therefore, a user can eject the disk cartridge by operating the operating lever 732 of the bar 731.

Next, a disk-positioning means of the adapter according to the third embodiment of the present invention will be explain.

The disk-positioning means of the present invention is used for adjusting the position of the disk in its thickness direction so that the disk 10 can be surely inserted into the opening 102 of the case body when the case body 101 is inserted into the insertion portion 602 from the state in which the disk 10 is loaded in the insertion portion 602 of the adapter (FIG. 18). In view of the convenience in operation, it is preferred to provide the disk-positioning means.

As shown in FIGS. 13 and 14, the disk-positioning means of the present embodiment comprises disk-positioning members 751a and 751b, fixed pins 614, 614, and torsion coil springs 760, 760. The disk-positioning members 751a and 751b are maintained pivotably upon supporting axes 613, 613 as their pivot centers, respectively. The supporting axes 613 are formed at the both ends in the vicinity of the opening of the insertion portion 602 of the lower case 601. Each of the disk-positioning members 751a and 751b has a first positioning portion 752 formed at its one end so as to hold the disk from the both sides. The fixed pins 614, 614 are fixed to the lower case 601 and come into contact with respective parts of the disk-positioning members 751a and 751b, thus controlling the pivot of the disk-positioning members 751a and 751b. The torsion coil springs 760, 760 are retained by the spring hooks 755 of the members 751a, 751b and the lower case 602. The torsion coil springs 760, 760 press and fix the members 751a and 751b to the fixed pins 614, 614 by their elasticity. The disk-positioning means is provided at both ends in the vicinity of the opening of the insertion portion 602 respectively. However, with respect to the members having the same function, the both members are not differentiated from each other and are indicated with the same character in the explanation.

The operation of the disk-positioning means with such a configuration will be explained.

As shown in FIGS. 18, 23 and 24, when the opening/closing cover 201 and the disk 10 are loaded in the insertion portion 602 of the adapter, both the disk-positioning members 751*a* and 751*b* are pressed and fixed to the fixed pins 614 by the torsion coil springs 760, respectively. In this case, the first positioning portions 752 of the disk-positioning members 751*a* and 751*b* hold the peripheral end of the disk 10 from its both sides to adjust the position of the disk in its thickness direction. Therefore, when the case body 101 is inserted into the insertion portion 602 from this state, the disk 10 can be surely inserted into the opening 102 of the case body 101.

After the peripheral end of the disk 10 is inserted into the opening 102 of the case body 101, when the case body 101 is further inserted into the insertion portion 602, the contact portions 757 formed on respective one end faces of the disk-positioning members 751*a* and 751*b* come into contact with the side faces of the case body 101. Then, as shown in FIG. 17, the disk-positioning members 751*a* and 751*b* pivot clockwise and counterclockwise upon the supporting axes 613 as pivot centers respectively. As a result, the disk-positioning members 751*a* and 751*b* move away from the insertion portion 602.

In the disk-positioning means having the above-mentioned configuration, when the disk is accommodated into the adapter and the adapter is then loaded into a drive unit, the accommodated disk is required to be in a rotatable condition. Therefore, consideration should be given to the surface swing and the deviation from the center during the rotation. When the disk 10 is held by the first positioning portions 752 described above, there is a possibility of disturbing the rotation of the disk. On the other hand, considering this, "play" in holding the disk 10 with the first positioning portions 752 is provided too much, the region subject to the positioning in the thickness direction of the disk 10 is increased. Consequently, it becomes difficult to insert the disk. 10 into the opening 102 of the case body stably.

When the disk is accommodated in the adapter and the adapter is then loaded into the drive unit, it is preferable that the difference in position between the rotation center of the disk and the rotation axis of the drive unit is as small as possible.

Therefore, when loading the adapter into the drive unit, it is preferred to adjust the position of the accommodated disk by a positioning means that adjusts the position more gently than by the first positioning portion.

The adapter according to the present embodiment realizes this by second positioning portions 753 provided adjacent to the first positioning portions 752 of the disk-positioning members 751*a* and 751*b*.

The function of the second positioning portions will be explained as follows.

As shown in FIGS. 18, 23 and 24, the door 510 is closed with the disk 10 being held by the first positioning portions 752. Positioning projections 754 as contact members that come into contact with the door 510 are provided at the ends of the disk-positioning members 751*a* and 751*b*, respectively. The positioning projections 754 are formed so as to project toward the opening of the insertion portion 602. When the door 510 is closed, the contact faces 514 and 515 of the door 510 come into contact with the positioning projection 754 of the disk-positioning member 751*a* and with the positioning projection 754 of the disk-positioning member 751*b*, respectively. Thus, as shown in FIG. 19, the disk-positioning members 751*a* and 751*b* pivot slightly clockwise and counterclockwise upon the supporting axes 613 as pivot centers, respectively. When the door 510 is closed, the disk-positioning members 751*a* and 751*b* are elastically maintained by the elasticity of the torsion coil springs 760 with the positioning projections 754 being in contact with the contact faces 514 and 515 of the door 510, respectively.

Figure 27:
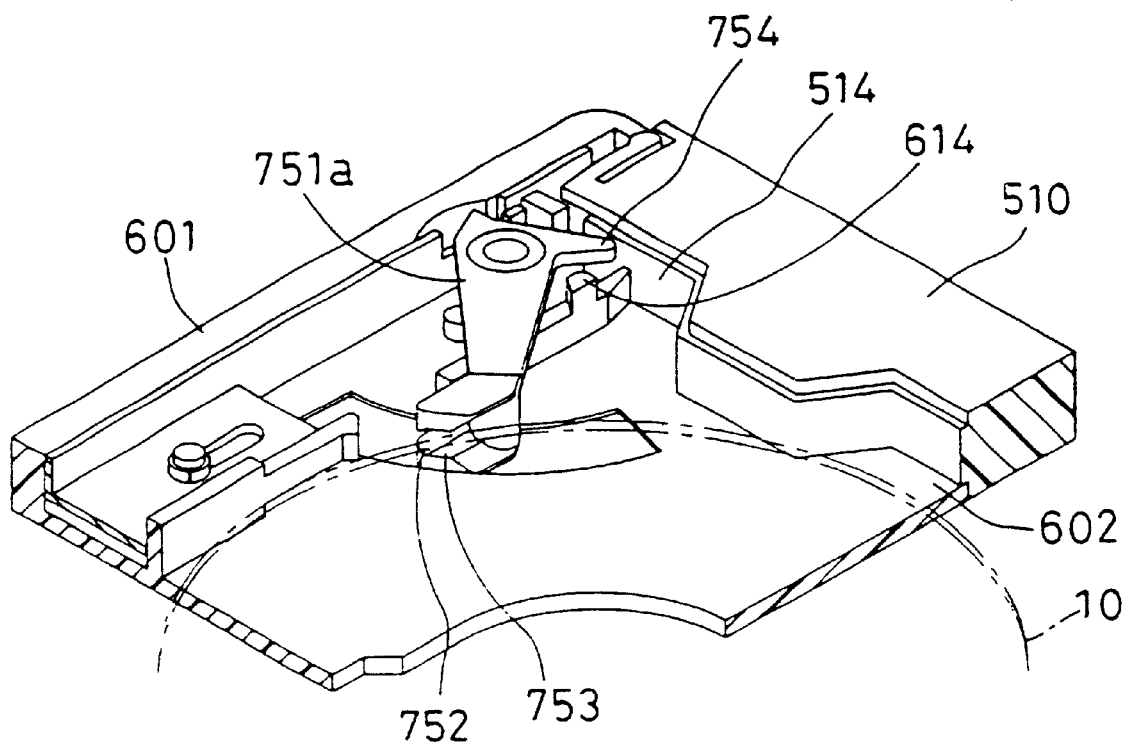
FIG. 27 is a partially enlarged perspective view showing the disk-positioning member with the door being closed in the adapter according to the third embodiment.
Figure 28:
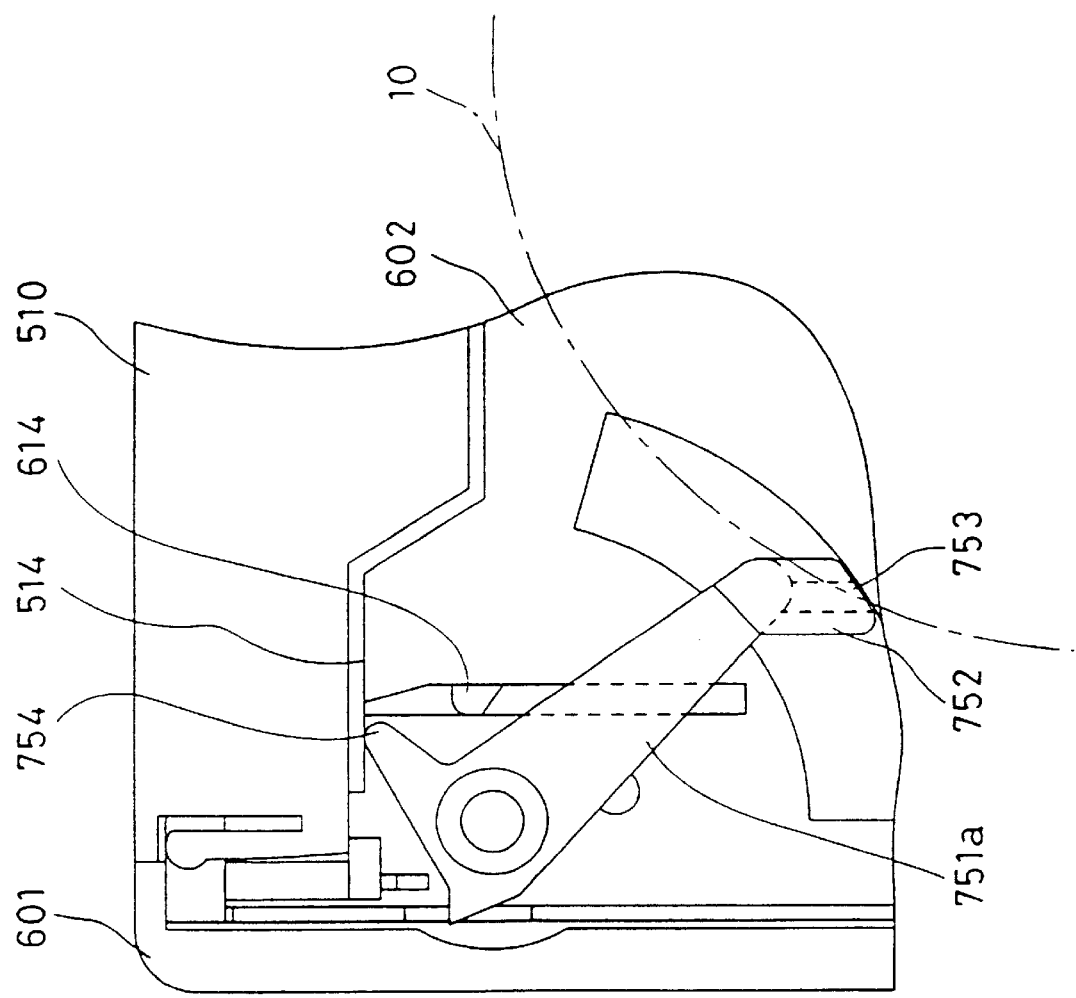
FIG. 28 is a partially enlarged plan view showing the disk-positioning member with the door being closed in the adapter according to the third embodiment.

FIG. 27 is a partial prospective view showing the state in which the door 510 is closed and the second positioning portion 753 of the disk-positioning member 751*a* holds the disk 10, and FIG. 28 is a plan view of the same. When the door 510 is closed, the first positioning portions 752 of the disk-positioning members 751*a* and 751*b* come apart from the disk 10, resulting in the state in which the disk 10 is positioned between the adjacent second positioning portions 753.

As is apparent from the comparison with FIGS. 23 and 24, the second positioning portions 753 hold the disk 10 with a larger gap in its thickness direction than that when the first positioning portions 752 do. Therefore, even if considering the surface swing and the deviation during the rotation of the disk that is loaded in a drive unit, there is no problem in rotating the disk. Moreover, since the position of the disk in the direction parallel to the disk surface is adjusted by the disk-positioning members 751*a* and 751*b* in addition to the opening/closing cover 201 including the disk holding members 202, the difference in position between the rotation center of the disk and the rotation axis of the drive unit when the disk is loaded into the drive unit can be maintained within a tolerance.

In the present embodiment, a part of the disk-positioning member 751*a* forming the disk-positioning means is designed so as to be a part of the component of the means for locking the means for releasing the opening/closing-cover holding means at the same time. Thus, the configuration can be simplified and the number of parts can be reduced. However, the configuration is not limited to this. Needless to say, both the means may be formed with different components separately.

In the adapter according to the third embodiment of the present invention, when the adapter is loaded into a drive unit, the shutter 503 is opened and a head of the drive unit passes the head access openings 502 and 603. Therefore, it is necessary that the adapter and the opening/closing cover loaded inside the adapter have shapes that secure a through area of the head respectively.

Figure 29:
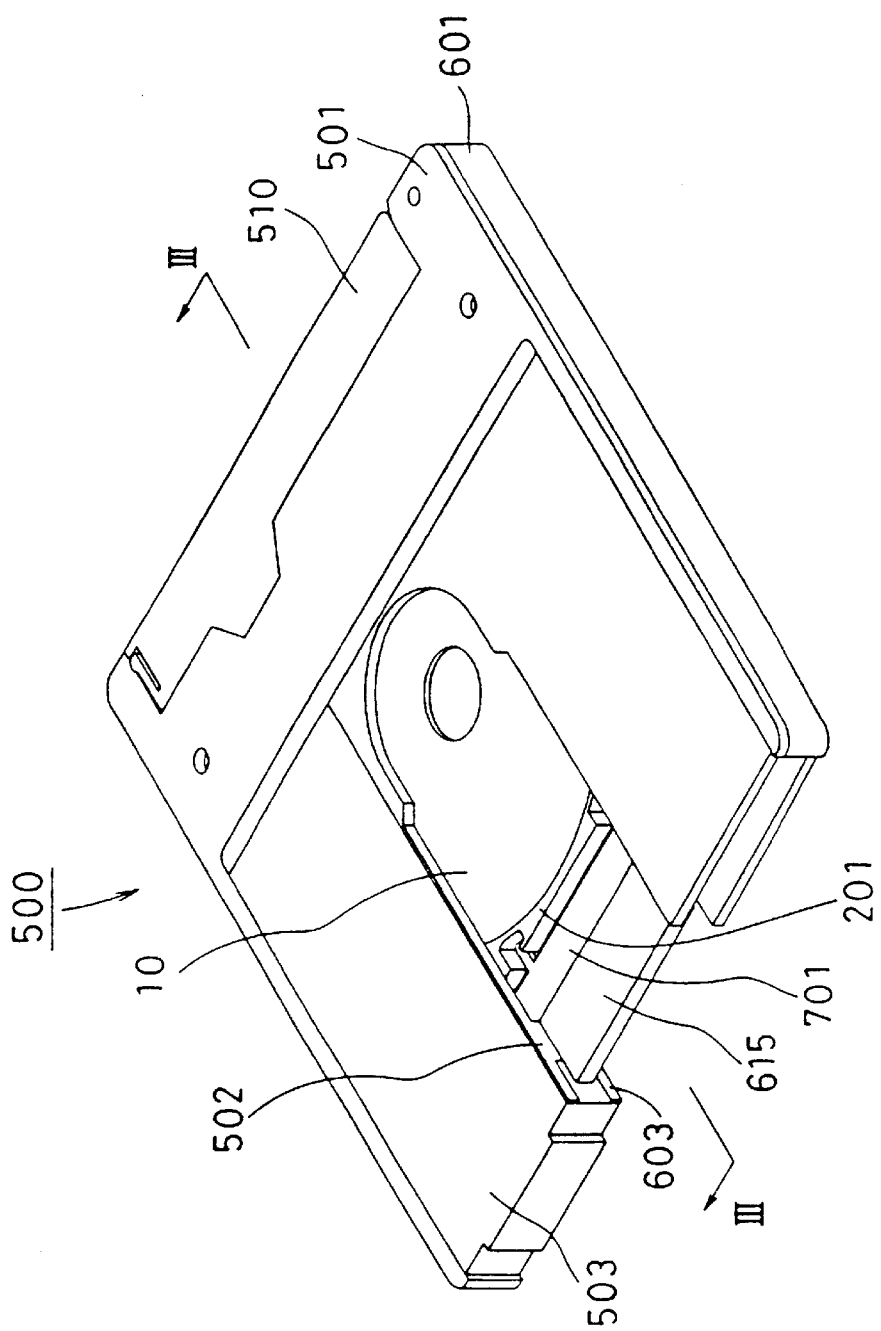
FIG. 29 is a schematic perspective view showing a state in which the opening/closing cover and a disk are accommodated in the adapter according to the third embodiment and the shutter is opened.
Figure 30:
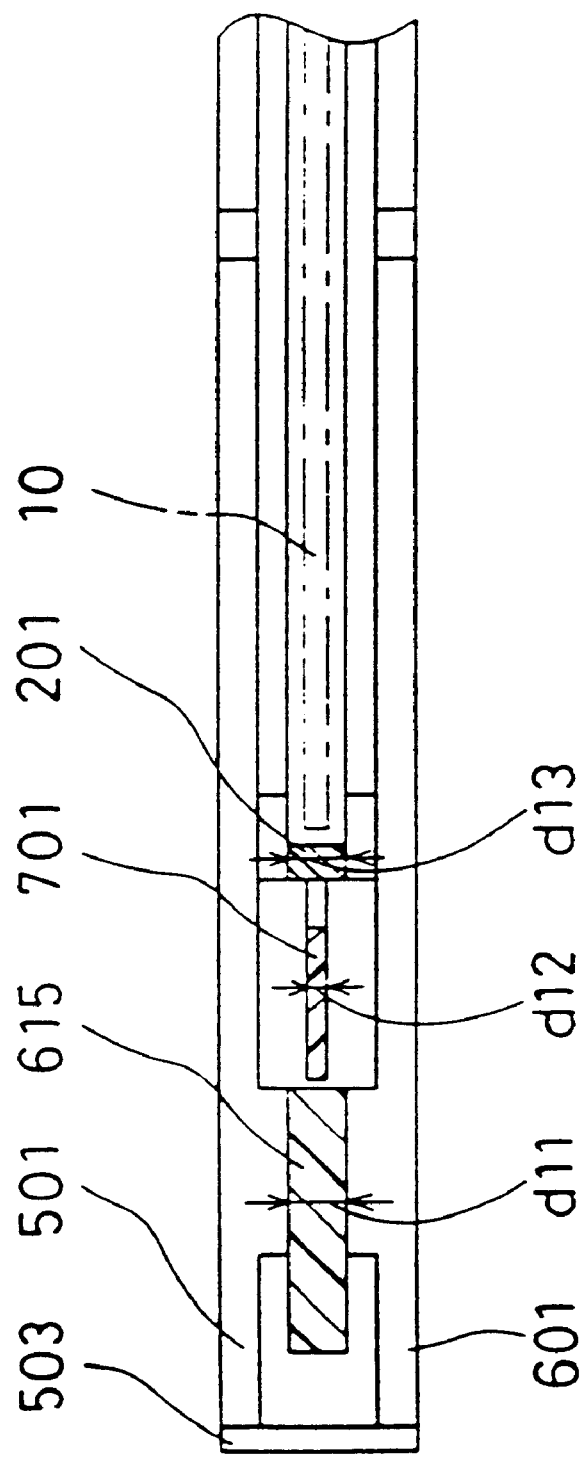
FIG. 30 is a partial cross-sectional view taken on line III—III in the arrow direction of FIG. 29.

FIG. 29 is a schematic perspective view showing the state in which the shutter 503 of the adapter 500 of the present embodiment accommodating the opening/closing cover 201 and the disk 10 is opened. FIG. 30 is a partial cross-sectional view taken on line III—III in the arrow direction of FIG. 29.

As shown in the figures, the adapter of the present embodiment has a bridging portion 615 within the head access openings 502 and 603. In order to allow the head to pass within the head access openings 502 and 603, the bridging portion 615 is formed so as to be thinner than the external surfaces of the upper case 501 and the lower case 601 and so as to be recessed from the both external surfaces. The thickness d11 of the bridging portion 615 that is recessed from both external surfaces is set so as to have the same thickness with the corresponding part of a disk cartridge having compatibility in external shape with the present adapter. The head of the drive unit is designed on the condition that the maximum thickness inside the head access openings 502 and 603 is d11. Therefore, it is preferable that both the thickness d12 of the opening/closing cover holding plate 701 and the thickness d13 of the opening/closing cover 201 are the same as or thinner than the thickness d11 of the bridging portion 615.

Fourth Embodiment

Next, a disk cartridge according to a fourth embodiment of the present invention will be explained.

Figure 31:
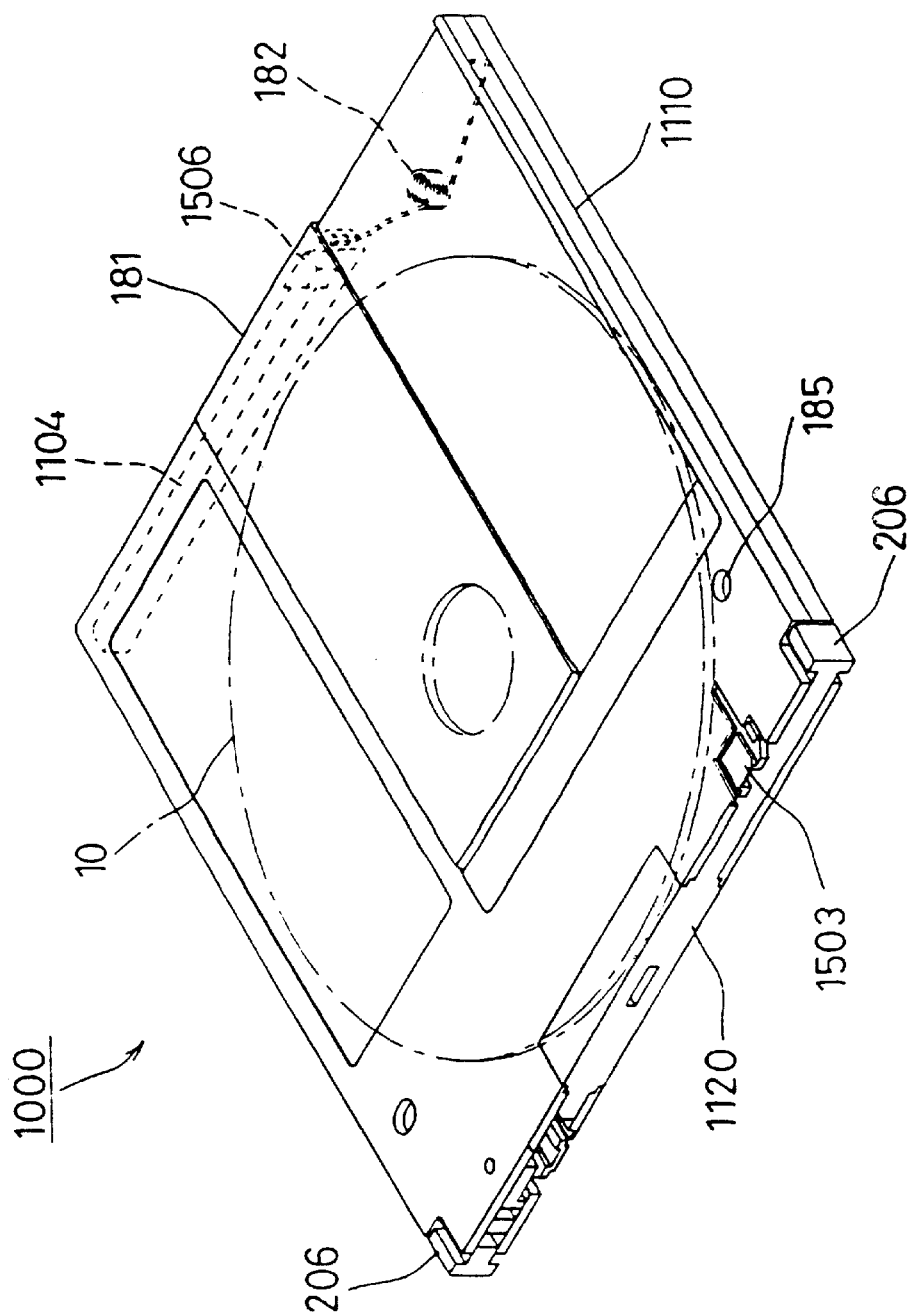
FIG. 31 is a schematic perspective view showing the appearance of a disk cartridge according to a fourth embodiment.
Figure 32:
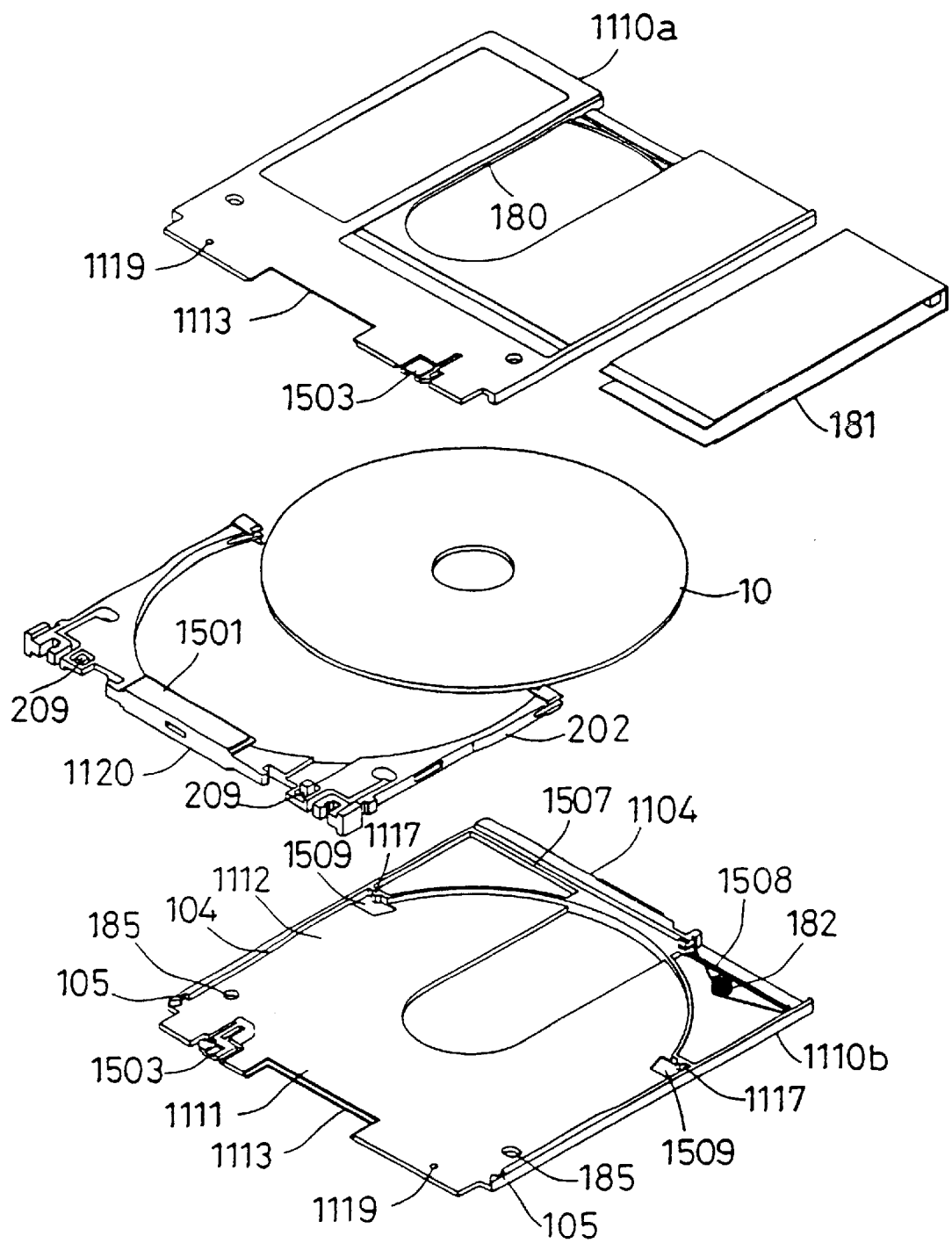
FIG. 32 is an exploded perspective view showing schematic shapes of the main components of the disk cartridge shown in FIG. 31.
Figure 33:
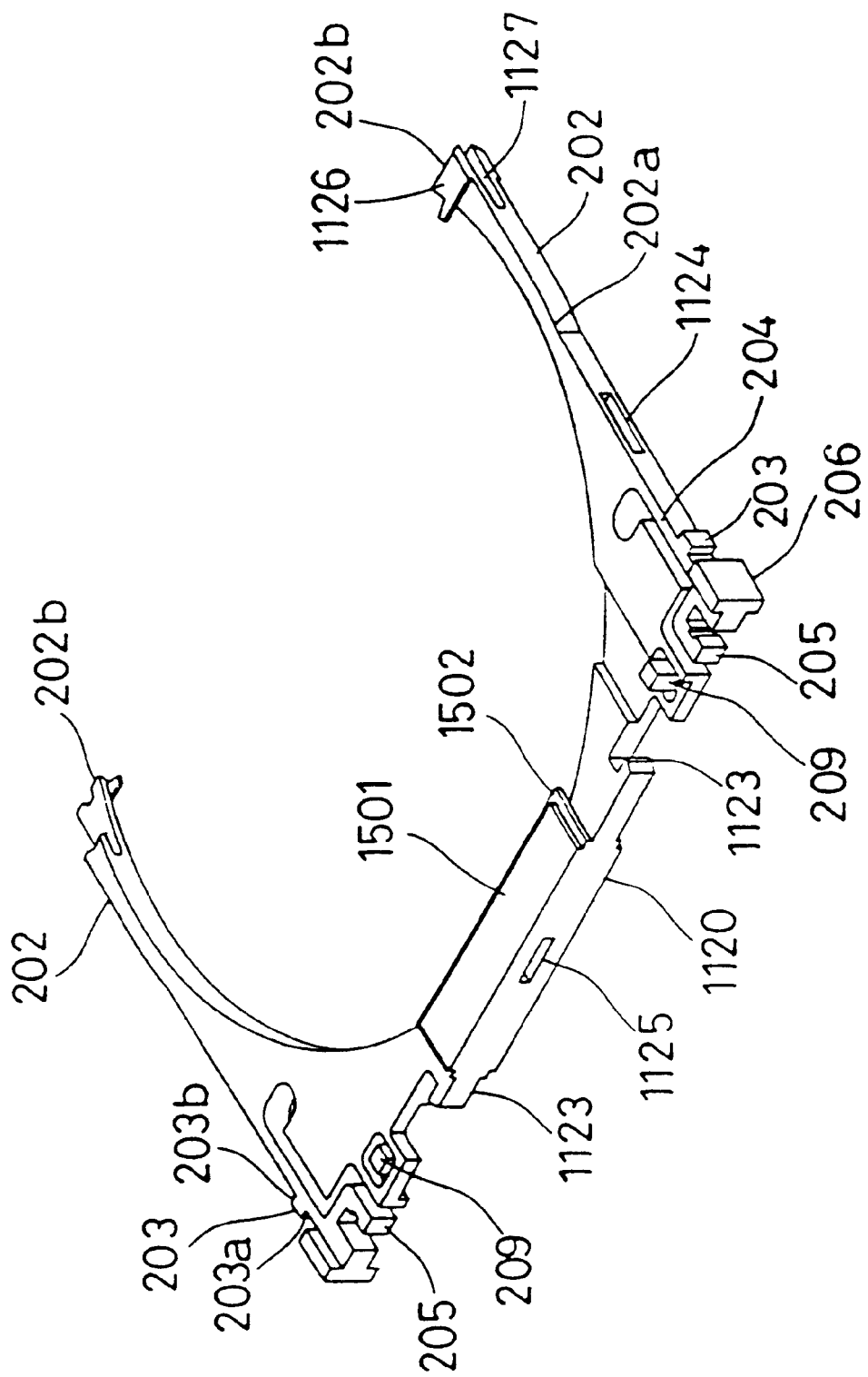
FIG. 33 is a perspective view showing a schematic shape of an opening/closing cover that is one of the components of the disk cartridge shown in FIG. 31.
Figure 34:
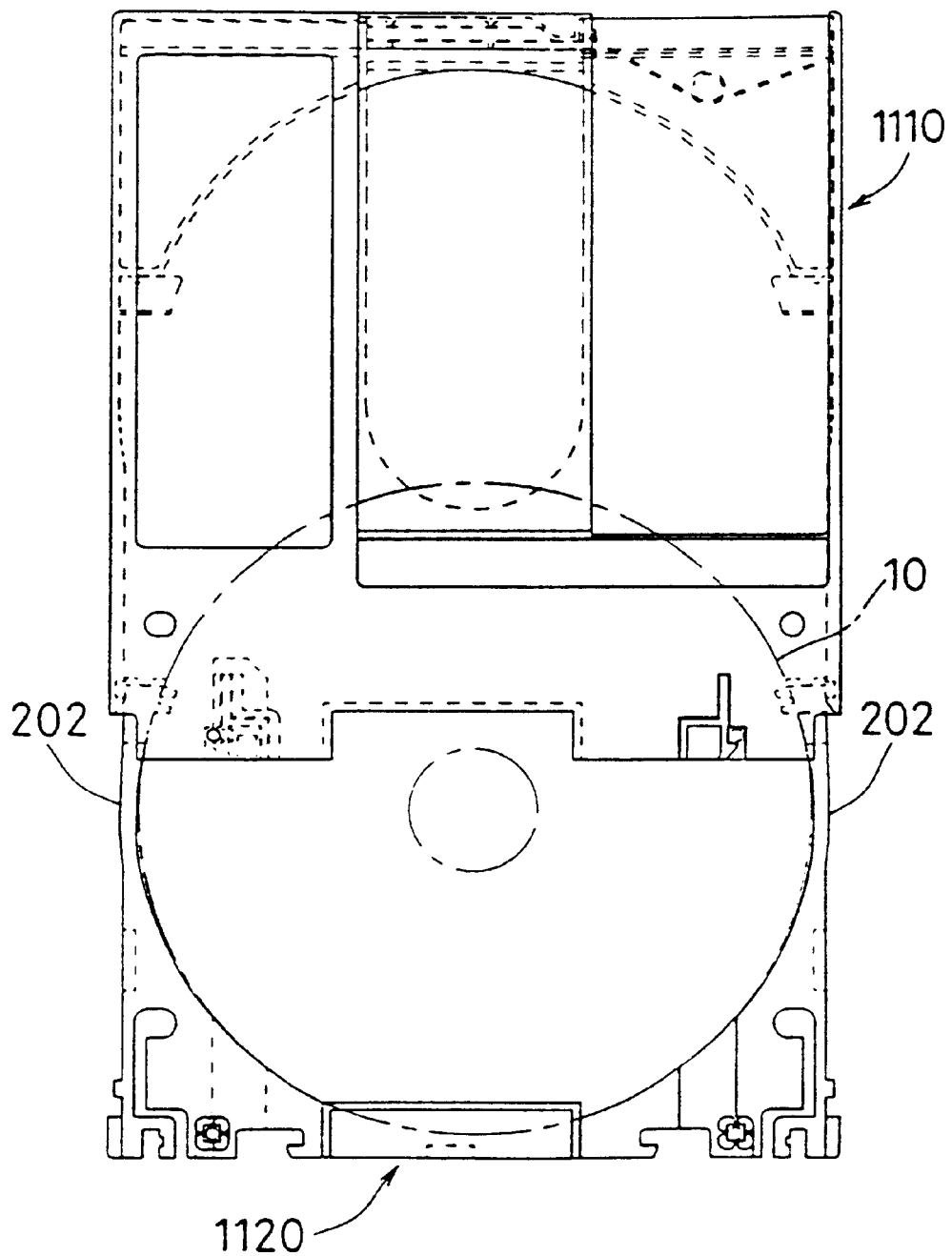
FIG. 34 is a schematic plan view showing the disk cartridge shown in FIG. 31 with a disk being held by a disk holding member during withdrawing its opening/closing cover.
Figure 35:
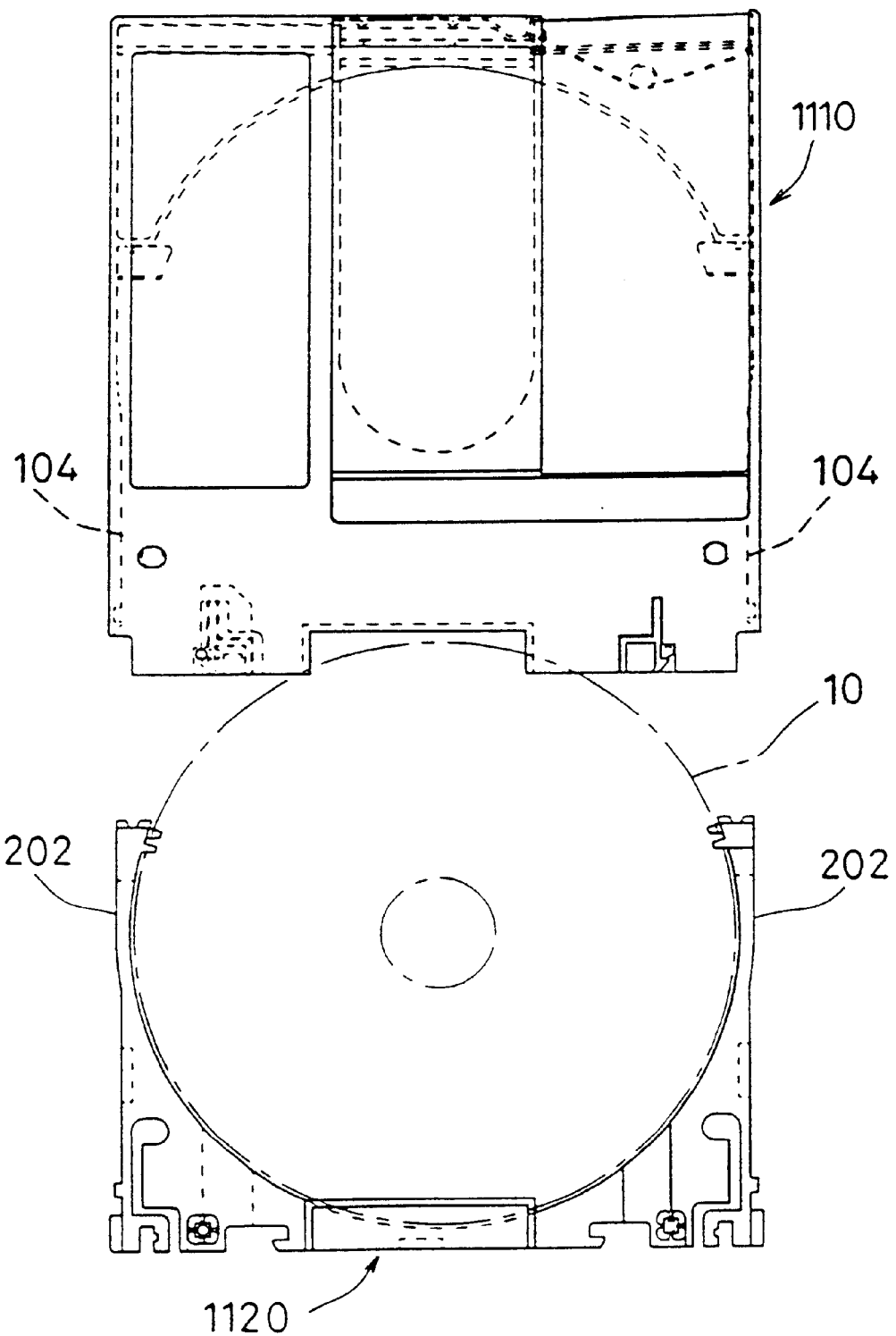
FIG. 35 is a schematic plan view showing the disk cartridge shown in FIG. 31 with its opening/closing cover being drawn out and with the disk being about to be removed from a case body.
Figure 36:
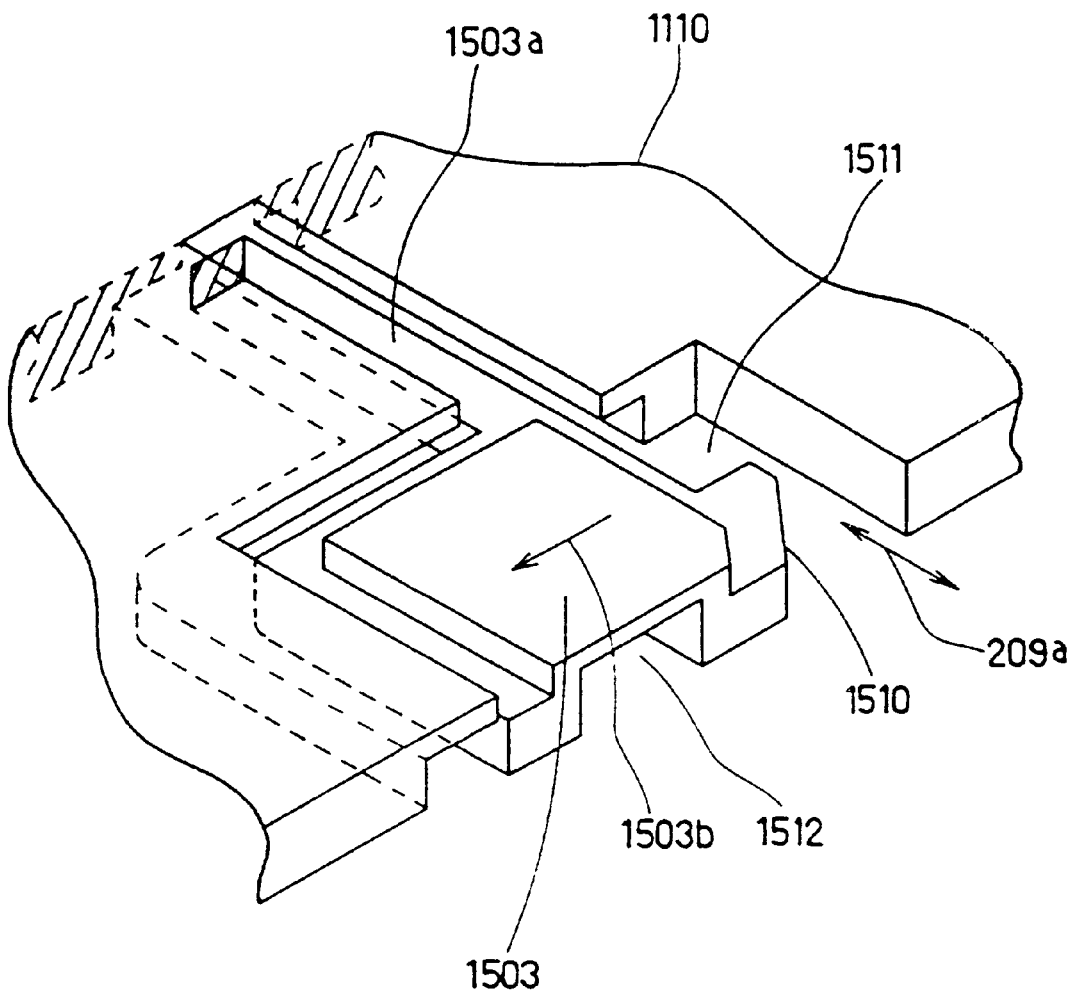
FIG. 36 is a perspective view showing a schematic shape of a movable piece of the case body of the disk cartridge shown in FIG. 31.
Figure 37:
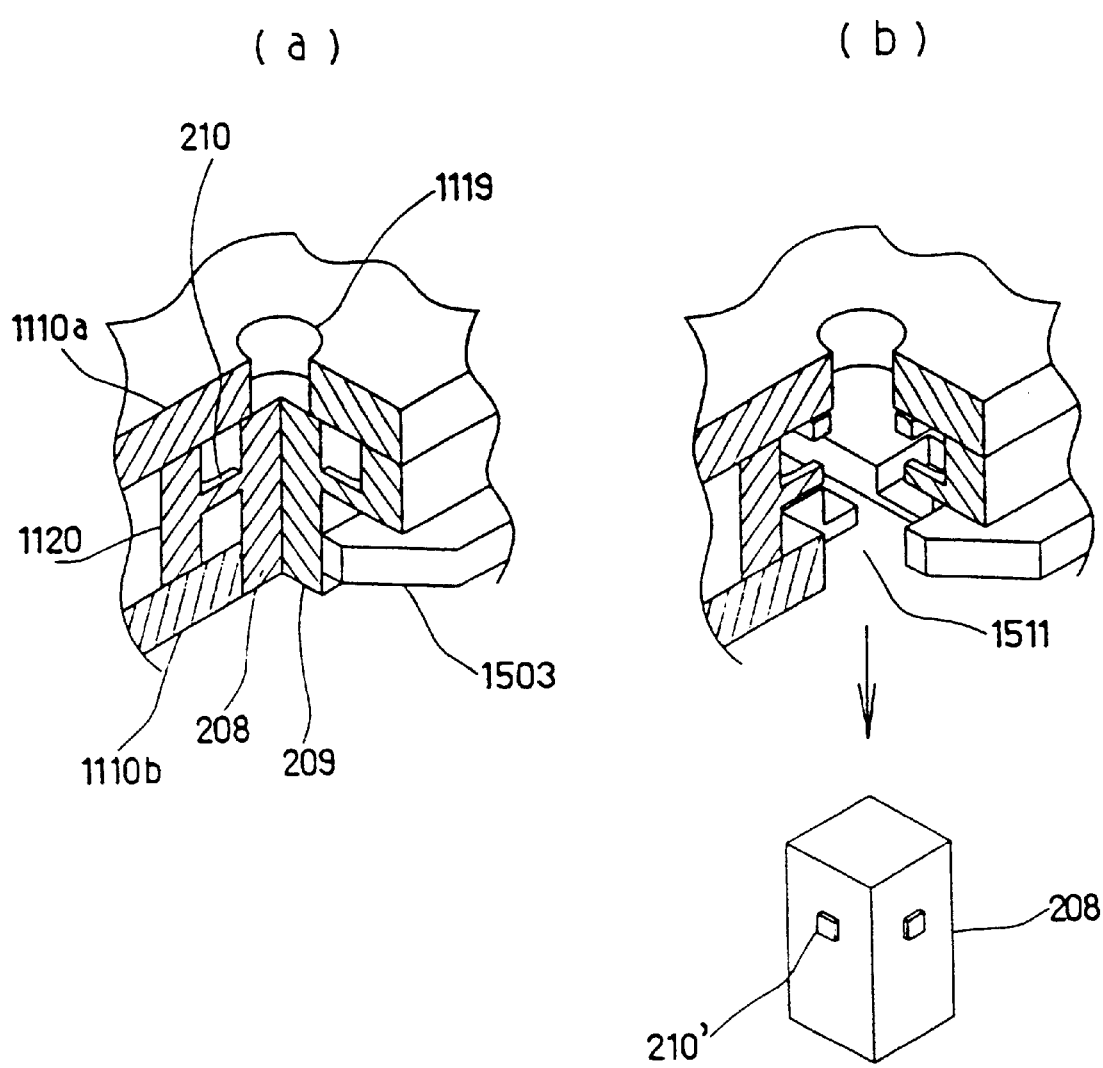
FIG. 37 shows cross-sectional perspective views illustrating a third locking means of the disk cartridge shown in FIG. 31.
Figure 38:
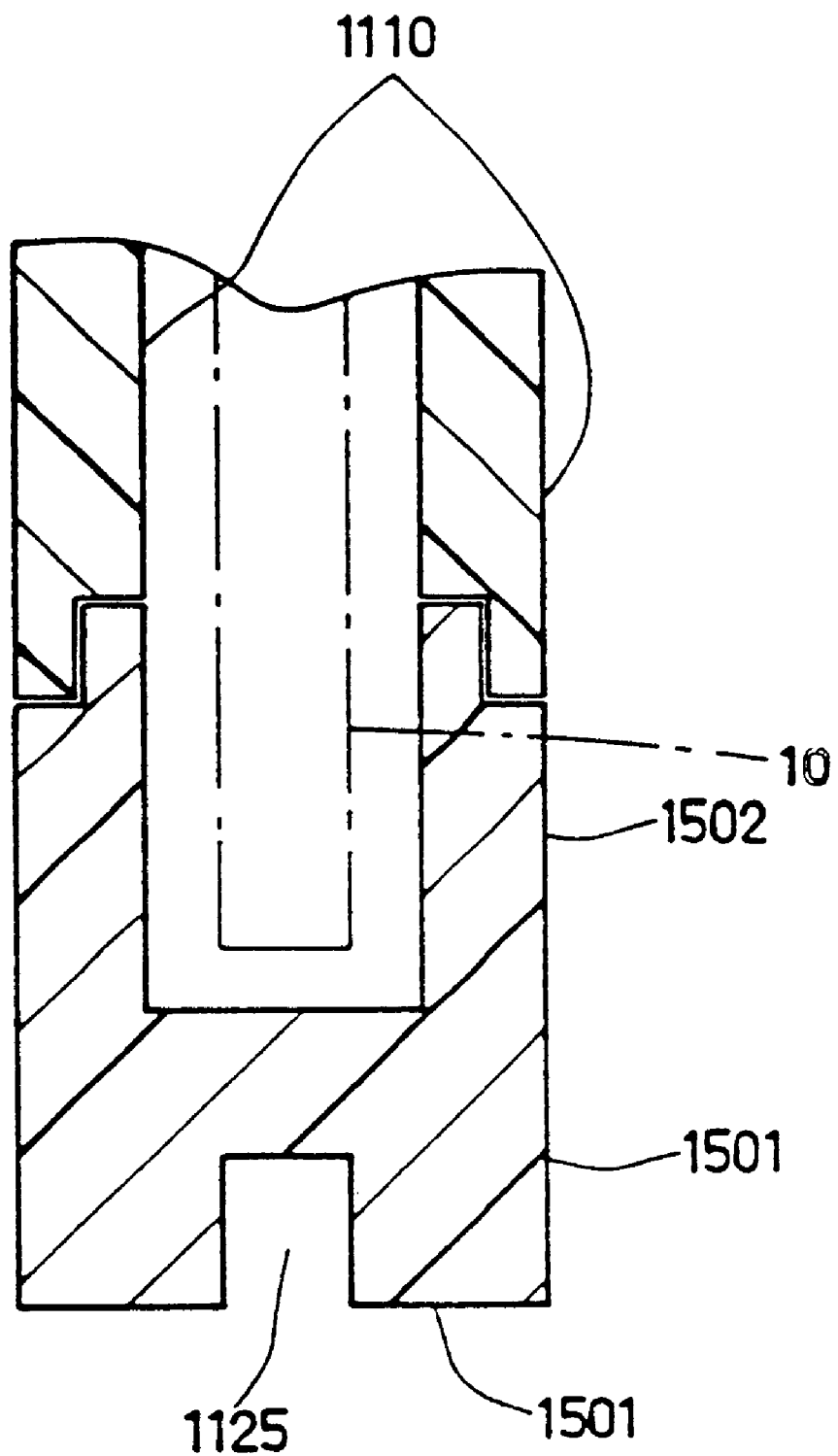
FIG. 38 is an enlarged cross-sectional view of a grip portion of the disk cartridge shown in FIG. 31.

FIG. 31 is a perspective view showing the appearance of an example of a disk cartridge according to the fourth embodiment of the present invention. FIG. 32 is an exploded perspective view showing schematic shapes of the main components of the disk cartridge shown in FIG. 31. FIG. 33 is a perspective view showing an opening/closing cover that is one of the components of the disk cartridge shown in FIG. 31. FIG. 34 is a schematic plan view showing a state during ejecting the disk accommodated in the disk cartridge shown in FIG. 31 after the opening/closing cover of the disk cartridge and a case body of the disk cartridge are separated. FIG. 35 is a schematic plan view showing a state in which the opening/closing cover and the case body of the disk cartridge shown in FIG. 31 are separated and the disk accommodated in the disk cartridge is ejected. FIG. 36 is an enlarged perspective view showing details of an example of a movable piece in the disk cartridge shown in FIG. 31, which is formed by integral formation with the upper half of the case body. FIG. 37 shows partial cross-sectional perspective views illustrating an enlarged third locking means of the disk cartridge shown in FIG. 31. FIG. 38 is an enlarged cross-sectional view of a grip portion of the disk cartridge shown in FIG. 31. The members having the same function as those in the first embodiment are indicated using the same characters. The duplicate explanations for those members are omitted here.

The disk cartridge according to the present fourth embodiment is different from that according to the first embodiment in that a positioning portion (flange) is added. The positioning portion maintains a disk by positioning the disk between them in its thickness direction so that the disk does not come off an opening/closing cover. Further, the disk cartridge according to the present fourth embodiment is different from that according to the first embodiment in that a third locking means is provided with a movable piece that can correspond to a reversible third unlocking means of an adapter according to a fifth embodiment described later.

As shown in FIGS. 31–35, a disk cartridge 1000 according to the fourth embodiment of the present invention comprises a case body 1110 and an opening/closing cover 1120 accommodated inside the case body 1110 in a withdrawable manner. The case body 1110 comprises an opening 1111, a disk-storage portion 1112, a movable piece 1503, a guide hole 1119, and a grip-guide part 1113. A disk 10 is inserted into or is ejected from the opening 1111. The disk-storage portion 1112 is formed continuously to the opening 1111 and forms a space where the disk 10 is accommodated. The movable piece 1503 is provided in the vicinity of the opening 1111 and can be elastically deformed in parallel with a disk surface. When third locking projections 209 provided at symmetrical positions with respect to the center line of the case body 1110 are removed by external force, the guide hole 1119 guides the removal operation. The grip-guide part 1113 engages with a grip portion 1501 of the opening/closing cover 1120 described later. The case body 1110 has a rectangular shape. The inside of the case body 1110 is formed of an upper case 1110a and a lower case 1110b that are formed in substantially the same shape. The movable piece 1503 and the guide hole 1119 are formed substantially opposing each other in each of the upper case 1110a and the lower case 1110b.

As shown in FIG. 36, the movable piece 1503 is formed by an integral formation with the case body 1110 via a bridge portion 1503a. The elastic deformation of the bridge portion 1503a can displace the movable piece 1503 at least in an inplane direction parallel to the disk surface. The third locking projection 209 (not shown in FIG. 36) engages with a third locking hole 1511. A part of wall surfaces of the third locking hole 1511 is formed of the movable piece 1503. The point of the movable piece 1503 is formed in a hook shape so that the third locking projection 209 of the opening/closing cover is hooked and maintained by the movable piece 1503. When the movable piece 1503 is elastically moved to a predetermined position within a plane parallel to the disk surface in the direction shown by an arrow 1503b in the figure, a path (gap) leading to the outside of the case body 1110 in the direction shown by an arrow 209a from the third locking hole 1511 is formed. By passing the third locking projection 209 through this path 209a, the opening/closing cover 202 fixed and held by the third locking means can be released reversibly. In an initial state of a disk cartridge, the third locking hole 1511 is engaged with the third locking projection 209 and is therefore closed.

The opening/closing cover 1120 comprises a pair of disk holding members 202, first locking projections 203, third locking projections 209, hooks 1123, and a grip 1501. The hooks 1123 engage with an opening/closing-cover holding means of the adapter described later.

One third locking projection 209 is provided at each side of the grip 1501 of the opening/closing cover 1120. The two third locking projections 209 do not have the same projections on the upper and lower surfaces of the opening/closing cover 1120. The two third locking projections 209 are formed so that when one of the projections 209 projects from one surface side, the other projection 209 projects from the other surface side. As shown in FIG. 37(a), when the third locking projection 209 fits into the third locking hole 1511, the other end surface of a lock key 208 is exposed within the guide hole 1119 formed opposing the locking hole 1511. The lock key 208 is designed so as to be cut away irreversibly by the application of a predetermined external force (for example, pressing by a pen point) through the guide hole 1119 in this state. Thus, the third locking means can be released irreversibly.

A first groove 1124 is provided on the side face in the vicinity of the base of each disk holding members 202. First retaining portions 1242 provided to position-in-height maintaining members 1240 of the adapter described later fit into the first grooves 1124, thus forming a position-in-height maintaining means. Further, a second groove 1125 is provided on the opening/closing cover 1120 on its side face that is exposed when the opening/closing cover 1120 is inserted in the case body 1110. A second retaining portion 1216 of an operating member 1210a of the adapter described later fits into the second groove 1125, thus similarly forming the position-in-height maintaining means. The second groove 1125 is formed in the vicinity of the center of the opening/closing cover 1120 but is formed asymmetrically with respect to the center line of the opening/closing cover 1120 (for instance, asymmetrically in shape or formation position). Therefore, when the disk cartridge 1000 is inserted into the adapter described later to a predetermined position, the insertion is possible only with one orientation, and thus a side A of the disk cartridge can correspond to a side A of the adapter. The hooks 1123 are formed in a left-right symmetric shape with respect to the insertion direction of the disk cartridge.

As shown in FIG. 33, in the disk holding members 202, points 202b engage with the engagement portions 1117 of the case body 1110, thus adjusting the position of the disk holding members 202. Further, slopes formed in the width and thickness directions of the disk 10 are provided at the points 202b so as to allow the opening/closing cover 1120 to be inserted smoothly when the opening/closing cover 1120 is inserted into the case body 1110.

First flanges 1126 are formed on the upper and lower faces of each end of the disk holding members 202 (in order to explain the points 202b, FIG. 33 shows the state in which the upper first flange 1126 of the disk holding member 202 shown in the back is cut away). Each holding member 202 is formed so as to have a predetermined distance between the disk 10 and each of the upper and lower faces of the member 202 in the thickness direction of the disk 10 (the same distance as that of a disk-storage portion 1112 forming a space where the disk 10 is accommodated). Therefore, the first flanges 1126 adjust the position in height of the disk 10 when the disk 10 is accommodated in the adapter described later. Each first flange 1126 has a projection that projects in the disk direction. The projection adjusts the position of the disk in its thickness direction. Similarly, as shown in FIG. 38, both the upper and lower surfaces of the grip 1501 project in the disk 10 direction and form a second flange 1502 that adjusts the position of the disk 10 in its thickness direction. The first flanges 1126 and the second flange 1502 can maintain the disk 10 when the opening/closing cover 1120 is drawn out from the case body 1110 so that the disk 10 does not come off the opening/closing cover 1120 and does not fall down. The first flanges 1126 are formed in a higher level than that of the basic thickness of the opening/closing cover 1120. When the opening/closing cover 1120 is accommodated in the case body 1110, the first flanges 1126 engage with cavities 1509 formed within the disk-storage portion 1112. Due to the grooves 1127, the first flanges 1126 can be elastically deformed in the thickness direction. Therefore, when the opening/closing cover 1120 is drawn out from the case body 1110, the first flanges 1126 are elastically deformed in the thickness direction of the disk 10. Consequently, the first flanges 1126 escape from the cavities 1509 formed inside the case body 1110, thus passing through the disk-storage portion 1112 and the opening 1111. Further, the upper and lower points of the first flanges 1126 are positioned at different positions from each other so as to enable the formation of the first flanges 1126 (see FIG. 35).

On the other hand, the operation of withdrawing the opening/closing cover 1120 from the case body 1110 is the same operation as in the disk cartridge according to the first embodiment. As shown in FIG. 34, the ends of the disk holding members 202 hold the accommodated disk 10 stably. As a result, the disk 10 can be withdrawn together with the opening/closing cover 1120 in the state as shown in FIG. 35. The grip 1501 in the vicinity of the center of the opening/closing cover 1120 is provided with the second flange 1502 projecting toward the disk direction. The second flange 1502 adjusts the position of the disk 10 described above in its thickness direction. Therefore, the disk 10 does not fall off from the opening/closing cover 1120. Consequently, when grasping the disk 10 and drawing it out in the direction of the end of the opening/closing cover 1120, the disk 10 can be removed from the opening/closing cover 1120 while the disk holding members 202 are elastically deformed outwards by the peripheral face of the disk 10.

The grip 1501 is positioned at a higher level than that of the basic thickness of the opening/closing cover 1120. The shape formed at the higher level is designed so as not to be left-right symmetric with respect to the center line of the disk cartridge 1000. Similarly, the grip-guide part 1113 of the case body 1110 that engages with the grip 1501 also is not left-right symmetric with respect to the center line of the disk cartridge 1000. Thus, the disk cartridge 1000 is formed so that the opening/closing cover 1120 can be inserted into the case body 1110 only with one orientation. Therefore, when the opening/closing cover 1120 is inserted into the case body 1110 again after being withdrawn from the case body 1110, the opening/closing cover 1120 can be inserted only with the initial orientation. When the opening/closing cover 1120 is inserted into the case body 1110 again after the opening/closing cover 1120 and the disk 10 are transferred into the adapter described later, the opening/closing cover 1120 can be inserted only with the initial orientation. Thus, a side A of the disk cartridge 1000 can correspond to a side A of the adapter, and a side B of the disk cartridge 1000 to a side B of the adapter. Needless to say, when the disk cartridge 1000 is loaded into the adapter, it is necessary to make the side A of the disk cartridge 1000 and the side A of the adapter correspond to each other and to form the disk cartridge 1000 so as to be inserted into the adapter only with one orientation. This will be described later. The grip 1501 and the case body 1110 are engaged with each other, being positioned one upon another as shown in FIG. 38, thus avoiding the ingress of dirt and dust into the disk cartridge 1000.

The case body 1110 comprises a head access opening 180, a shutter 181, an elastic spring 182, and a slider 1104. The slider 1104 is freely la movable in the left-right direction by the guide of two guide portions 1507 and 1508 formed in the case body 1110. The slider 1104 fixes the shutter 181 and suspends one end of the elastic spring 182. The other end of the elastic spring 182 is suspended by the case body 1110. Thus, the elastic spring 182 provides force in the direction that the shutter 181 covers the head access opening 180. A shutter opening/closing hole 1506 formed in the slider engages with a shutter opening/closing lever that is provided in a drive unit and is not shown in the figure, thus opening and closing the shutter 181.

The points 202b of the disk holding members 202 engage with the engagement portions 1117 of the case body 1110, and therefore the positions of the points 202b are regulated. Thus, it is avoided that the ends of the disk holding members 202 are inclined inwards and then come into contact with the disk 10.

As shown in FIG. 33, the first locking projection 203 has a step 203b in the opposite side of a step 203a provided in the direction preventing the opening/closing cover 1120 and the case body 1110 from being separated by being engaged with the locking hole 105. The step 203b comes into contact with a step 1250a of an insertion-position-maintaining member 1250 of the adapter described later that is included in an insertion-position maintaining means when the disk cartridge is inserted into the adapter.

A first unlocking claw 205 as shown in FIG. 33 is formed at a part of each hinge 204. The first unlocking claws 205 are pressed by first unlocking bars 1214 of operating members 1210a and 1210b of the adapter described later, thus displacing the hinges inwards.

Fifth Embodiment

Next, an adapter according to a fifth embodiment into which the disk cartridge of the fourth embodiment of the present invention can be inserted will be explained with reference to the drawings.

Figure 39:
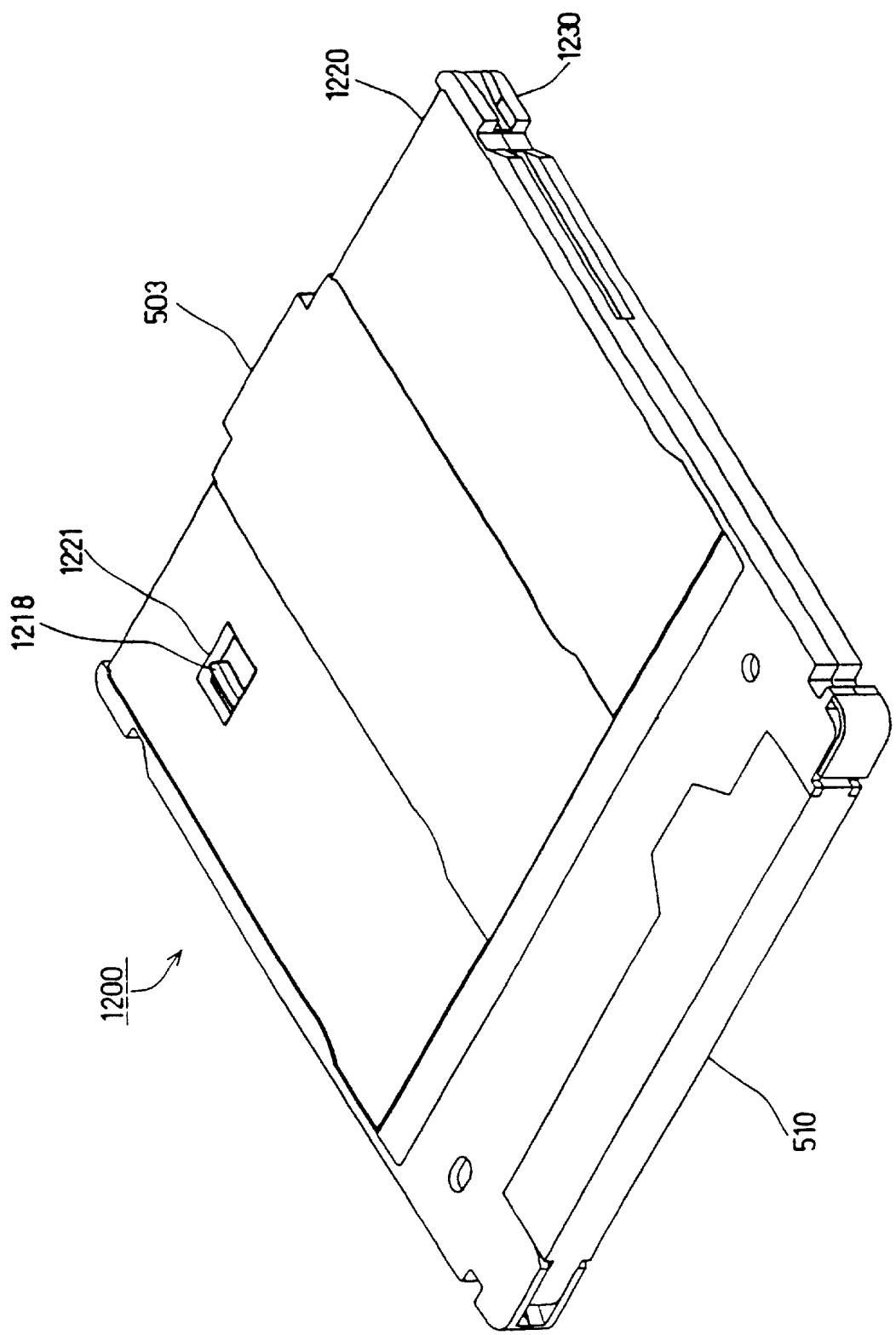
FIG. 39 is an entire perspective view showing the appearance of an adapter according to a fifth embodiment.
Figure 40:
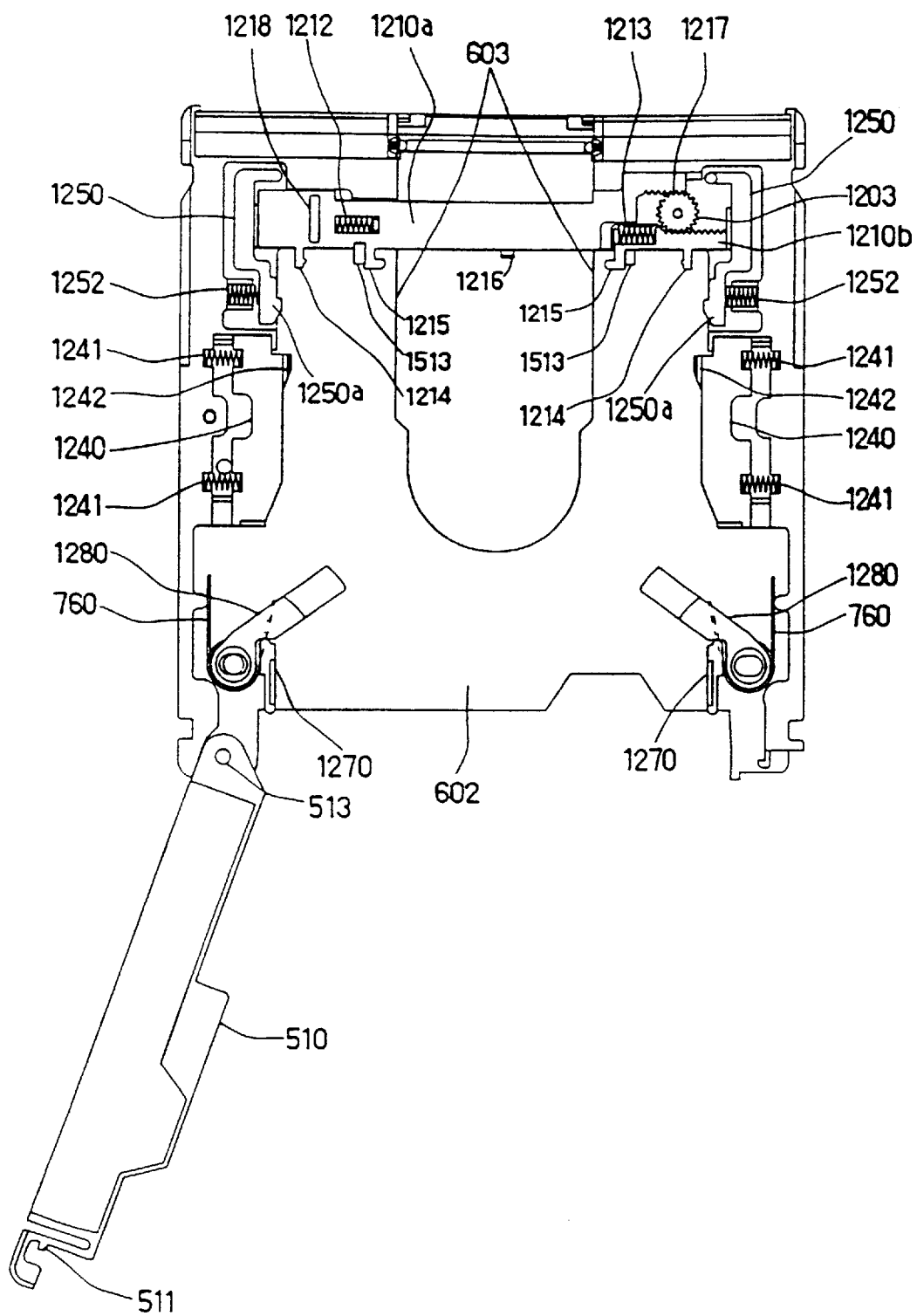
FIG. 40 is a schematic plan view showing an internal structure of the adapter shown in FIG. 39 by removing an upper half and a shutter.
Figure 41:
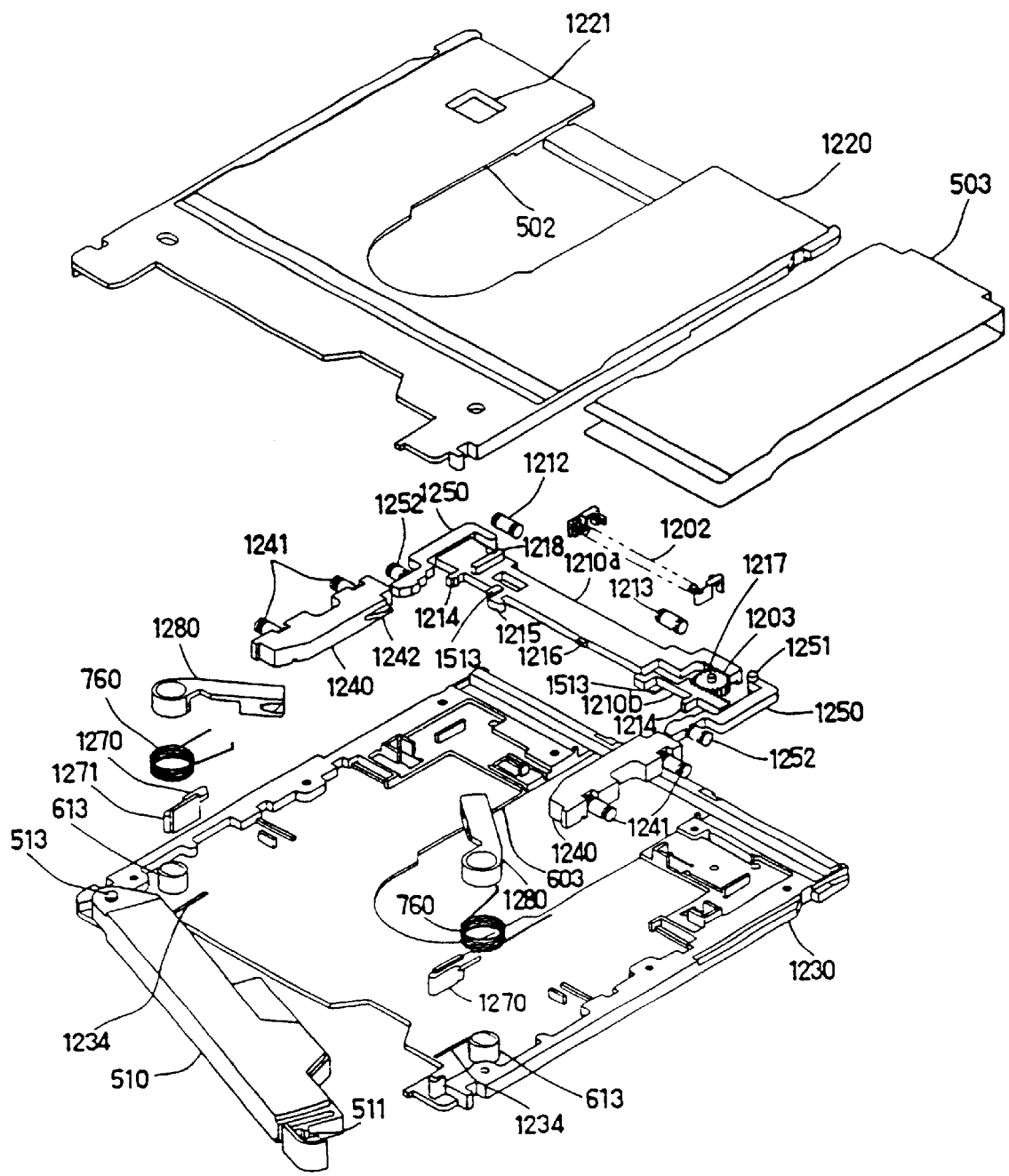
FIG. 41 is an exploded perspective view showing components of the adapter shown in FIG. 39.

FIG. 39 is an entire perspective view showing the appearance of an adapter according to the fifth embodiment of the present invention. FIG. 40 is a schematic plan view showing an internal structure of the adapter shown in FIG. 39 after removing an upper half and a shutter. FIG. 41 is an exploded schematic perspective view showing components of the adapter shown in FIG. 39. The members having the same function as those in the third embodiment are indicated using the same characters, respectively. The duplicate explanations for those members are omitted here.

An adapter 1200 of the present embodiment is formed by combining a rectangular upper case 1220 and a rectangular lower case 1230 so as to have a case-like form that can accommodate a disk cartridge. The adapter 1200 comprises an insertion portion 602, a door 510, head access openings 502 and 603, a shutter 503, and an elastic spring (not shown in the figures) for maintaining the shutter 503 in a closed state when the adapter 1200 is not loaded in a drive unit.

As shown in FIG. 40, the operating members 1210*a* and 1210*b* are positioned at the back of the insertion portion 602 movably in a direction perpendicular to the insertion direction of the disk cartridge. A spring 1212 provides force to one operating member 1210*a* in the left direction in the figure. A spring 1213 provides force to the other operating member 1210*b* in the right direction in the figure. That is, the springs 1212 and 1213 provide forces to the operating members 1210*a* and 1210*b* respectively so that the operating members 1210*a* and 1210*b* are separated from each other. The operating member 1210*a* extends crossing over the head access openings 502 and 603. On a side face of the operating member 1210*a*, a first unlocking bar 1214, a second convex part 1513, and a holding hook 1215 are provided projecting from the side face. The first unlocking bar 1214 can come into contact with the first unlocking claw 205 (see FIG. 33) formed at a part of the hinge 204 formed in the opening/closing cover 1120. The second convex part 1513 engages with the second concave part 1512 (see FIG. 36) formed in the movable piece 1503 of the case body 1110. The holding hook 1215 engages with the hook 1123 (see FIG. 33) formed in the opening/closing cover 1120. In the operating member 1210*b*, the same first unlocking bar 1214, second convex part 1513, and holding hook 1215 are formed in the opposite shape respectively (in an asymmetrical shape with respect to the center line of the disk cartridge in its insertion direction). A pair of the first unlocking bars 1214 described above form a first unlocking means of the present invention. A pair of the second convex parts 1513 described above form a third unlocking means of the present invention. A pair of the holding hooks 1215 described above form a first opening/closing-cover holding means of the present invention.

A second retaining portion 1216 that enters the second groove 1125 (see FIG. 33) formed in the opening/closing cover 1120 and holds the opening/closing cover 1120 in the thickness direction of a disk is formed in the vicinity of the center of the side face of the operating member 1210*a*. A rack 1217 is formed at the right end of the operating member 1210*a*. When a handle 1218 projecting on the upper face of the operating member 1210*a* is moved to the right through a window 1221 formed in the upper case 1220 by a finger, a gear (a pinion gear) 1203 that meshes with the rack 1217 rotates. Further, the operating member 1210*b* having a rack that meshes with the gear 1203 moves to the left. Consequently, the first unlocking bars 1214, the second convex parts 1513, and the holding hooks 1215 that are provided at the right and left sides respectively move in the respective directions approaching each other at one time. That is to say, the first unlocking means, the third unlocking means, and the first opening/closing-cover holding means that are provided in each of the right and left sides of the disk cartridge with respect to the insertion direction can be operated at one time.

Position-in-height maintaining members 1240 for maintaining the position in height of the opening/closing cover 1120 are arranged to the left and right of the insertion portion 602 movably in the direction perpendicular to the insertion direction of the disk cartridge as shown in FIGS. 40 and 41. Springs 1241 provide forces to the position-in-height maintaining members 1240 inwards toward the insertion portion 602. In the position-in-height maintaining members 1240, first retaining portions 1242 that enter the first grooves 1124 formed in the opening/closing cover 1120 and hold the opening/closing cover 1120 are formed, respectively. The first retaining portions 1242 together with the above-mentioned second retaining portion 1216 form a position-in-height maintaining means included in the second opening/closing-cover holding means of the present invention.

Insertion-position-maintaining members 1250 for holding the opening/closing cover at a predetermined position in the insertion direction are arranged to the left and right at the back of and outside the insertion portion 602 as shown in FIGS. 40 and 41. The insertion-position-maintaining members 1250 are provided on the upper and lower cases 1220 and 1230 pivotably upon axes 1251 as the pivot centers, respectively. Springs 1252 provide forces to the insertion-position-maintaining members 1250 in the direction toward the insertion portion 602. Step portions 1250*a* provided at the ends of the insertion-position-maintaining members 1250 engage with step portions 203*b* of first locking projections 203 formed in the opening/closing cover 1120 to hold the opening/closing cover 1120. Thus, a pair of the insertion-position-maintaining members 1250 form an insertion-position maintaining means included in the second opening/closing holding means of the present invention.

Guide members 1270 are arranged to the left and right of the disk cartridge in the insertion direction in the vicinity of the entrance of the insertion portion 602. Each guide member 1270 is sandwiched between a groove 1234 formed in the lower case 1230 and a disk-positioning member 1280. Therefore, the guide members 1270 can move only in the direction parallel to the insertion direction.

Disk-positioning members 1280 for adjusting the position of the disk 10 in its thickness direction are arranged in both sides of the insertion portion 602 in the vicinity of its entrance pivotably upon axes 613 as the pivot centers, respectively. Torsion coil springs 760 urge the disk-positioning members 1280 toward the insertion portion 602. The disk-positioning members 1280 are in contact with the guide members 1270.

As a result, the forces are provided to the guide members 1270 in the direction toward the entrance of the insertion portion 602 (downward on the paper showing FIG. 40) by the elasticity of the torsion coil springs 760 via the disk-positioning members 1280, respectively. The guide members 1270 to which forces are provided are maintained with stop faces 1271 being pressed by the grooves 1234.

A schematic loading method of the disk 10 into the adapter 1200 according to the fifth embodiment of the present invention will be explained using FIGS. 42–47 as follows.

Figure 42:
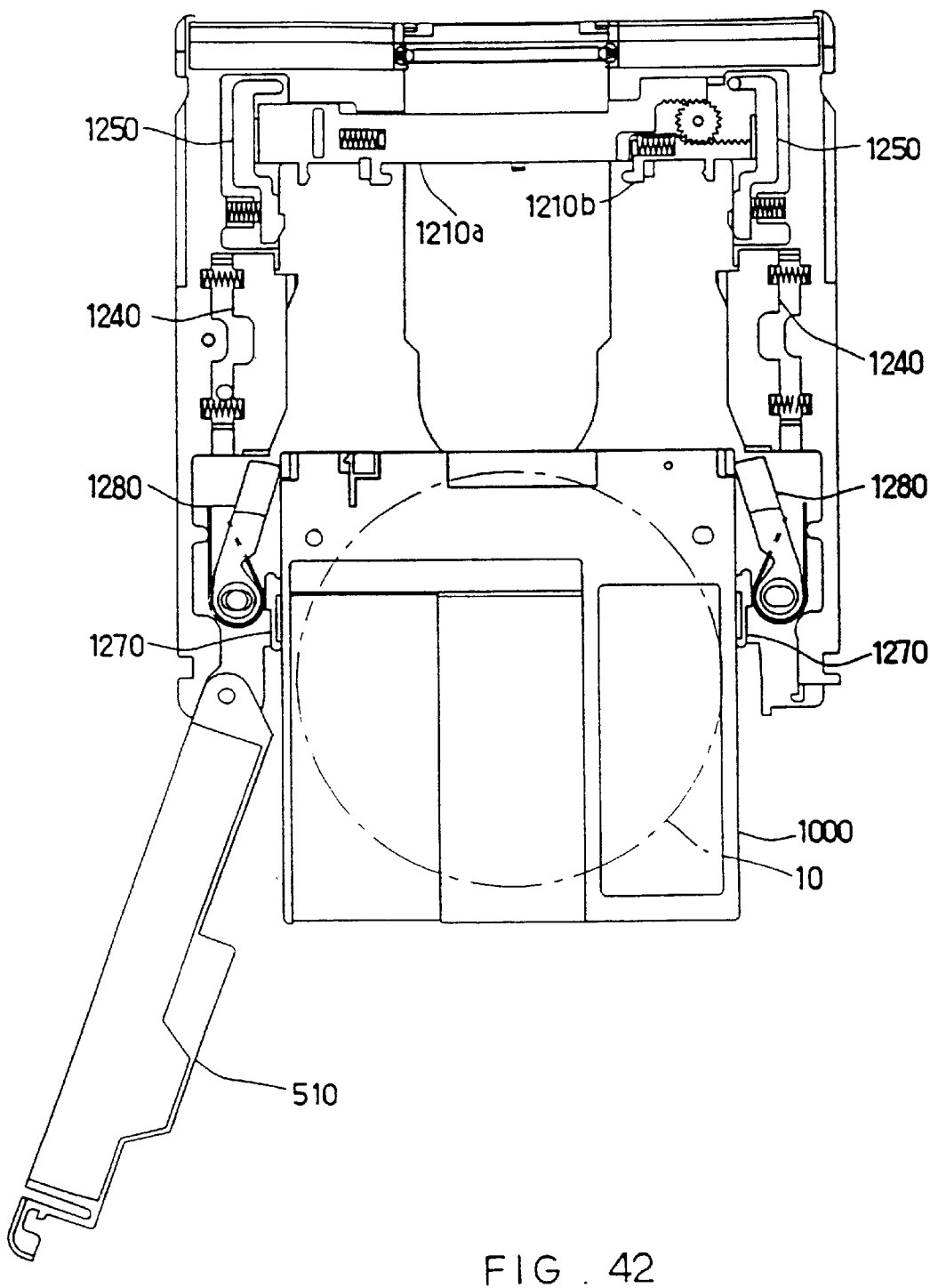
FIG. 42 is a schematic plan view showing the adapter shown in FIG. 39 with its door being opened and with the disk cartridge shown in FIG. 31 being inserted into an insertion portion (wherein the upper half and the shutter are removed so that the internal structure can be seen).

The door 510 is opened and then the disk cartridge 1000 is inserted into the insertion portion 602 with the opening 1111 of the case body 1110 facing forward (FIG. 42).

The disk cartridge 1000 is guided by the guide members 1270 and the insertion portion 602 and is inserted to the vicinity of the operating members 1210a and 1210b while pushing the disk-positioning members 1280, the position-in-height maintaining members 1240, and the insertion-position-maintaining members 1250 outwards. Then, the first unlocking claws 205 formed in the hinges 204 of the opening/closing cover 1120 and the first unlocking bars 1214 formed in the operating members 1210a and 1210b come into contact with each other. Consequently, the disk cartridge 1000 is in the state in which the disk cartridge 1000 is held gently inside the adapter. At the same time, the second convex parts 1513 formed in the operating members 1210a and 1210b fit into the second concave parts 1512 formed in the movable pieces 1503 (FIGS. 48(*a*) and (*b*)). In this case, the disk cartridge 1000 can be drawn out easily when trying to draw out the disk cartridge 1000 with a greater force than the force with which the disk cartridge 1000 is held by the first unlocking bars 1214. Needless to say, the disk cartridge is kept in an initial state (in the state in which the disk is accommodated).

Next, when the handle 1218 formed on the operating member 1210a is caught by a finger through the window 1221 of the upper case 1220 to be moved in the right-angled direction (in this case to the right) to the insertion direction of the disk cartridge 1000, the hinges 204 and the movable pieces 1503 are elastically deformed inwards. When the hinges 204 are elastically deformed inwards, each first locking projection 203 formed together with the respective hinge 204 as one component also is moved inwards, thus releasing the engagement between the first locking projections 203 and the locking holes 105 formed in the case body 1110 (the operation of the first unlocking means). When the movable pieces 1503 are elastically moved inwards, a part of the wall face of each third locking hole 1511 is moved, thus forming a path through which the third locking projection 209 can pass (the operation of the third unlocking means). At the same time, the holding hooks 1215 formed in the operating members 1210a and 1210b engage with the hooks 1123 formed in the opening/closing cover 1120 (the operation of the first opening/closing-cover holding means). Thus, the first locking means and the third locking means are unlocked and therefore the case body 1110 and the opening/closing cover 1120 can be separated. In addition, the opening/closing cover 1120 is retained by the operating members 1210a and 1210b.

Figure 46:
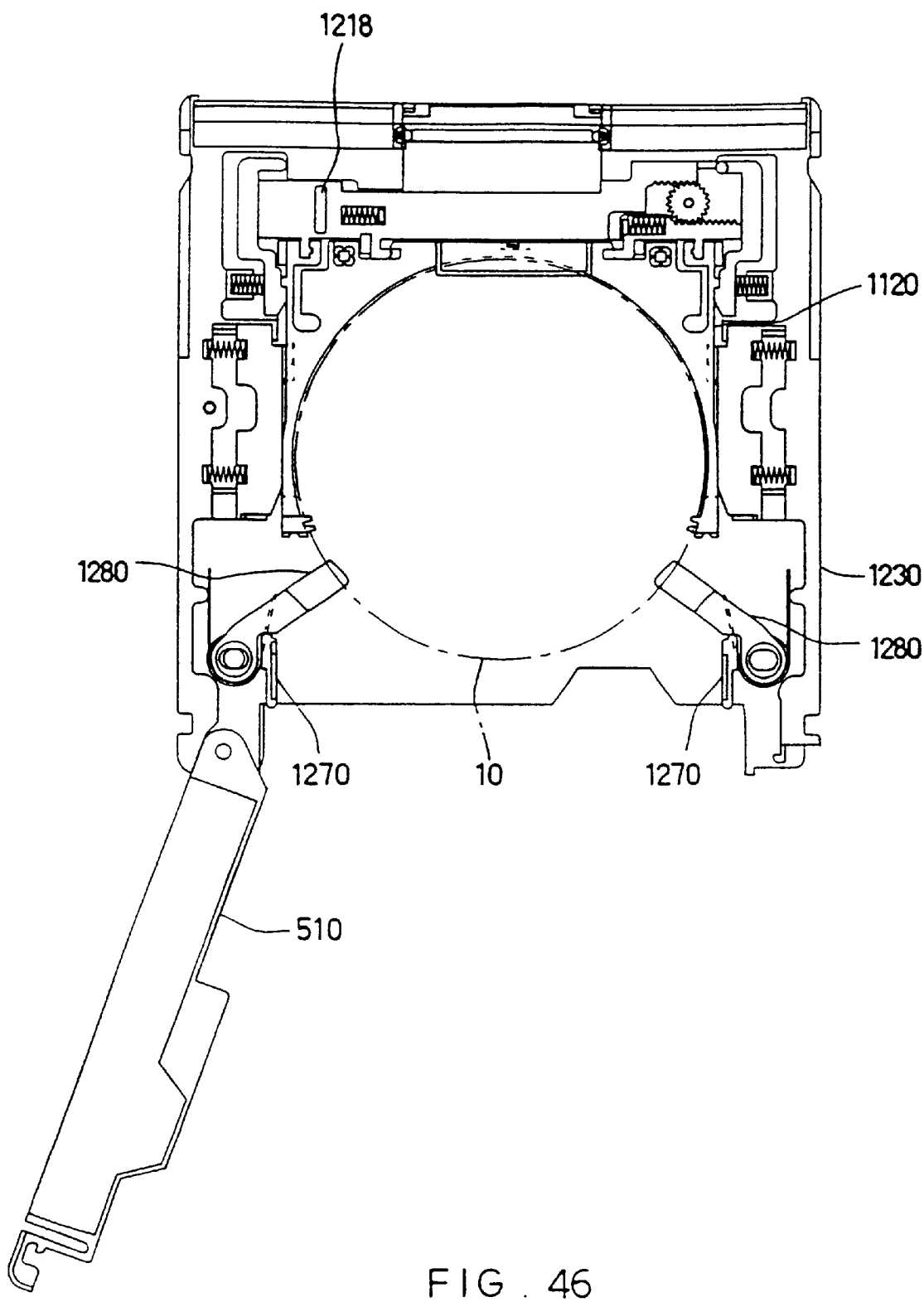
FIG. 46 is a schematic plan view showing the adapter shown in FIG. 39 when the opening/closing cover of the disk cartridge shown in FIG. 31 is held by the second opening/closing-cover holding means and the case body is removed (wherein the upper half and the shutter are removed so that the internal structure can be seen).

While maintaining this state, the case body 1110 is drawn out from the adapter 1200, and the disk 10 and the opening/closing cover 1120 remain inside the adapter. By drawing out the case body 1110, the step portions 1250a formed in the insertion-position-maintaining members 1250 engage with the step portions 203b of the first locking projections 203 formed in the opening/closing cover 1120, thus regulating the position of the opening/closing cover 1120 in its insertion direction (the operation of the insertion-position maintaining means included in the second opening/closing-cover holding means). When the insertion-position maintaining means is operated, the second retaining portion 1216 formed in the operating member 1210a enters the second groove 1125 formed in the opening/closing cover 1120, thus regulating the position of the opening/closing cover 1120 in the disk-thickness direction. Further, the first retaining portions 1242 formed in the position-in-height maintaining members 1240 enter the first grooves 1124 formed in the opening/closing cover 1120, thus regulating the position of the opening/closing cover 1120 in the disk-thickness direction (the operation of the position-in-height maintaining means included in the second opening/closing-cover holding means). Thus, the opening/closing cover 1120 is held at a predetermined position. This condition is shown in FIG. 46.

When the door 510 is closed (FIG. 47) and the disk cartridge is loaded into a drive unit designed for a disk cartridge having compatibility in external shape with the adapter 1200, information recorded on the disk 10 inside the adapter can be reproduced or erased, or information can be recorded on the disk 10.

The configuration and functions of the above will be explained in order as follows.

The first unlocking means, the third unlocking means, and the first opening/closing-cover holding means of the present invention will be explained.

In the first unlocking means, when the handle 1218 of the operating member 1210a is pushed to the right through the window 1221 of the upper case 1220 in the state in which the first unlocking claws 205 formed in the hinges 204 formed in the opening/closing cover 1120 are in contact with the first unlocking bars 1214 formed in the operating members 1210a and 1210b, the first unlocking bars 1214 come to move toward the inside of the adapter 1200, thus deforming the hinges 204 inwards. As a result, the engagement between the first locking projections 203 and the locking holes 105 is released.

In the third unlocking means, when the handle 1218 of the operating member 1210a is pushed to the right through the window 1221 of the upper case 220 in the state in which the second convex parts 1513 formed in the operating members 1210a and 1210b fit into the second concave parts 1512 formed in the movable pieces 1503 formed in the case body 1110, the second convex parts 1513 are moved toward the inside of the adapter 1200, thus deforming the movable pieces 1503 inwards. Consequently, paths through which the third locking projections 209 can pass are formed.

As a result, the lock between the first locking projections 203 and the locking holes 105 and the engagement between the movable pieces 1503 and the third locking projections 209 are released, thus allowing the opening/closing cover 1120 and the case body 1110 to be separated from each other.

By pushing the handle 1218 of the operating member 1210a, the holding hooks 1215 formed in the operating members 1210a and 1210b are moved inwards and therefore engage with the hooks 1123 formed in the opening/closing cover 1120, thus retaining the opening/closing cover 1120.

As described above, the operations of the first unlocking means, the third unlocking means and the first opening/closing-cover holding means allow the case body 1110 to be drawn out from the adapter 1200 while the opening/closing cover 1120 is left inside the adapter 1200. Needless to say, when the case body 1110 is drawn out from the adapter 1200 by operating the operating members 1210a and 1210b, the disk 10 is held by the opening/closing cover 1120. Consequently, the disk 10 also remains inside the adapter 1200.

Figure 44:
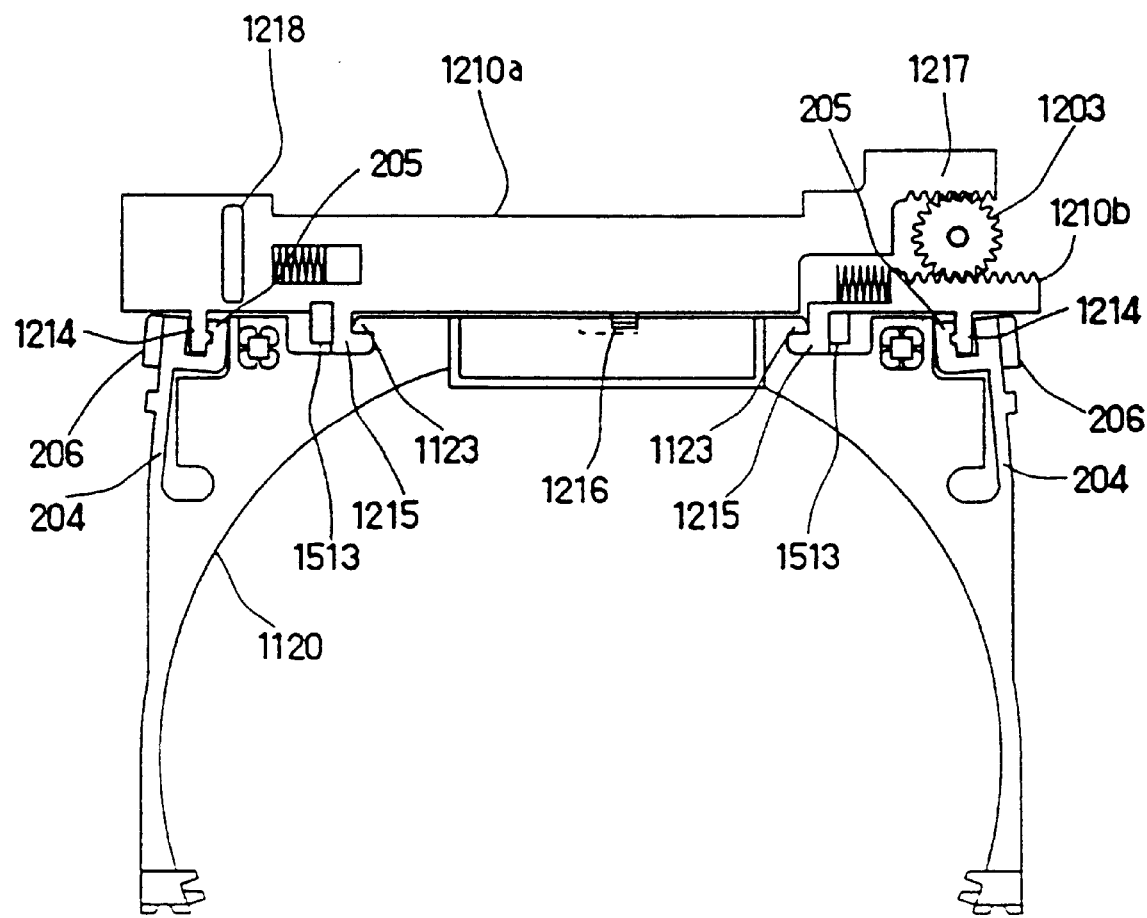
FIG. 44 is a partial plan view showing the operating member, an opening/closing cover, and a gear when the operating member of the adapter shown in FIG. 39 is operated and the first unlocking means, the third unlocking means, and the first opening/closing-cover holding means are operated.

FIG. 44 is a view showing the state in which the first unlocking means, the third unlocking means, and the first opening/closing-cover holding means are operated by operating the operating members 1210a and 1210b. FIG. 44 shows the state in which the hinges 204 are displaced and the hooks 1123 of the opening/closing cover 1120 and the holding hooks 1215 of the operating members 1210a and 1210b engage with each other.

Figure 48:
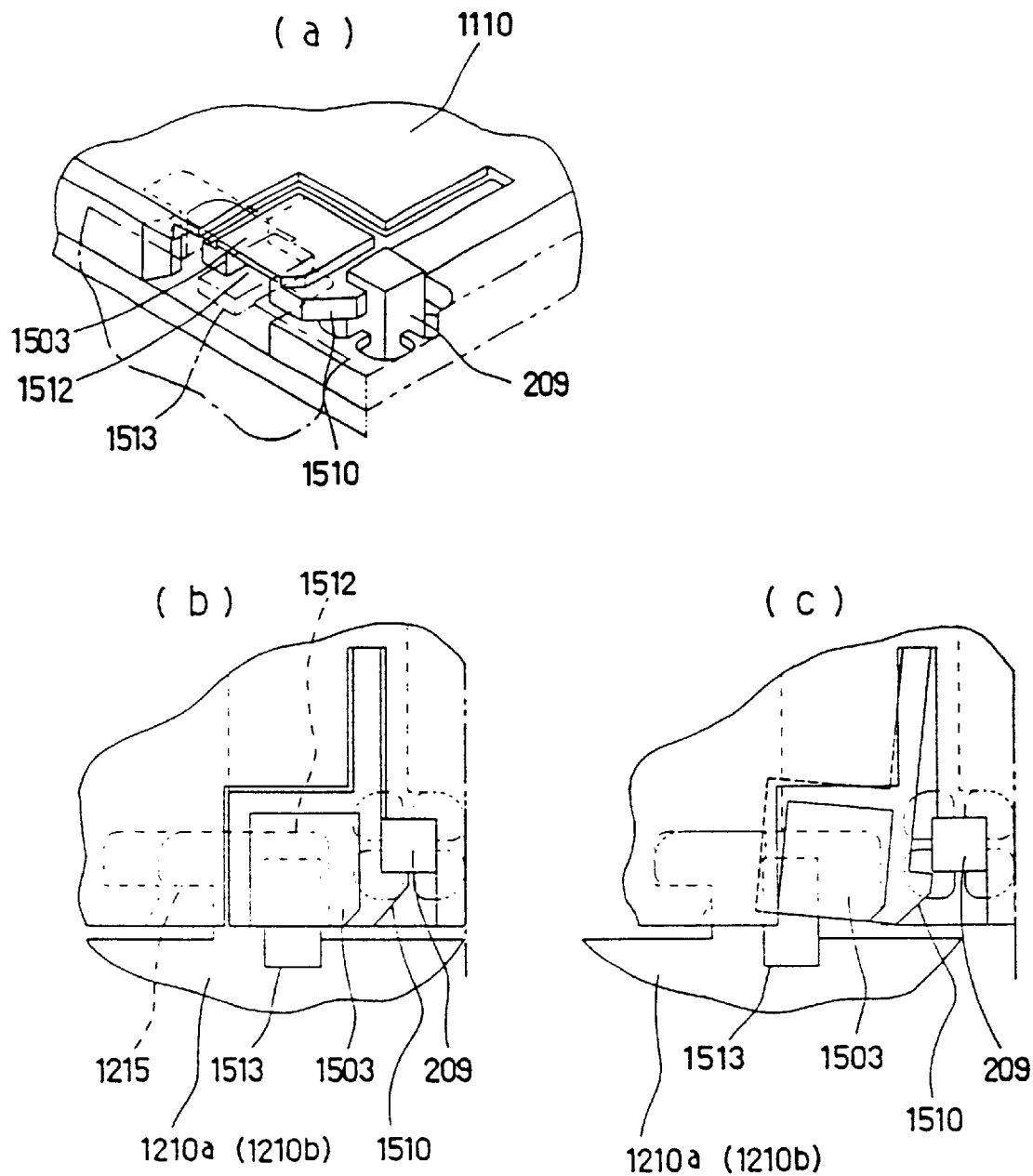
FIG. 48 shows partially enlarged views for explaining an operating state of the third unlocking means of the adapter shown in FIG. 39.

FIG. 48 shows views illustrating the third unlocking means. The second convex parts 1513 formed in the operating members 1210a and 1210b fit into the second concave parts 1512 of the movable pieces 1503 formed in the case body 1110 (FIGS. 48(a) and (b)). The operating members 1210a and 1210b are operated and the movable pieces 1503 are moved inwards (to the left on the paper showing FIG. 48(c)). Consequently, the paths through which the third locking projections 209 formed in the opening/closing cover 1120 can pass are formed, thus unlocking the third locking means (FIG. 48(c)).

Next, the insertion-position maintaining means and the position-in-height maintaining means that are the second opening/closing-cover holding means in the present invention will be explained.

The insertion-position maintaining means aims to regulate the position of the opening/closing cover 1120 in its insertion direction after the case body 1110 is drawn out from the adapter 1200 so that the opening/closing cover 1120 is not drawn out from the adapter 1200. That is to say, when the disk cartridge 1000 is inserted into the adapter 1200, the insertion-position-maintaining members 1250 are rotated toward the outside of the insertion portion 602 by the side faces of the case body 1110. Then, while the disk 10 and the opening/closing cover 1120 are left inside the adapter 1200 by operating the operating member 1210a, the case body 1110 is drawn out from the adapter. The insertion-position-maintaining members 1250 are rotated toward the inside of the insertion portion 602 by the forces provided by the springs 1252. The step portions 1250a of the insertion-position-maintaining members 1250 engage with the step portions 203b of the first locking projections 203 formed in the opening/closing cover 1120. After that, even if the first opening/closing-cover holding means is released, the opening/closing cover 1120 cannot be drawn out from the adapter 1200. In addition, the first unlocking claws 205 formed in the above-mentioned opening/closing cover 1120 and the first unlocking bars 1214 formed in the operating members 1210a and 1210b also regulate the position of the opening/closing cover 1120 in the direction of a plane parallel to the disk surface. Therefore, the position of the opening/closing cover 1120 is not changed unintentionally.

The position-in-height maintaining means aims to adjust the position of the opening/closing cover 1120 in the disk-thickness direction. That is to say, when the disk cartridge 1000 is inserted into the adapter 1200, the position-in-height maintaining members. 1240 are moved by the side faces of the case body 1110 toward the outside of the insertion portion 602. Then, after the first opening/closing-cover holding means is operated, the position-in-height maintaining members 1240 are moved toward the inside of the insertion portion 602 by the forces provided by the springs 1241 at substantially the same time that the opening/closing cover 1120 and the case body 1110 are separated. Then, the first retaining portions 1242 formed in the position-in-height maintaining members 1240 enter the first grooves 1124 formed in the opening/closing cover 1120, thus regulating the position of the opening/closing cover 1120 in the disk-thickness direction. In addition, when the disk cartridge 1000 is inserted into the adapter 1200, the second retaining portion 1216 formed in the operating member 1210a enters the second groove 1125 formed in the opening/closing cover 1120, thus regulating the position of the opening/closing cover 1120 in the disk-thickness direction. Thus, by regulating the position in height of the opening/closing cover 1120 by the position-in-height maintaining means, the position of the disk 10 accommodated inside the adapter 1200 can be adjusted in its thickness direction by the first flanges 1126 and the second flange 1502 that are formed in the opening/closing cover 1120. Needless to say, considering the movement of the operating member 1210a, the second groove 1125 is formed so as to have a length corresponding to the movement. Furthermore, as mentioned above, since the second retaining portion 1216 and the second groove 1125 are designed so as to fit each other only in one orientation, the disk cartridge 1000 can be loaded into the adapter 1200 with the side A and the side B of the disk cartridge 1000 corresponding to the side A and the side B of the adapter 1200 respectively.

Figure 49:
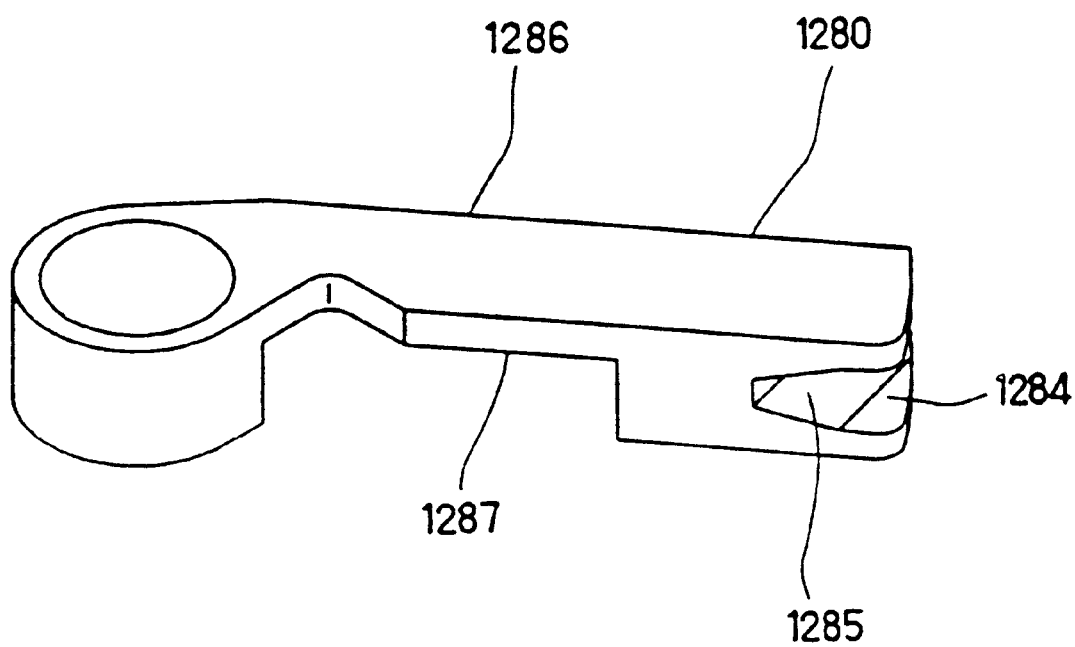
FIG. 49 is a schematic perspective view showing a disk-positioning member that is one of the components of the adapter shown in FIG. 39.
Figure 50:
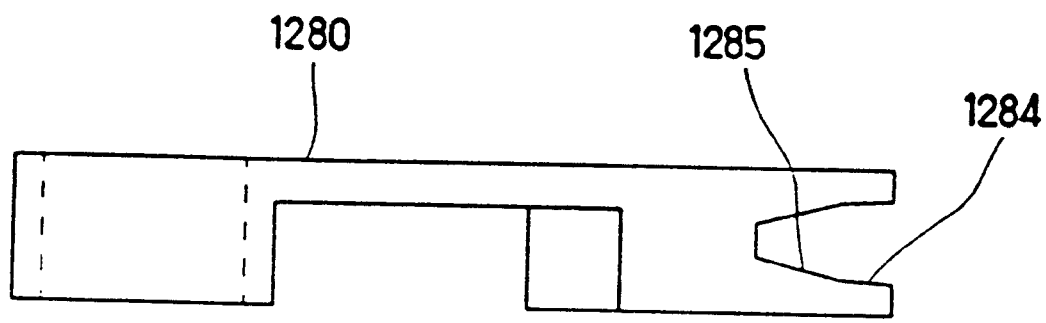
FIG. 50 is a side view of the disk-positioning member of FIG. 49.
Figure 51:
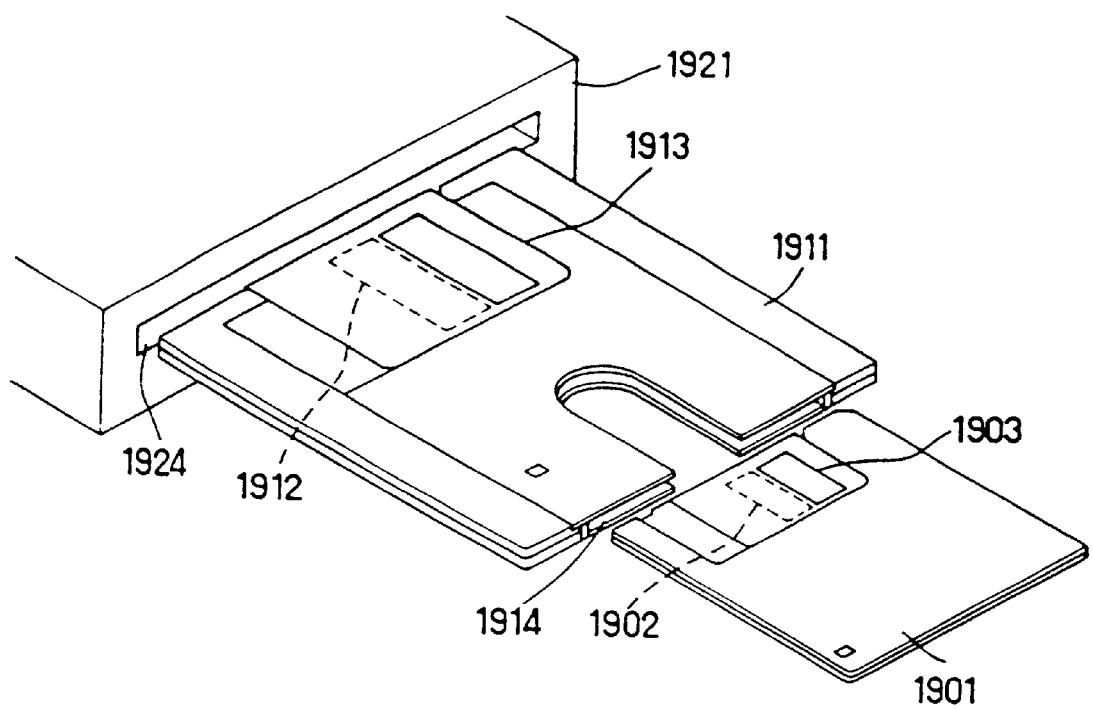
FIG. 51 is a schematic perspective view illustrating an example of a conventional method of recording, reproducing and erasing information in a smaller-size disk cartridge using a drive unit designed for a larger-size disk cartridge via an adapter.

Next, the disk-positioning means that holds the disk and adjusts its position will be explained. This function is the same as that of the disk-positioning means of the third embodiment. Therefore, mainly the different parts in the configuration will be explained. FIG. 49 is a perspective view of the disk-positioning member 1280 and FIG. 50 is a side view of the disk-positioning member.

The movable width of the disk 10, whose position is adjusted by the first flanges 1126 and the second flange 1502 of the opening/closing cover 1120, in its thickness direction is almost the same as that regulated by the inner wall of the disk cartridge 1000, which is sufficient for free rotation of the disk 10. Therefore, when trying to insert the disk 10 into the case body 1110 in such a condition, it is conceivable that the disk 10 comes into contact with the case body 1110 and therefore the disk 10 cannot be accommodated inside the case body 1110 securely. The disk-positioning means of the present embodiment is used for avoiding such a case.

Figure 47:
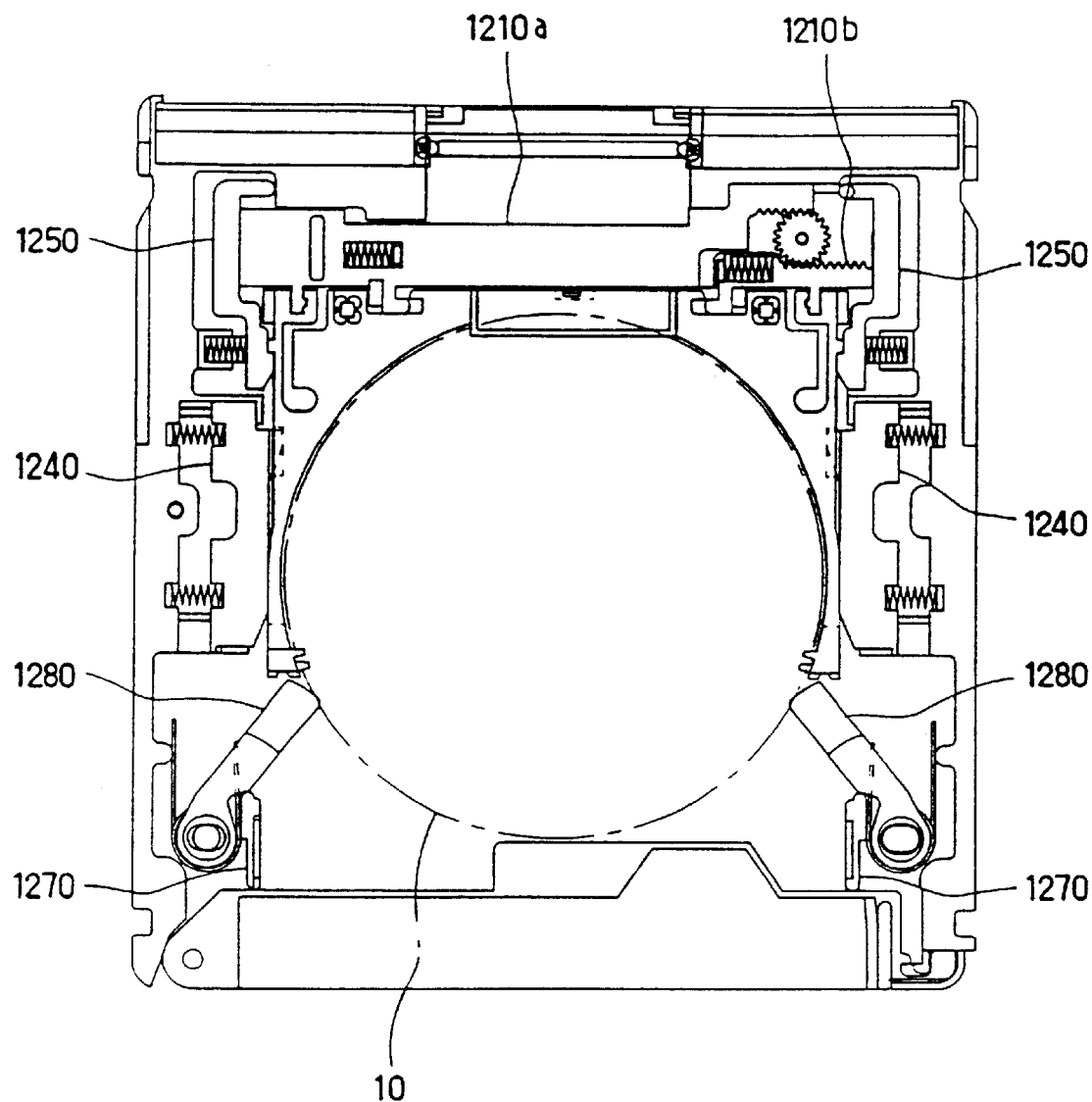
FIG. 47 is a schematic plan view showing the adapter shown in FIG. 39 when the door is closed in the state shown FIG. 46 (wherein the upper half and the shutter are removed so that the internal structure can be seen).

The disk-positioning means comprises disk-positioning members 1280 and torsion coil springs 760. As shown in FIGS. 41, 46 and 47, the disk-positioning members 1280 are maintained pivotably upon two supporting axes 613 formed at both ends of the insertion portion 602 in the vicinity of its opening as the pivot centers respectively. Each disk-positioning member 1280 has a first positioning portion 1285 formed at one end so as to hold the disk 10 from its both sides. The torsion coil springs 760 are retained by spring retaining faces 1286 of the disk-positioning members 1280 and the lower case 1230, and provide forces to the disk-positioning members 1280 toward the insertion portion 602 as shown in FIGS. 49 and 50. In each disk-positioning member 1280, a second positioning portion 1284 for adjusting the position of the disk to such a degree that the disk can be rotated is further formed adjacent to the first positioning portion 1285.

The operation of the disk-positioning means having such a configuration will be explained. As shown in FIG. 46,when the opening/closing cover 1120 and the disk 10 are loaded in the insertion portion 602, both the pairs of the disk-positioning members 1280 are in contact with the guide members 1270. The positions of the guide members 1270 in a disk-cartridge insertion direction are regulated by the stop faces 1271 provided in the guide members 1270 and the grooves 1234 formed on the lower case 1230 (see FIG. 41). Therefore, the disk-positioning members 1280 stand still being pushed by the torsion coil springs 760 toward the insertion portion 602. In this case, the first positioning portions 1285 of the disk-positioning members 1280 hold the peripheral end of the disk 10 from its both sides, thus adjusting the position of the disk in its thickness direction. Consequently, when the case body 1110 is inserted into the insertion portion 602 in this condition, the disk 10 can be inserted into the opening 1111 of the case body 1110 without fail.

Figure 45:
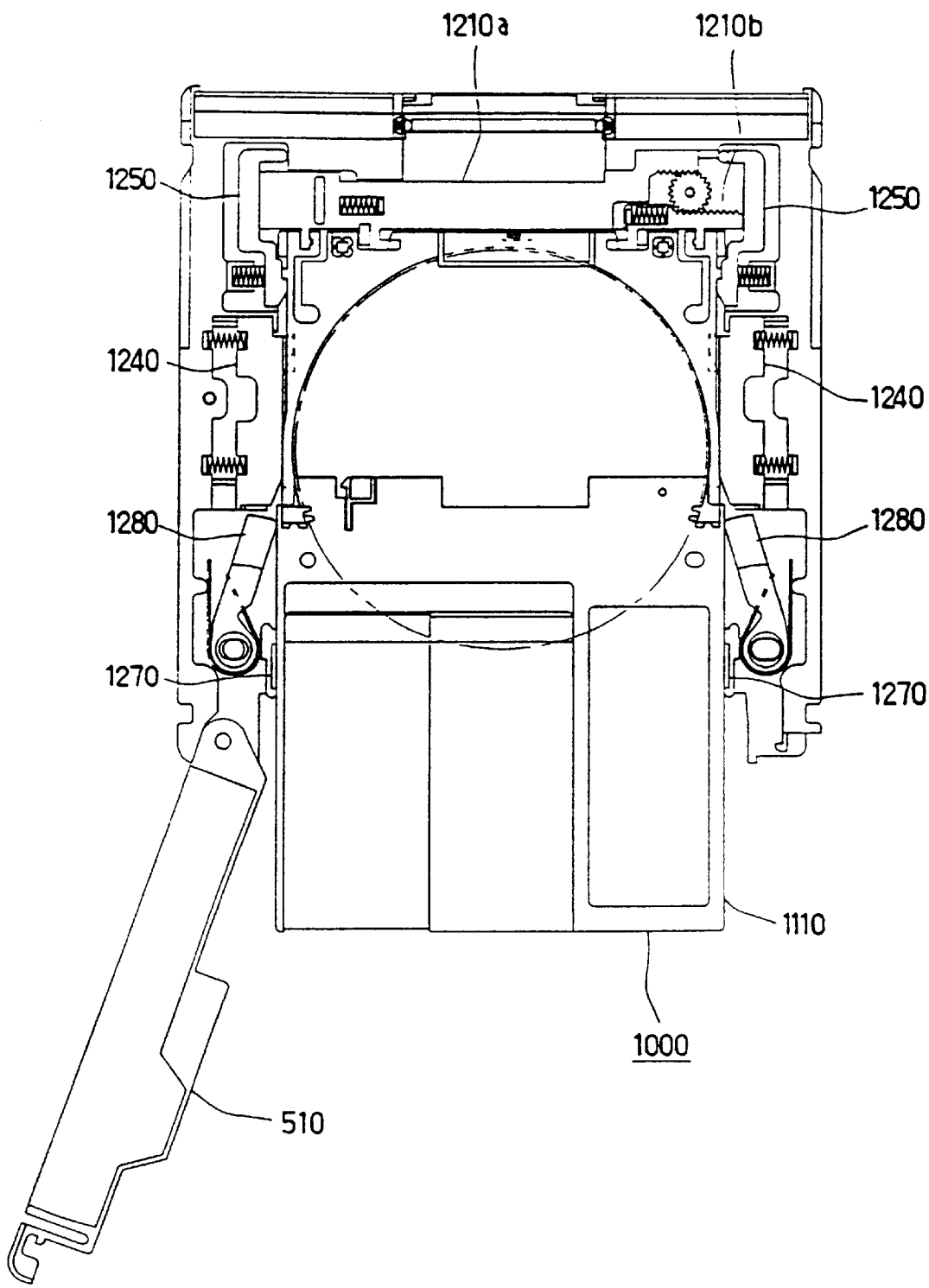
FIG. 45 is a schematic plan view showing the adapter shown in FIG. 39 when a case body is drawn out after an operation of a second opening/closing-cover holding means, or when the case body is inserted into the adapter while the second opening/closing-cover holding means is operated (wherein the upper half and the shutter are removed so that the internal structure can be seen).

After the peripheral end of the disk 10 is inserted into the opening 1111 of the case body 1110, when the case body 1110 is inserted into the insertion portion 602, a contact surface 1287 that is one side face of the disk-positioning member 1280 comes into contact with a side face of the case body 1110. Then, as shown in FIG. 45, one disk-positioning member 1280 pivots clockwise and the other disk-positioning member 1280 counterclockwise upon the supporting axes 613 as the pivot centers, respectively. Thus, the disk-positioning members 1280 escape from the insertion portion 602.

As shown in FIG. 46, when the door 510 is closed in the state in which the disk 10 is held by the first positioning portions 1285, one end of each guide member 1270 comes into contact with the door 510 in succession of the operation of closing the door 510. The guide members 1270 are pushed in a disk-cartridge insertion direction. Thus, the other end of each guide member 1270 presses the respective disk-positioning member 1280. Therefore, each disk-positioning member 1280 pivots slightly in a direction escaping from the insertion portion 602, i.e. one disk-positioning member 1280 pivots clockwise and the other positioning member 1280 counterclockwise, upon respective supporting axes 613 as the pivot centers respectively.

FIG. 47 is a plan view showing the state in which the door 510 is closed and the second positioning portions 1284 of the disk-positioning members 1280 hold the disk 10. When the door 510 is closed, the first positioning portions 1285 of the disk-positioning members 1280 come apart from the disk 10. Needless to say, the adjusting space of the disk by the second positioning portions 1284 of the disk-positioning members 1280 in such a condition is set to be larger than that by the first flanges 1126 and the second flange 1502 of the opening/closing cover 1120.

Next, an outline of a method of ejecting the disk accommodated in the adapter according to the fifth embodiment of the present invention will be explained.

Figure 43:
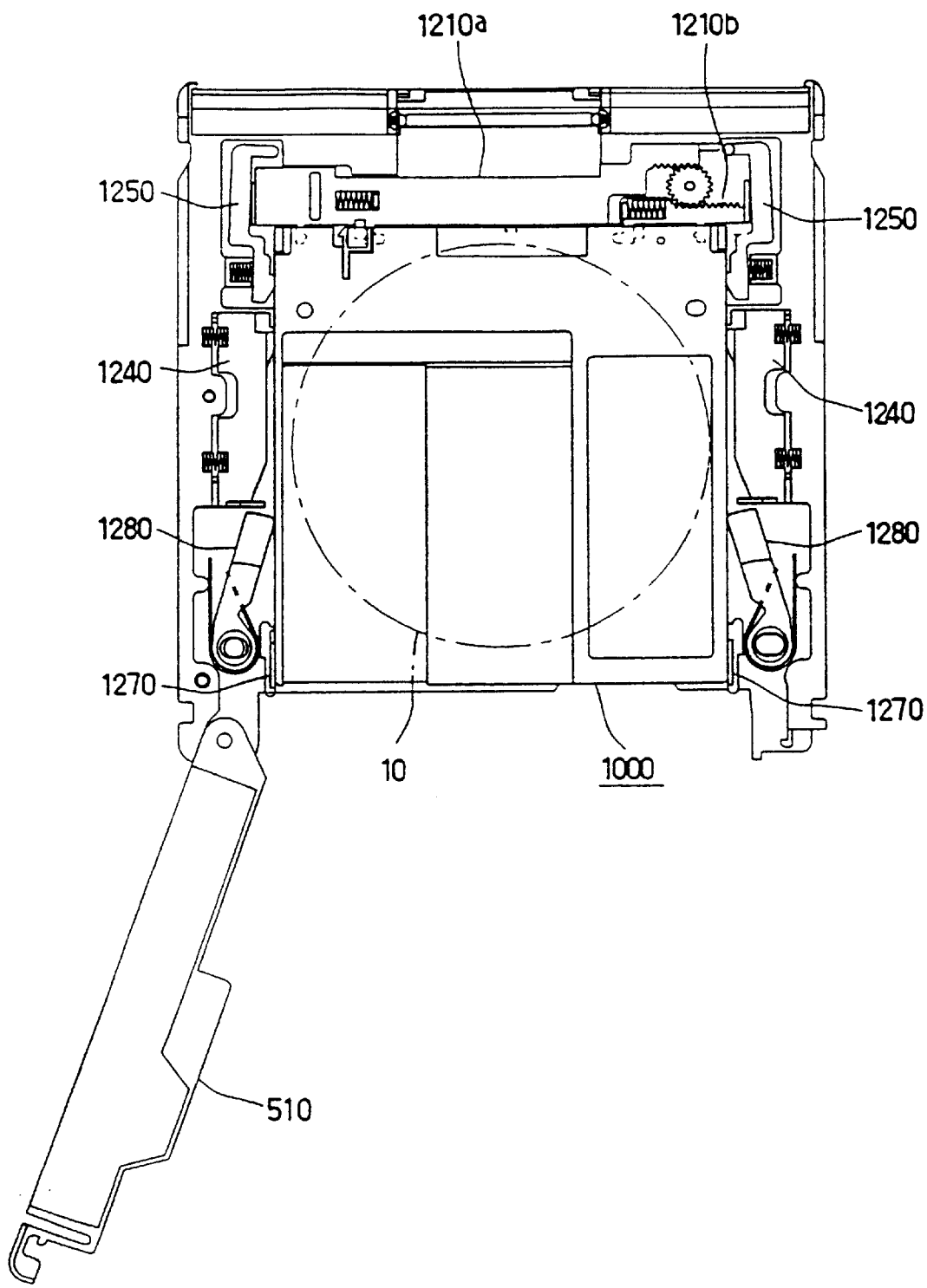
FIG. 43 is a schematic plan view showing the adapter illustrated in FIG. 39 with its door being opened and the disk cartridge illustrated in FIG. 31 that is inserted into the insertion portion in a state in which a first unlocking means, a third unlocking means and a first opening/closing-cover holding means can be operated by operating an operating member (wherein the upper half and the shutter are removed so that the internal structure can be seen).

The door 510 is opened (FIG. 46) from the condition shown in FIG. 47 and the case body 1110 is inserted into the insertion portion 602 (FIG. 45). At this time, the side faces of the case body 1110 come into contact with the disk-positioning members 1280 and the disk-positioning members 1280 pivot toward the outside of the insertion portion 602 against the torsion coil springs 760. The disk 10 and the opening/closing cover 1120 are inserted into the disk-storage portion 1112 of the case body 1110 sequentially. The case body 1110 is inserted into the insertion portion 602 until the disk 10 and the opening/closing cover 1120 are accommodated in the disk-storage portion 1112 completely (FIG. 43). In this stage, the side faces of the case body 1110 and the position-in-height maintaining members 1240 come into contact with each other, and the position-in-height maintaining members 1240 are moved toward the outside of the insertion portion 602 against the springs 1241, thus releasing the position-in-height maintaining means. The side faces of the case body 1110 and the insertion-position-maintaining members 1250 come into contact with each other, and the insertion-position-maintaining members 1250 are rotated toward the outside of the insertion portion 602 against the springs 252. Consequently, the insertion-position maintaining means of the disk cartridge is released. As described above, according to the present embodiment, the position-in-height maintaining means and the insertion-position maintaining means as the second opening/closing-cover holding means can be released sequentially merely by the insertion of the case body 1110 into the insertion portion 602. That is to say, in the present embodiment the means for unlocking the opening/closing cover holding means does not require a special member such as the bar 731 releasing an opening/closing-cover holding means of the adapter 500 in the third embodiment and is formed of both components of the position-in-height maintaining means and the insertion-position maintaining means that are formed so as to be operated as described above.

When the case body 1110 is further inserted, the steps 203b of the first locking projections 203 formed in both sides of the opening/closing cover 1120 come into contact with the entrance edges of the opening 1111 of the case body 1110. Since slopes are formed at the entrance edges of the opening 1111, the first locking projections 203 are subjected to an inward force by the slopes, thus elastically deforming the hinges 204. As a result, when the hinges 204 are elastically deformed the first locking projections 203 slide on the inner walls 104 of the opening 1111.

When the opening/closing cover 1120 is accommodated in the disk-storage portion 1112 completely, the first locking means and the third locking means of the disk cartridge 1000 function. That is to say, as explained with reference to FIGS. 31–35, when the first locking projections 203 reach the locking holes 105, the hinges 204 are elastically restored. Then, the locking projections 203 fit into the locking holes 105 and thus the opening/closing cover 1120 is fixed and held to the case body 1110. At almost the same time, the slopes 1510 of the movable pieces 1503 of the case body and the third locking projections 209 of the opening/closing cover 1120 come into contact with each other. While the movable pieces 1503 are elastically deformed inwards, the third locking projections 209 pass through the paths 209a. When the third locking projections 209 have passed through the paths 209a completely, the movable pieces 1503 come back to the initial state. Consequently, the third locking projections 209 are engaged with the third locking holes 1511.

Thus, the opening/closing cover 1120 and the disk 10 can be ejected to the outside together with the case body 1110 as one body (FIG. 42).

As described above, according to the present embodiment, by operating the operating member 1210a by hand, the first unlocking means, the third unlocking means, and the first opening/closing-cover holding means are operated at the same time, thus obtaining an adapter with a simple configuration.

Further, the adapter is designed so that the hinges 204 formed in the opening/closing cover 1120 are not elastically deformed when the opening/closing cover 1120 is held inside the insertion portion 602 of the adapter. Therefore, creep that occurs by deforming the hinges 204 can be prevented.

Similarly, when the opening/closing cover 1120 is held inside the insertion portion 602 of the adapter, a bridge portion 1503a connecting the movable portions 1503 and the case body 1110 is not elastically deformed. Therefore, creep deformation of the bridge portion 1503a does not occur even in the case where the opening/closing cover 1120 is inserted in the adapter for a long period.

The releasing operation of the second opening/closing-cover holding means proceeds by simply inserting the case body 1110 into the insertion portion 602. Thus, the operability in ejecting the disk is improved.

The opening/closing cover 1120 that is installed inside the adapter can be held by the second opening/closing-cover holding means provided separately from the first opening/closing-cover holding means. Therefore, for example, even if a user manipulates the handle 1218 incorrectly when the door 510 is opened (in the condition shown in FIG. 46), the opening/closing cover 1120 and the disk 10 do not fall off from the insertion portion 602 accidentally. Consequently, it is not necessary to provide the means for locking the means for releasing the opening/closing-cover holding means shown in the third embodiment, thus simplifying the configuration.

EXAMPLES

The present invention will be explained further in detail using an example.

In the standard of DVD (digital video disc) RAM, there is a regulation about a cartridge accommodating a DVDRAM disk with a diameter of 120 mm. On the other hand, in order to improve the portability of the DVDRAM, the advent of a DVDRAM disk with a diameter of 80 mm and a disk cartridge accommodating the same has been waited and thus their standards have been studied.

Then, in the present example, disk cartridges accommodating a DVDRAM disk with a diameter of 80 mm were produced experimentally according to the above-mentioned first, second, and fourth embodiments. On the other hand, adapters having compatibility with a cartridge in accordance with the standard of a DVDRAM accommodating the DVDRAM disk with a diameter of 120 mm were produced experimentally according to the above-mentioned third and fifth embodiments. The DVDRAM disks with a diameter of 80 mm were loaded into the adapters, thus testing the recording, reproduction, and erasure of information in a drive unit designed for a DVDRAM.

The disk cartridges and adapters produced experimentally will be described in detail as follows.

Disk Cartridge 1

A disk cartridge accommodating a DVDRAM disk with a diameter of 80 mm having the configuration described in the first embodiment was produced experimentally.

A cartridge case had a width of 85 mm, a depth of 90 mm, and a thickness of 5 mm. A head access opening 180 had a width of 23 mm.

A case body 101 was formed in a predetermined shape using polycarbonate and an opening/closing cover 201 was formed in a predetermined shape using polyacetal. A shutter 181 was formed by processing a stainless steel plate with a thickness of 0.2 mm. A belt opener 183 was a cast of polyacetal.

The obtained disk cartridge was loaded into a drive unit that had been produced experimentally and studied separately as a drive unit designed for a disk cartridge accommodating a DVDRAM disk with a diameter of 80 mm. Thus, it was confirmed that information could be recorded, reproduced, and erased.

Disk Cartridge 2

A disk cartridge accommodating a DVDRAM disk with a diameter of 80 mm having the configuration described in the second embodiment was produced experimentally.

A cartridge case had a width of 85 mm, a depth of 90 mm and a thickness of 5 mm. A head access opening 180 had a width of 23 mm.

A case body 101 was formed in a predetermined shape using polycarbonate and an opening/closing cover 201 was formed in a predetermined shape using polyacetal. A shutter 181 was formed by processing a stainless steel plate with a thickness of 0.2 mm. A belt opener 183 was a cast of polyacetal.

The obtained disk cartridge was loaded into a drive unit that had been produced experimentally and studied separately as a drive unit designed for a disk cartridge accommodating a DVDRAM disk with a diameter of 80 mm. Thus, it was confirmed that information could be recorded, reproduced, and erased.

Disk Cartridge 3

A disk cartridge accommodating a DVDRAM disk with a diameter of 80 mm having the configuration described in the fourth embodiment was produced experimentally.

A cartridge case had a width of 90 mm, a depth of 92 mm, and a thickness of 5.2 mm. A head access opening 180 had a width of 26 mm.

A case body 1110 was formed in a predetermined shape using polycarbonate and an opening/closing cover 1120 and a slider 1104 were formed in respective predetermined shapes using polyacetal. A shutter 181 was formed by processing a stainless steel plate with a thickness of 0.5 mm.

The obtained disk cartridge was loaded into a drive unit that had been produced experimentally and studied separately as a drive unit designed for a disk cartridge accommodating a DVDRAM disk with a diameter of 80 mm. Thus, it was confirmed that information could be recorded, reproduced, and erased.

Adapter 1

An adapter having the configuration described in the third embodiment and the compatibility with the cartridge in accordance with the standard of the DVDRAM accommodating a DVDRAM disk with a diameter of 120 mm was produced experimentally.

An adapter case had a width of 124.6 mm, a depth of 135.5 mm, and a thickness of 8 mm. In upper and lower cases, a head access opening was provided for inserting a disk motor and an optical head as shown in FIGS. 12 and 13. The head access opening was covered by a shutter that was opened and closed to the left and right. The head access opening for a disk motor had a width of 34 mm and one for an optical head had a width of 39 mm.

An upper case 501, a lower case 601, and a door 510 were formed in respective predetermined shapes using polycarbonate. A press-rotating member 711 and disk-positioning members 751*a*, 751*b* were formed in respective predetermined shapes using polyacetal. An opening/closing cover holding plate 701 and a bar 731 releasing an opening/closing-cover holding means were obtained by processing stainless steel plates in respective predetermined shapes.

Adapter 2

An adapter having the configuration described in the fifth embodiment and the compatibility with the cartridge in accordance with the standard of a DVDRAM accommodating the DVDRAM disk with a diameter of 120 mm was produced experimentally.

An adapter case had a width of 124.6 mm, a depth of 135.5 mm, and a thickness of 8 mm. In upper and lower cases, a head access opening was provided for inserting a disk motor and an optical head as shown in FIGS. 39 and 40. The head access opening was covered by a shutter that was opened and closed to the left and right. The head access opening for a disk motor had a width of 34 mm and one for an optical head had a width of 39 mm.

An upper case 1220, a lower case 1230, and a door 510 were formed in respective predetermined shapes using polycarbonate. Operating members 1210, position-in-height maintaining members 1240, insertion-position-maintaining members 1250, and disk-positioning members 1280 were formed in respective predetermined shapes using polyacetal.

Effect

By inserting each of the above-mentioned disk cartridges 1 and 2 into the insertion portion 602 of the obtained adapter 1 in order, the disk and the opening/closing cover were loaded into the adapter. Then, the adapter was loaded into a drive unit designed for a cartridge in accordance with the DVDRAM standard. As a result, it was confirmed that information could be recorded, reproduced, and erased without any problem in both cases. After that, the case body was inserted into the insertion portion 602 of the adapter and then the accommodated disk and the opening/closing cover were ejected. There was no particular problem in operability in loading or ejecting the disk and the opening/closing cover from the adapter via the case body. Further, the disk cartridge 3 was inserted into the insertion portion 602 of the obtained adapter 2 and the same test as in the adapter 1 was carried out to confirm the same effect.

Second Invention

Embodiments of the present second invention will be explained in detail with reference to the drawings.

Sixth Embodiment

Figure 52:
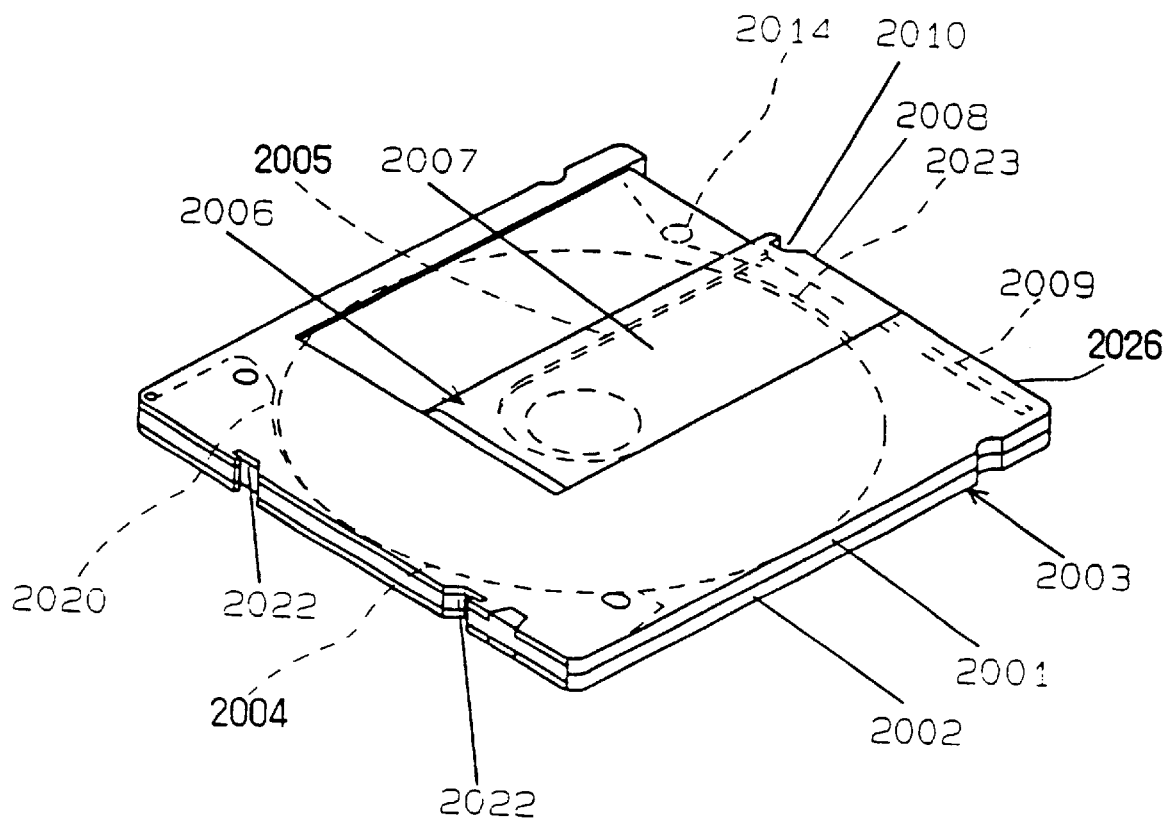
FIG. 52 is a perspective structural view showing an example of a disk cartridge according to an embodiment of the present second invention.
Figure 53:
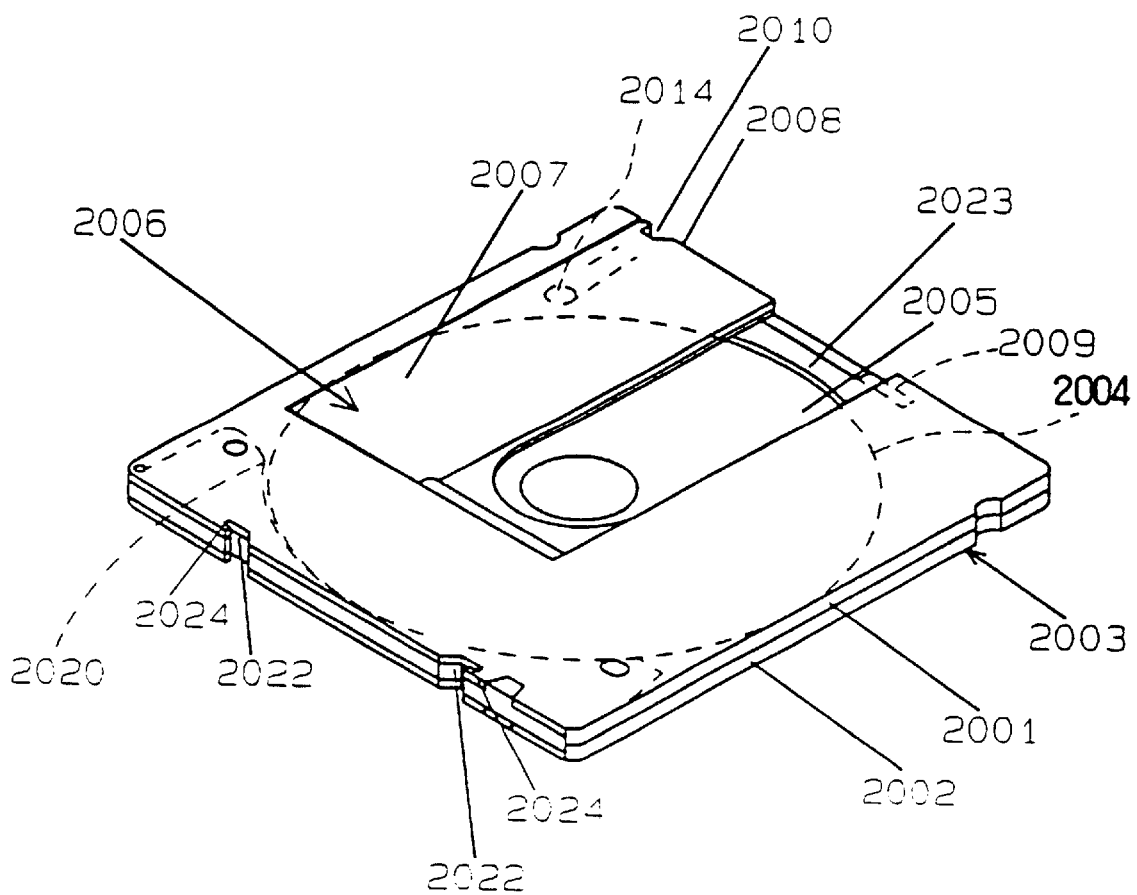
FIG. 53 is a perspective structural view showing the disk cartridge shown in FIG. 52 when a shutter is opened.

FIG. 52 is a perspective structural view showing a disk cartridge according to an embodiment of the present invention. FIG. 53 is a perspective structural view showing the state in which a shutter of the disk cartridge is opened. A substantially rectangular case body 2003 formed of an upper half 2001 and a lower half 2002 comprises a disk-storage portion that accommodates a disk 2004 in its inside. An opening 2005 is provided in the upper and lower halves, and a disk motor and an optical pickup can be inserted through the opening 2005. Normally, a shutter 2006 covers the opening 2005 through which the optical pickup and the disk motor of a drive unit intrude so that the disk 2004 can not be touched easily.

A bridge portion 2023 is formed in the front-end side of the opening 2005. The bridge portion 2023 is thinner than the case body 2003. That is to say, the bridge portion 2023 is formed so as to be recessed from the upper and lower surfaces of the case body 2003.

A U-shaped shutter 2006 for covering and uncovering the opening 2005 is slidably provided on the case body 2003. When a disk cartridge is inserted into a drive unit, the shutter 2006 is moved. The shutter 2006 comprises two opposed shielding plates 2007 and a connecting portion 2008 interconnecting the two shielding plates 2007. An engagement portion 2010 is formed in the connecting portion 2008. The engagement portion 2010 can be engaged with a shutter opener (not shown in the figure) provided in a loading mechanism (not shown in the figure) of the drive unit when the disk cartridge is loaded into the drive unit. The engagement portion 2010 has a configuration in which the engagement portion 2010 crosses the connecting portion 2008 and connects the two shielding plates 2007 to each other so as to be seen from the two faces of the case body 2003. The connecting portion 2008 fixes and holds the thin and long slider 2009 while covering the slider 2009. The slider 2009 can be moved along the front end of the case body 2003. The surface of the slider 2009 is in the same level as or is recessed from the leading end face of the bridge portion 2023 of the case body 2003.

A torsion coil spring 2014 is provided in the left side of the front end of the case body 2003. The torsion coil spring 2014 urges the shutter 2006 in the direction in which the shutter 2006 covers the opening 2005. The face of the front end (a guide portion 2026) of the case body 2003 on the side to which the shutter 2006 is not moved is at substantially the same level as or protrudes from the surface of the connecting portion 2008 of the shutter 2006.

The configurations and operations of retaining portions 2022 provided at the rear end of the case body 2003 and an opening/closing cover 2020 for ejecting a disk will be described later with reference to other drawings.

A Shutter Opening/Closing Function of a Disk Cartridge According to the Present Embodiment A shutter opening/closing function of the disk cartridge according to the present embodiment will be described with reference to the drawings.

Figure 54:
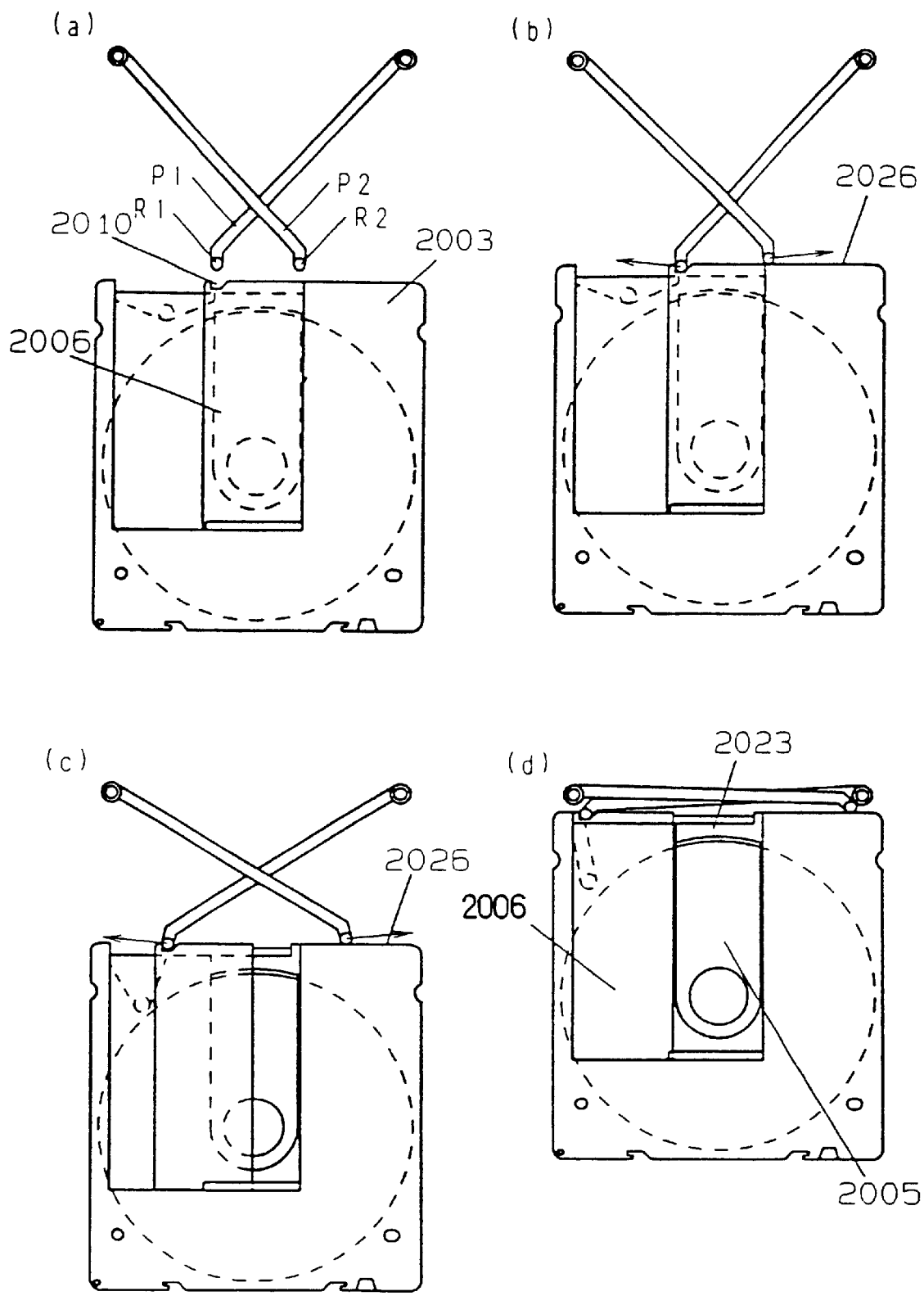
FIG. 54 shows plan views illustrating an opening/closing operation of the shutter of the disk cartridge shown in FIG. 52 by a shutter opener.

FIGS. 54(a)–(d) show plan views illustrating a shutter opening/closing operation by shutter openers of a disk cartridge in a drive unit (not shown in the figure). FIG. 54(a) shows the state before the disk cartridge comes into contact with the shutter openers, and FIG. 54 (b) shows the state at the moment when the both come into contact with each other. FIG. 54(c) shows a state during opening of the shutter by the openers engaged with the shutter. FIG. 54(d) shows the state in which the shutter has been opened completely. A shutter opener P2 that is not engaged comes into contact with a guide portion 2026 provided at the front end of the case body 2003 to be guided.

Its operation will be described with reference to FIG. 54 as follows.

Two rollers R1 and R2 provided at the ends of the shutter openers P1 and P2 are arranged substantially in parallel to the leading face of the cartridge before coming into contact with the disk cartridge. Upon the contact, the roller R1 engages with an engagement portion 2010 on the shutter 2006. Since the disk cartridge is moved forward by a loading mechanism (not shown in the figure), the shutter openers pivot accordingly. The engagement portion 2010 of the shutter 2006 has engaged with the roller R1 and therefore the shutter 2006 slides to the left to be opened. The other roller R2 comes into contact with the leading face of the disk cartridge. However, since no engagement portion for the roller R2 is provided, it moves on the guide portion 2026 of the front end of the disk cartridge without being retained. Thus, the two rollers R1 and R2 are moved outwards in the direction shown by an arrow, i.e. a direction in which the rollers R1 and R2 are spaced from each other after the engagement of the roller R1.

In this case, the rollers R1 and R2 of the shutter openers P1 and P2 do not overlap in the region where they are moved at the front end of the disk cartridge. Therefore, it is not necessary that the case body 2003, i.e. the disk cartridge has a thickness set considering an anticipated overlap. Consequently, the thickness of the case body can be set considering only the width of one roller and thus the thickness can be decreased by arranging the engagement portion 2010 and the guide portion 2026 so that the guide portion 2026 does not overlap in the region where the engagement portion 2010 is moved.

As shown in FIG. 54(d), when the shutter 2006 is opened completely, the opening 2005 is uncovered to the front end of the case body 2003. The engagement portion 2010 to be engaged with the shutter opener is arranged movably along the front end of the case body including the bridge portion 2023. When the shutter 2006 is opened completely, the center at the front end of the case body 2003 has only the bridge portion 2023 recessed from the two case faces. Therefore, an optical head of a drive unit and a cramp mechanism for a disk need to cross over merely the bridge portion 2023 when being passed. Thus, by decreasing the thickness of the bridge portion 2023, the thickness of the drive unit itself can be decreased at the same time.

Figure 55:
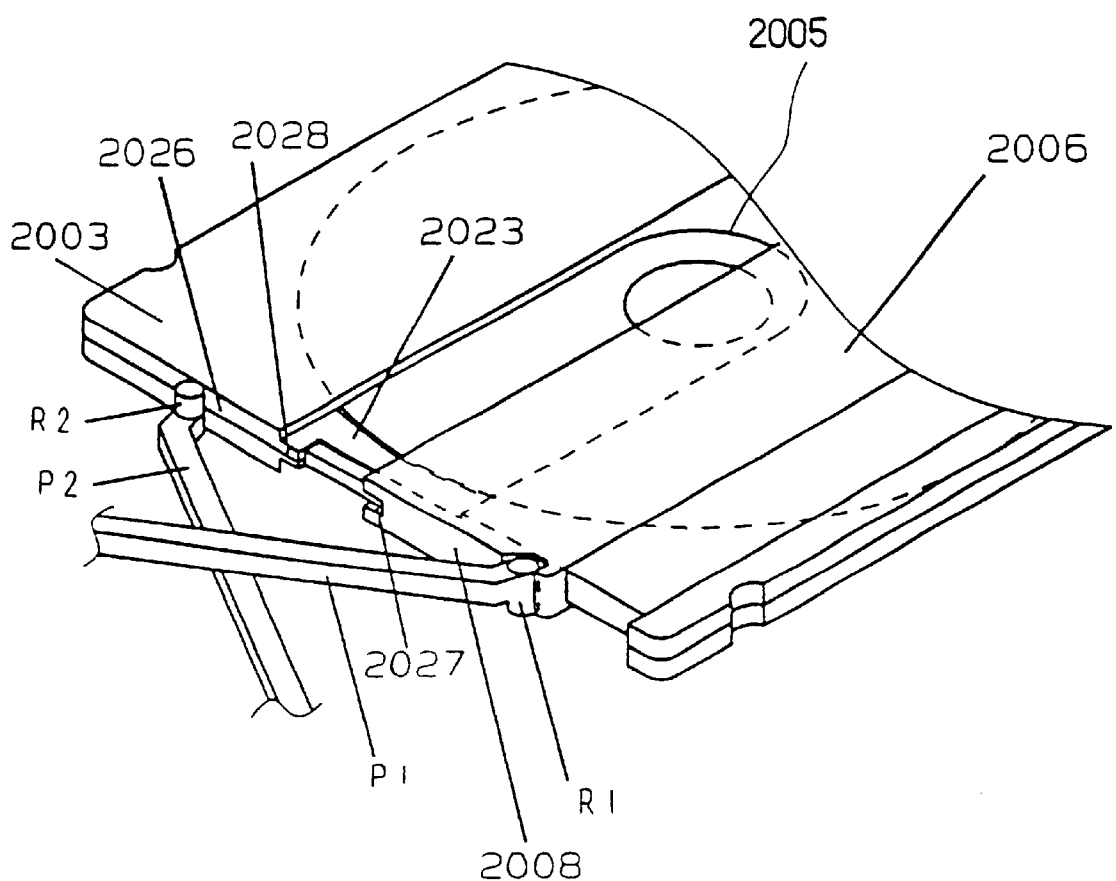
FIG. 55 is an enlarged perspective structural view of a connecting portion of a shutter and a guide portion of the disk cartridge shown in FIG. 52.

Further, as shown in FIG. 55, which is a perspective structural view of the front end of the cartridge, a notch 2027 is provided at the end of the connecting portion 2008 of the shutter 2006 and in the guide portion 2026 side, and an engagement portion (a convex part in the present embodiment) 2028 that can fit into the notch 2027 is formed in the guide portion 2026 and in the connecting portion 2008 side. In addition, the surface of the guide portion 2026 including this convex part 2028 is formed so as to be at substantially the same level as or protrude from the face of the connecting portion 2008. The roller R2 of the shutter opener P2 is formed so as to come into contact only with the guide portion 2026 including the convex part 2028 and not with the connecting portion 2008. By such a configuration, the surfaces (the convex part 2028 and the guide portion 2026) on which the roller R2 is guided have no difference in level and therefore the shutter opener can move on the guide portion 2026 smoothly. The shutter opener does not get stuck on the connecting portion 2008 during the movement. Therefore, the load resistance does not increase, thus obtaining an excellent operational feeling. In this case, the guide portion 2026 is not formed at the center portion of the leading end face and the convex part 2028 is formed in the connecting portion 2008 side of the guide portion 2026 intentionally. This is because when the guide face 2026 is formed at the center portion of the leading end face, it is necessary to shorten the length of the connecting portion 2008 in the moving direction in order to allow the shutter 2006 to be opened and closed by the shutter openers while permitting reverse-use, which causes the decrease in the strength of the connecting portion.

A Function for Preventing Erroneous Insertion of a Disk Cartridge According to the Present Embodiment A function for preventing erroneous insertion of the disk cartridge according to the present embodiment will be explained with reference to the drawings.

Figure 56:
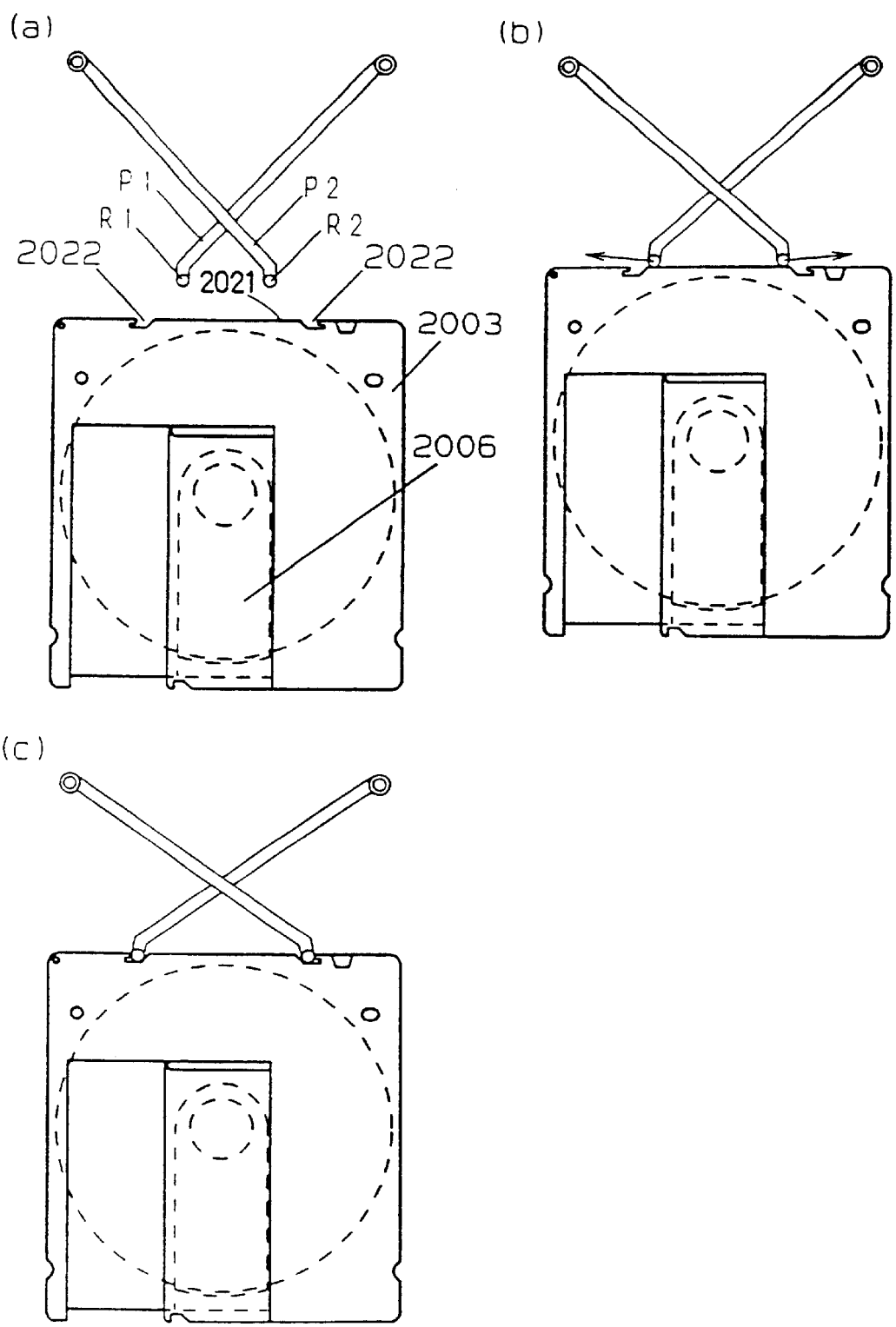
FIG. 56 shows plan views illustrating an operation of the disk cartridge and the shutter opener when the disk cartridge shown in FIG. 52 is inserted into a drive unit with its front side back.

FIGS. 56(*a*)–(*c*) are plan views showing the operation of the disk cartridge and the shutter openers when the disk cartridge is inserted into a drive unit (not shown in the figures) with its front side back. FIG. 56(*a*) shows a state before the shutter openers come into contact with the cartridge. FIG. 56(*b*) shows a state at the moment when the both come into contact with each other. FIG. 56(*c*) shows a state in which the shutter openers are engaged with retaining portions.

In FIG. 56, numerals 2021 and 2022 indicate a second guide portion provided at the rear end of the case body and retaining portions arranged at the rear end, respectively. At the rear end of the case body 2003, the retaining portions 2022 are formed symmetrically with respect to the center line of the case body 2003. The retaining portions 2022 are formed of a hook-shaped cut when seen from the case-face side. The second guide portion 2021 and the retaining portions 2022 are provided in a region where the shutter opener moves.

Its operation will be described with reference to FIG. 56 as follows.

When the cartridge is inserted with its front side back, the ends of the shutter openers P1 and P2 come into contact with and are guided by the second guide portion 2021 of the rear end of the case body. The shutter openers P1 and P2 fit into the two retaining portions 2022 at substantially the same time. However, the retaining portions 2022 are different from the engagement portion 2010 provided in the slidable shutter 2006 as described above in that the shutter openers P1 and P2 cannot pivot when both the rollers R1 and R2 of the shutter openers P1 and P2 engage with the fixed retaining portions 2022, thus regulating the insertion of the disk cartridge. Furthermore, since a pair of the retaining portions 2022 are arranged symmetrically with respect to the center line of the case body, erroneous insertion of the cartridge can be regulated by the shutter openers P1 and P2 regardless of the side of the cartridge. In addition, it can be avoided that the load at the time of the regulation is biased to one of the two shutter openers P1 and P2.

A Chucking Function of the Disk Cartridge of the Present Embodiment

A chucking function of the disk cartridge of the present embodiment will be explained with reference to the drawings as follows.

Figure 57:
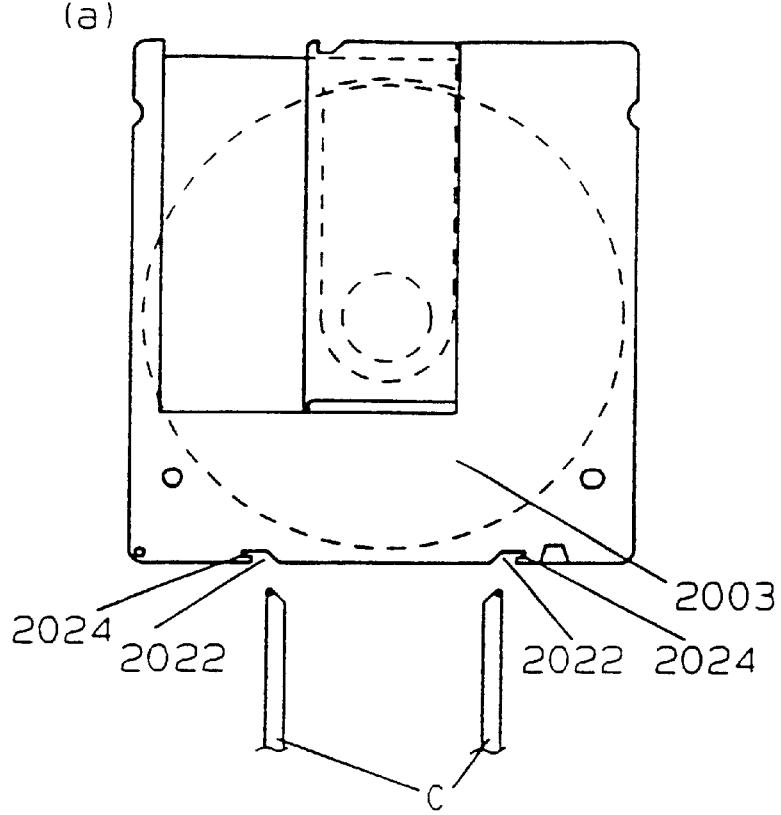
FIG. 57 shows plan views illustrating an operation of the engagement between the disk cartridge shown in FIG. 52 and a disk cartridge chucking mechanism in a changer.
Figure 57:
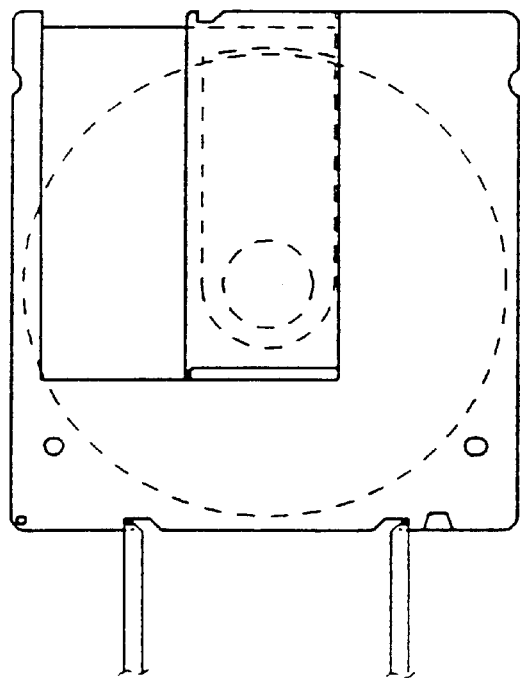

As shown in FIGS. 52, 53, 56 or 57, the retaining portions 2022 have a hook-like shape. FIGS. 57(*a*) and (*b*) are plan views showing an engagement operation between a disk-cartridge chucking mechanism and the disk cartridge, for example, within a changer unit (not shown in the figures). For instance, when the disk cartridge is adapted to a changer unit or the like, during the operation of changing disk cartridges pins provided at the ends of chucking arms C as a chucking mechanism engage with hook-shaped portions 2024 of retaining portions provided at the rear end of the case body 2003 as shown in FIG. 57, thus enabling the operation of changing the disk cartridges. Therefore, the formation of the retaining portion for preventing the above-mentioned reverse insertion at least partially in a hook shape enables this chucking operation. As a result, it is not necessary to form grooves or the like in other parts of the case body as in a conventional technique. Therefore, it is enough for a disk-storage portion for accommodating the disk to have a size that is required and sufficient for driving the disk. Thus, it is not necessary to form the disk-storage portion with a larger size than that required.

A Disk Ejecting Function of the Disk Cartridge of the Present Embodiment

A disk ejecting function of the disk cartridge of the present embodiment will be explained with reference to the drawings as follows.

Figure 58:
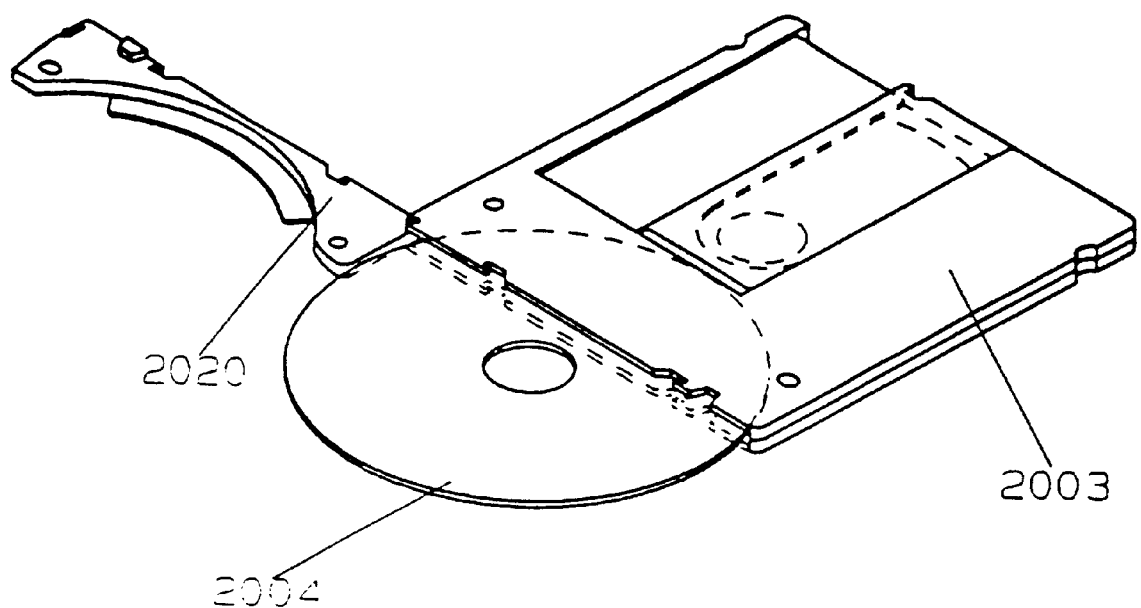
FIG. 58 is a perspective structural view showing an opened state (when a disk is about to be ejected) of a cover for ejecting a disk of the disk cartridge shown in FIG. 52.

FIG. 58 is a perspective structural view showing a state of inserting or ejecting the disk 2004 in which the opening/closing cover 2020 for ejecting a disk pivots upon a pivot axis provided at the rear end of the case body 2003. FIG. 58 shows a configuration in which the opening/closing cover 2020 is opened by pivoting upon the pivot axis, which allows the opening/closing cover 2020 to be positioned easily when the cover is closed and avoids that a user loses the opening/closing cover 2020. However, another configuration in which the opening/closing cover can be separated from the case body completely when being opened may be employed.

Figure 59:
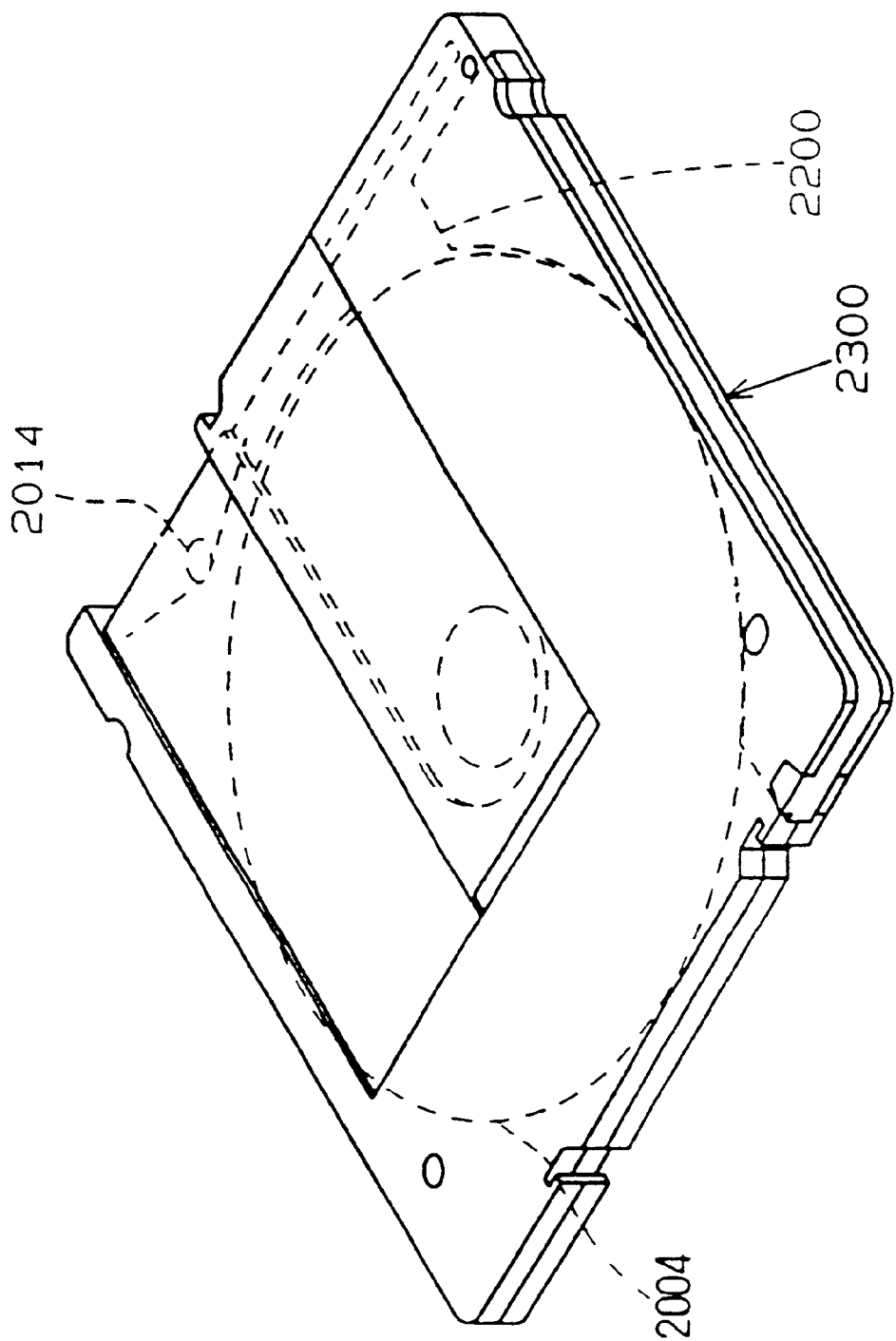
FIG. 59 is a perspective structural view showing a disk cartridge according to another embodiment of the present second invention.

It is not always necessary to arrange the opening/closing cover 2020 for ejecting a disk only at the rear end of the case body 2003. For example, the opening/closing cover 2020 may be provided at either side end of the case body, particularly at the side end shown in the right side in FIG. 1. FIG. 59 is a perspective structural view of a disk cartridge of another embodiment having such a configuration. As shown in FIG. 59, when an opening/closing cover 2200 for ejecting a disk is provided at a side end, the disk cartridge may be designed so that the opening/closing cover 2200 does not obstruct the auto-loading, for example, so that the opening/closing cover 2200 is located at a position slightly inward from the side end face of the case body 2300 to be fixed provisionally when being closed, since it is conceivable that the case body are guided by its side ends at the time of auto-loading of the disk cartridge into a recording and reproducing unit. As shown in FIG. 59, the opening/closing cover is arranged at the side end in the right side in FIG. 52. This is because a moving portion of the torsion coil spring 2014 playing a part in opening and closing the shutter is provided in the vicinity of the left side end. Therefore, the opening/closing cover may be arranged at the left side end when, for example, the torsion coil spring 2014 is provided in the vicinity of the right side end that is the opposite side end to that shown in the drawing while the shutter 2006 is opened and closed in the same direction as in FIG. 52.

By providing the opening/closing cover in such a manner, a disk can be ejected from the disk-storage portion while the characteristics of each function described above are maintained.

In the above-mentioned embodiment, a disc-shaped recording and reproducing medium is explained as an optical disk in which information is recorded and reproduced by irradiation of light. However, needless to say, the medium is not always limited to this. As long as information can be recorded on and reproduced from both sides of the medium, any media for optical recording, magneto-optical recording, magnetic recording or other recording methods may be employed. In addition, the present embodiment also can be applied to a disk on which information has been recorded and which is only capable of reproducing the information and not capable of rerecording, rewriting, or overwriting, such as a so-called CD (a compact disc). Further, as the disk recording and reproducing unit described above, any disk reproducing units only capable of reproduction or any disk recording units only capable of recording can be used, as long as a disk cartridge having such a configuration as described above in the embodiment can be loaded.

Figure 60:
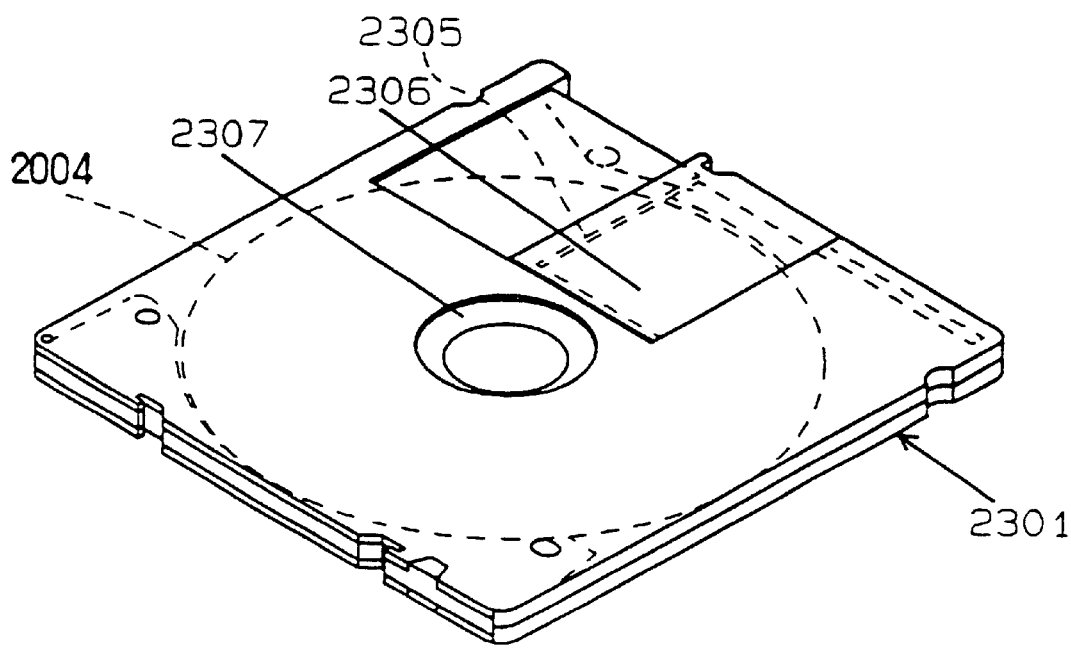
FIG. 60 is a perspective structural view showing a disk cartridge according to further embodiment of the present second invention.
Figure 61:
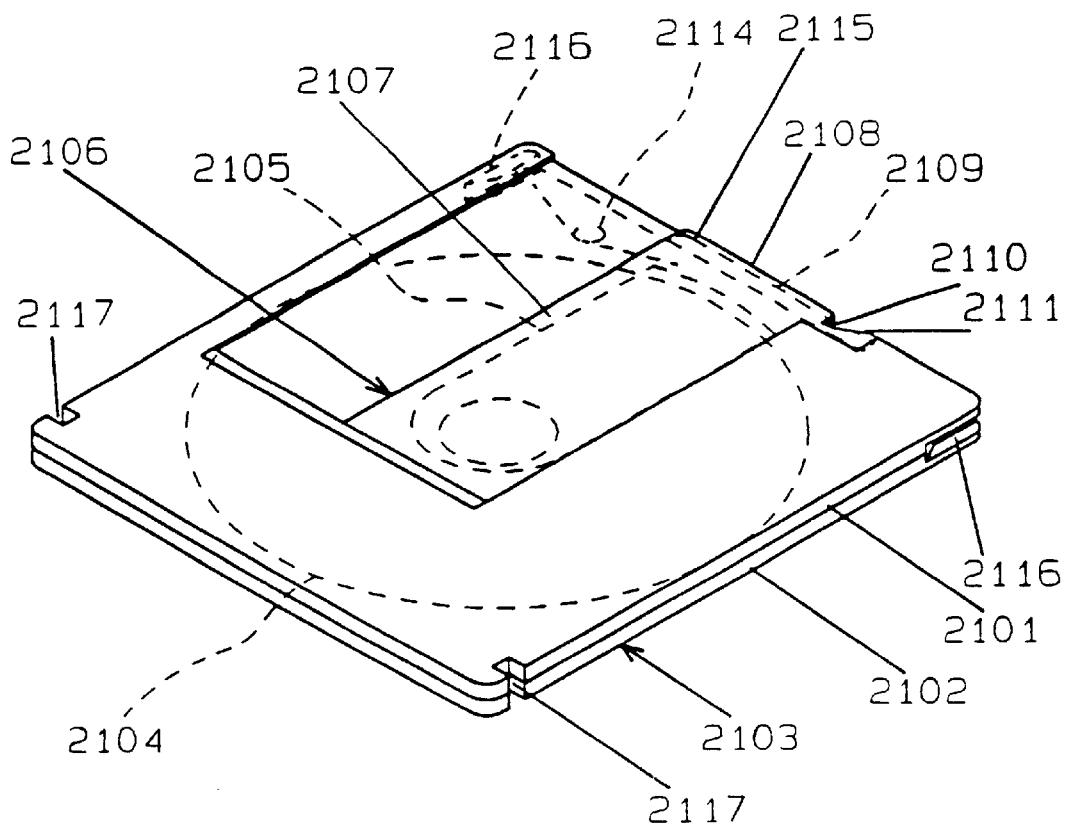
FIG. 61 is a perspective structural view showing a conventional disk cartridge.
Figure 62:
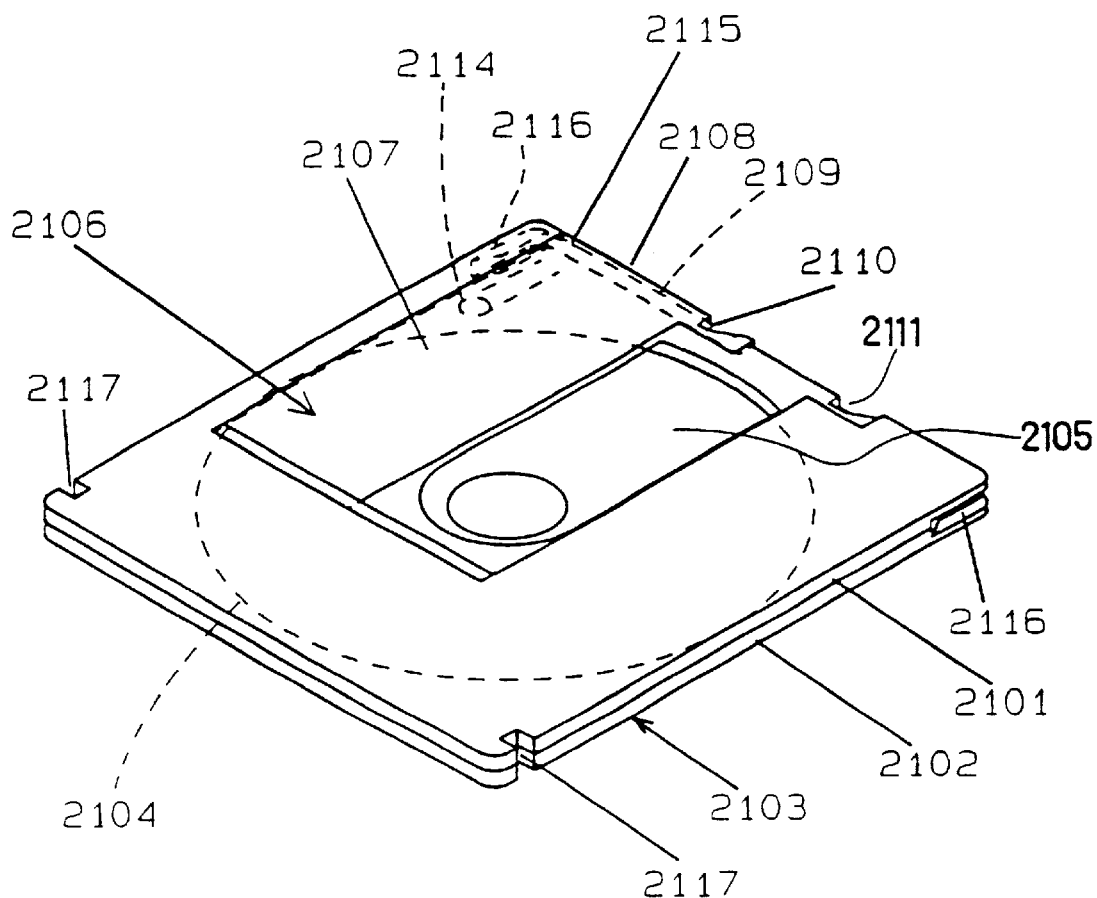
FIG. 62 is a perspective structural view illustrating a state in which a shutter of the disk cartridge shown in FIG. 61 is opened.
Figure 63:
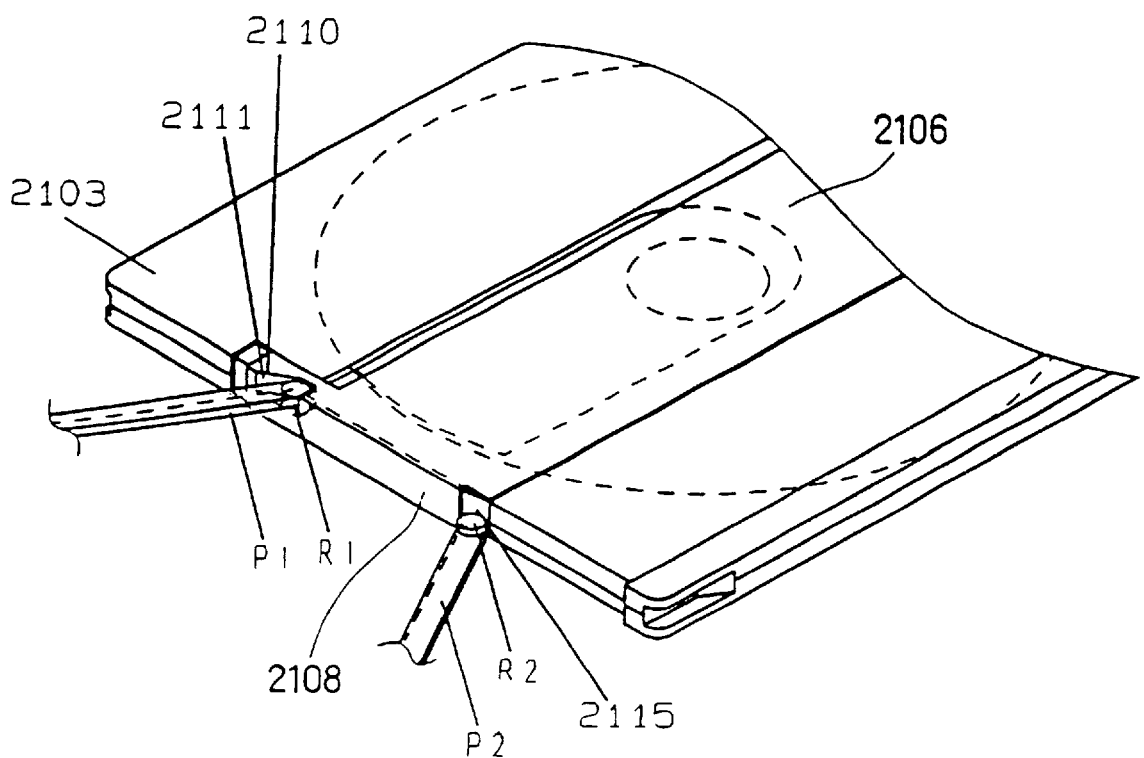
FIG. 63 is an enlarged perspective structural view showing the vicinity of the shutter of the disk cartridge shown in FIG. 61.

In the above-mentioned embodiment, not only the recording and reproducing surface of a disk but also the center hole of the disk for rotational drive of the disk is exposed from the opening and is covered by the shutter. However, the same effect can be obtained even when a configuration of such a disk cartridge of another embodiment shown in FIG. 60 is employed. In the configuration, the center hole of a disk is always exposed from a second opening 2307 provided at the center portion of a case body 2301, only a recording and reproducing surface of the disk is exposed from a first opening 2305, and only the first opening 2305 is covered by a shutter 2306.

Moreover, in all the above-mentioned embodiments, for example, as shown in FIG. 52, the explained disk cartridge is provided with all of the shutter opening/closing operation function, the erroneous insertion preventing function, the chucking function, and the disk ejecting function. However, the disk cartridge is not always limited to this. Needless to say, the present invention also can be applied to disk cartridges such as those having the shutter opening/closing operation function and the disk ejecting function, those having the erroneous insertion preventing function, the chucking function, and the disk ejecting function, those having only the erroneous insertion preventing function and the disk ejecting function, those having the shutter opening/closing operation function, the erroneous insertion preventing function, and the chucking function, those having only the shutter opening/closing operation function and the erroneous insertion preventing function, those having only the shutter opening/closing operation function, and those having only the erroneous insertion preventing function.

As described above, according to the present second invention, the shutter can be opened and closed smoothly without decreasing the size of the disk-storage portion for accommodating a disk. Furthermore, the present second invention can handle with the erroneous insertion of the disk cartridge with its front side back and at the same time enables a disk change operation in a changer unit or the like and an accommodated disk itself to be ejected. Thus, the present invention provides an effect that a disk cartridge can be decreased in size and thickness and at the same time a drive unit also can be decrease in its size and thickness while having functions required for a disk cartridge.

Third Invention

Embodiments of the present third invention will be explained in detail with reference to the drawings as follows.

Seventh Embodiment

Figure 64:
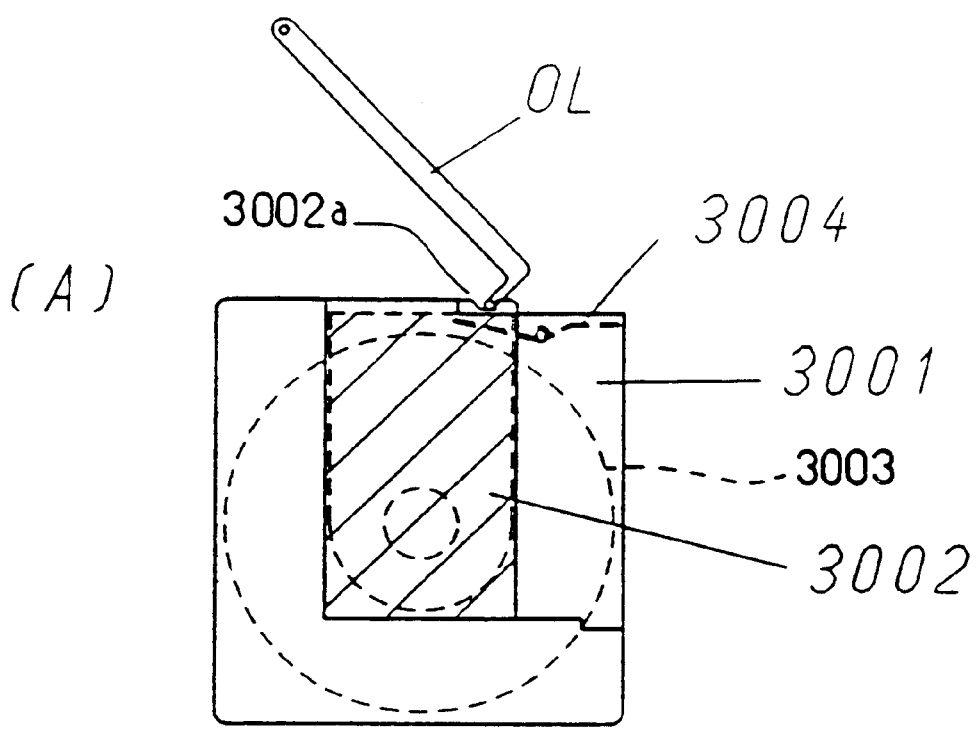
FIG. 64 shows front views illustrating a configuration of a disk cartridge according to a seventh embodiment of the present third invention.
Figure 64:
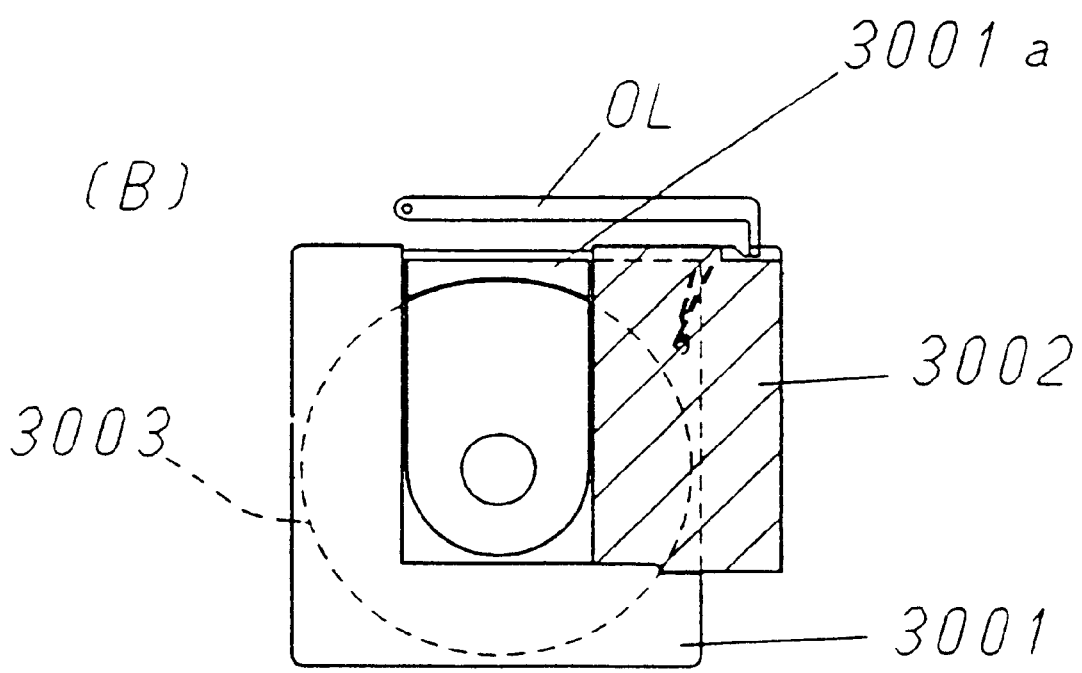

FIG. 64 shows front views of a disk cartridge of the seventh embodiment of the present invention. FIG. 64(A) shows the same when a shutter is closed and FIG. 64(B) shows the same when the shutter is opened. A shutter 3002 is illustrated with hatching so that the position of the shutter is recognized easily.

In FIG. 64, a numeral 3001 indicates a cartridge body made of synthetic resins in which a disk 3003 of a recording medium is accommodated rotatably. A numeral 3001a indicates an opening provided in both faces of the cartridge body 3001 for exposing surfaces of the disk 3003 so that light can be irradiated onto the disk 3003 across its inner and outer peripheries for recording and reproducing information. In the cartridge body 3001 shown in FIG. 64, it is necessary to hold a center hole of the disk 3003 so that the disk 3003 is rotated by a disk recording and reproducing unit. Therefore, the opening 3001a is provided so as to expose the center hole of the disk 3003 completely. A numeral 3002 indicates a shutter formed of a thin plate made of metal such as aluminum or the like or a synthetic resin plate. The shutter 3002 is slidably maintained by the cartridge body 3001 so as to shield the disk 3003 by covering the opening 3001a completely and expose the disk 3003 by uncovering the opening 3001a.

Figure 68:
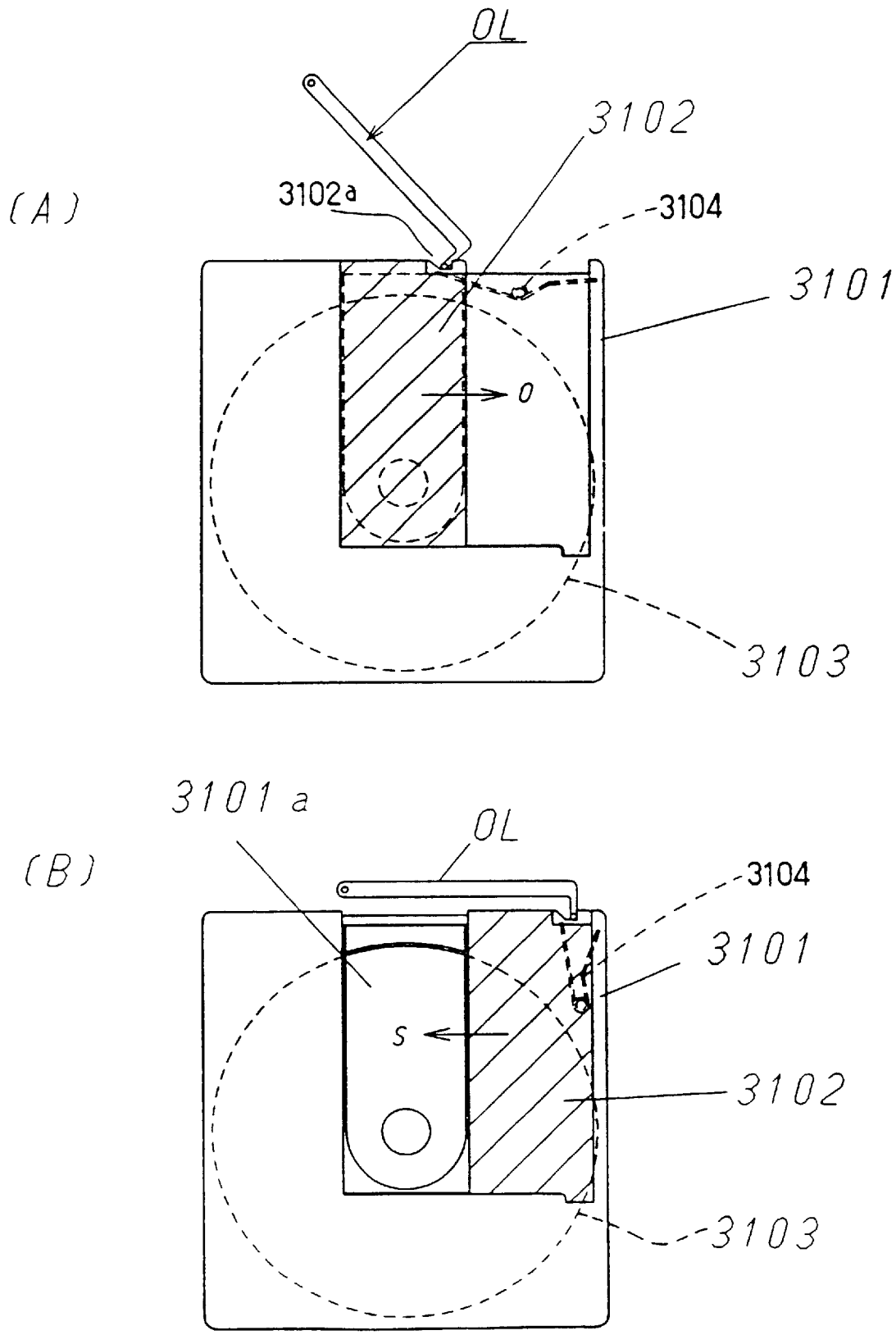
FIG. 68 shows front views illustrating a configuration of a conventional disk cartridge.
Figure 69:
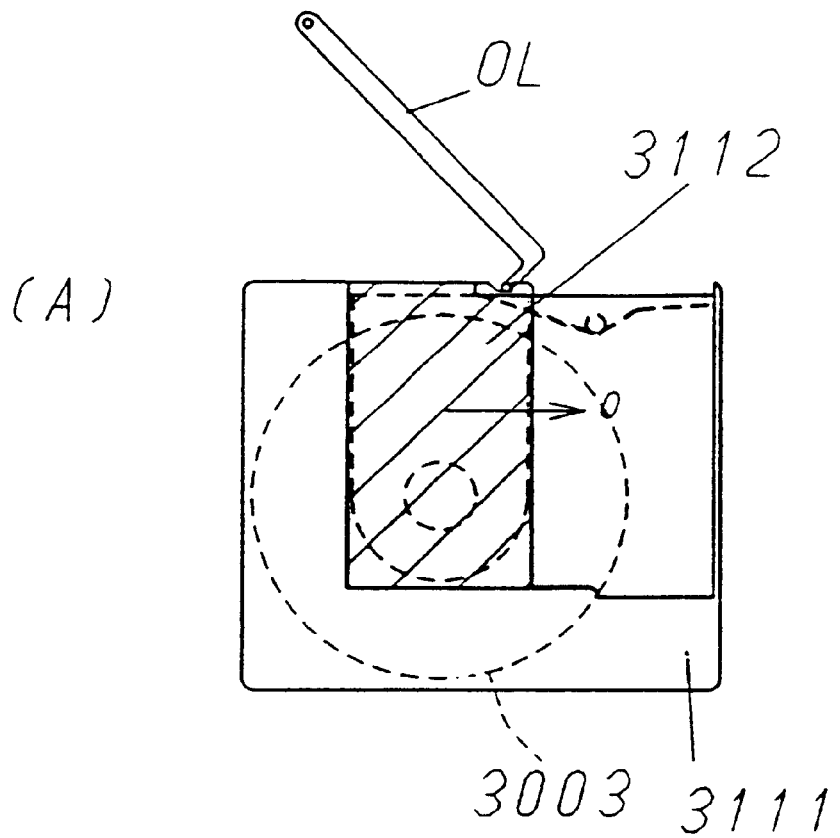
FIG. 69 shows front views illustrating a configuration of a conventional disk cartridge for a small-diameter disk.
Figure 69:
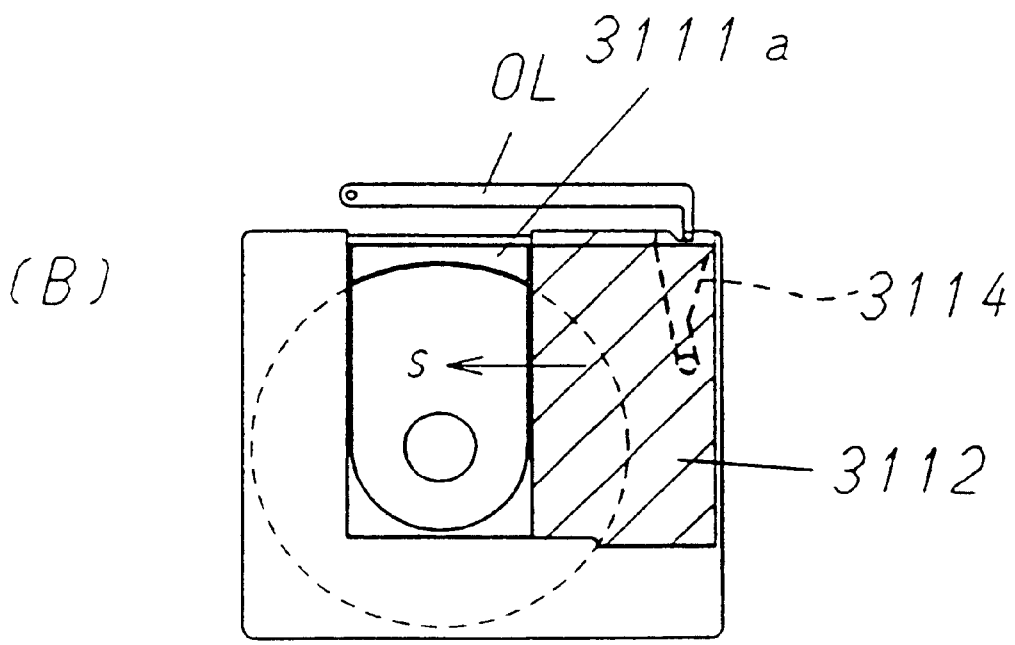

The disk cartridge of the present embodiment is different from the conventional disk cartridge shown in FIGS. 68 and 69 in that the cartridge body of the present embodiment has a width narrower than that of the cartridge body shown in FIG. 69 and has a size that is sufficient and minimum for accommodating the single disk 3003, while the opening 3001a of the disk cartridge of the seventh embodiment has substantially the same width in the sliding direction as that of the opening 3101a shown in FIG. 68, and the disk 3003 has the same diameter as that of a disk 3003 with a small diameter shown in FIG. 69.

Its operation will be explained with reference to FIG. 64 as follows.

Figure 70:
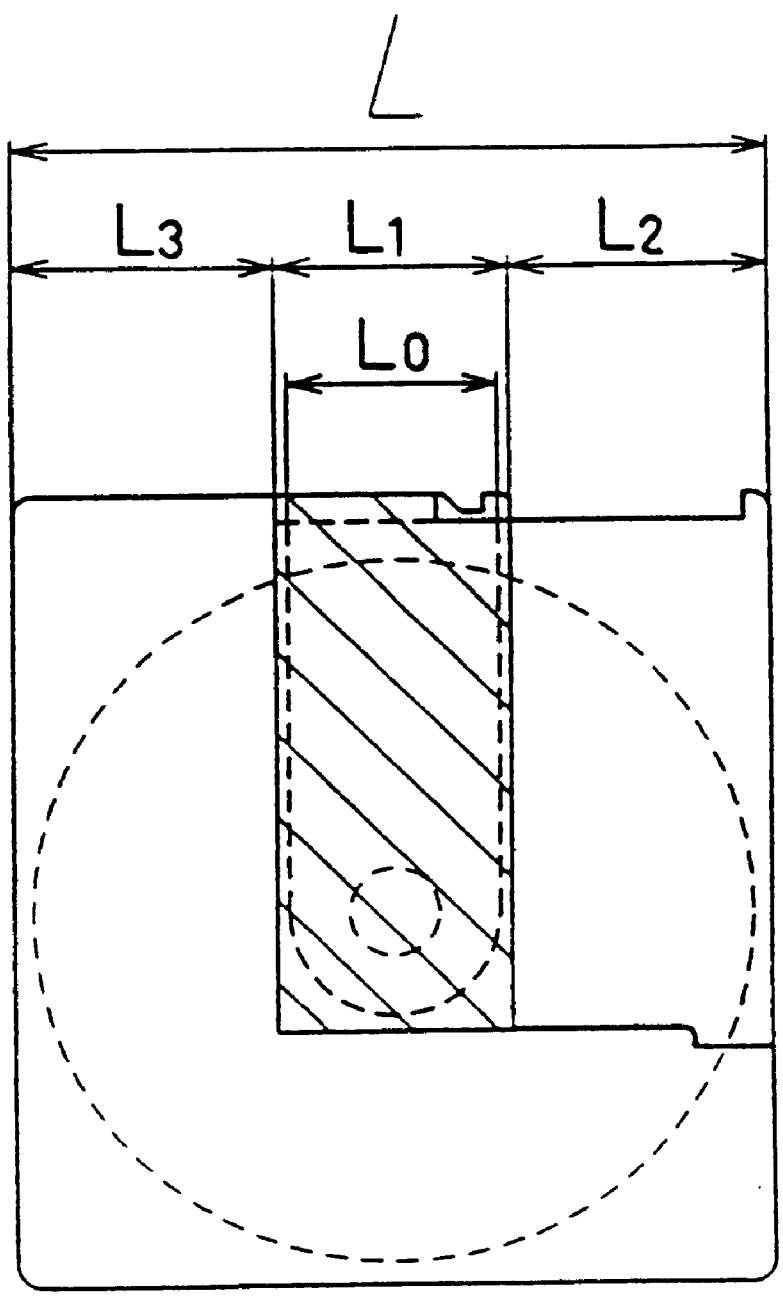
FIG. 70 is a view showing components for explaining factors that determine a size of a cartridge in its width direction.

As shown in FIG. 64(A), the shutter 3002 of the present embodiment has substantially the same width in its sliding direction as that of a shutter 3102 of a disk cartridge for a disk with a larger diameter shown in FIG. 68 and can be opened in one direction by an opener lever OL of a disk recording and reproducing unit. A shutter return spring 3004 is provided inside the cartridge and plays a roll for providing a returning force to the shutter 3002. As shown in FIG. 64(B), the opener lever OL of the disk recording and reproducing unit engages with a concave part 3002a of the shutter and then the shutter 3002 slides, thus exposing the disk 3003 through the opening 3001a. In this case, by positioning a part of the shutter 3002 outside the cartridge body 3001, a space where the shutter 3002 is positioned after being moved can be made small. Therefore, the disk cartridge itself has a size that is sufficient and required for accommodating the disk 3003 inside, thus preventing the disk cartridge from having such a large size as that of a conventional disk cartridge for a small-diameter disk. That is to say, in the disk cartridge of the present embodiment, the relationship, $L0 \geqq L2$ holds between L0 representing a width of the opening and L2 representing a width of a region where the shutter is positioned after being moved to the side (see FIG. 70). In addition, in the present embodiment, one shutter 3002 covers the opening 3001a completely. Therefore, the shutter width L1 should satisfy $L1 \geqq L0$, thus satisfying the relationship, $L1 \geqq L0 \geqq L2$.

Eighth Embodiment

Figure 65:
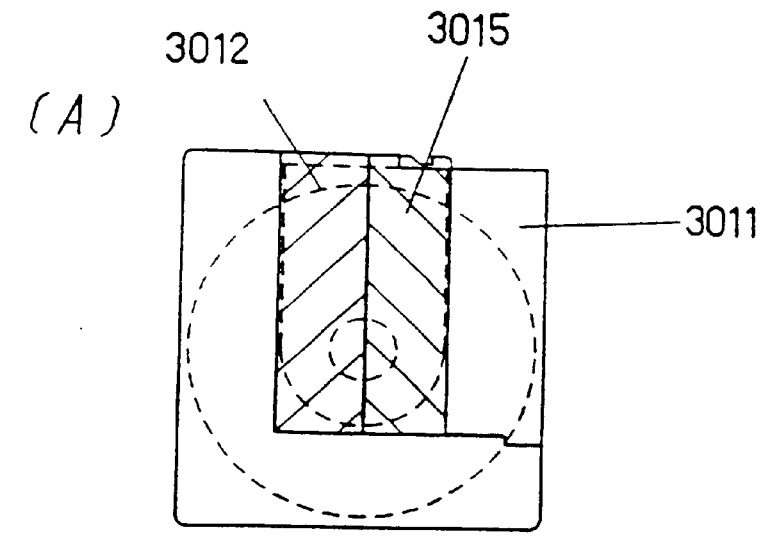
FIG. 65 shows front views illustrating a configuration of a disk cartridge according to an eighth embodiment of the present third invention.
Figure 65:
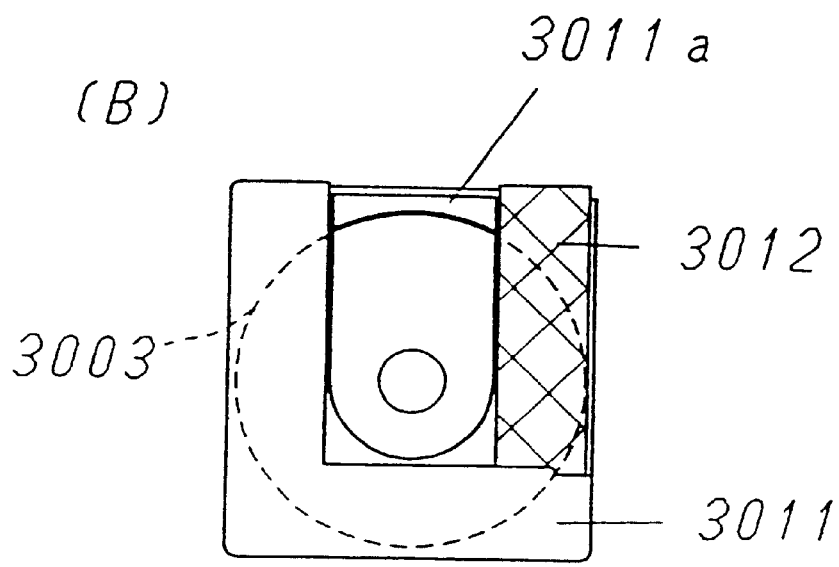
Figure 65:
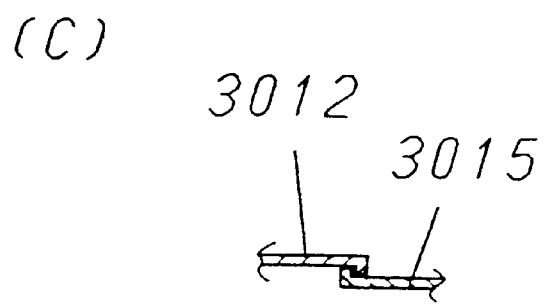
Figure 66:
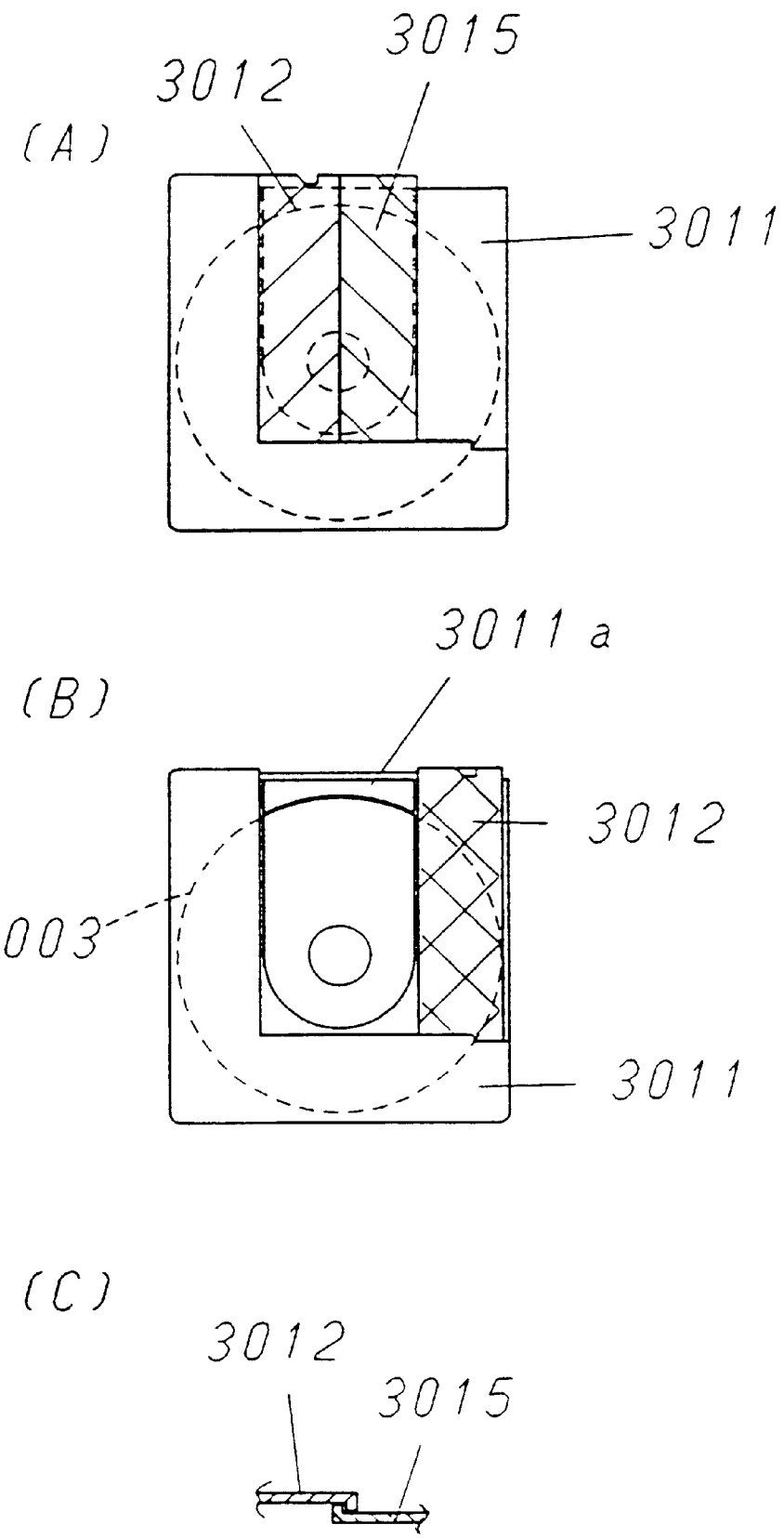
FIG. 66 shows front views illustrating another configuration of the disk cartridge according to the eighth embodiment of the present third invention.

FIGS. 65 and 66 are front views of a disk cartridge of the eighth embodiment according to the present invention. In each figure, (A) shows the same when a shutter is closed and (B) shows the same when the shutter is opened. The shutter is illustrated with hatching so that the position of the shutter is recognized easily as in FIG. 64.

In FIGS. 65 and 66, numerals 3012 and 3015 indicate an upper shutter and a lower shutter, respectively. Each shutter is formed of a thin plate made of metal such as aluminum or the like or a synthetic resin plate. The shutters are slidably maintained by a cartridge body 3011 so as to shield a disk 3003 by being positioned adjacent to each other to cover an opening 3001a completely as shown in FIGS. 65(A) and 66(A) or so as to expose the disk 3003 by moving to the side from the opening 3011a with both the shutters being placed one upon another to uncover the opening 3011a as shown in FIGS. 65(B) and 66(B). Other constructive elements are the same in the seventh embodiment shown in FIG. 64.

The disk cartridge of the present embodiment is different from that of the seventh embodiment shown in FIG. 64 as follows. In the seventh embodiment, the shutter is formed of one shutter 3002 and a part of the shutter 3002 is positioned outside the cartridge body 3001 beyond its outer periphery when the shutter is opened. However, in the present embodiment, the shutter is formed of two shutter members 3012 and 3015 and they are not positioned outside the cartridge body 311 when being opened, which is attained by sliding them in the same direction, positioning them one upon another so that the upper shutter 3012 covers the lower shutter 3015, and placing them between a front end of the opening 3011a in the sliding direction and an outer peripheral end of the cartridge body 3011 that is nearer to the above-mentioned front end (a region where the shutter is positioned after being moved).

The engagement position where the opener and the shutter are engaged with each other is provided to the lower shutter 3015 of the two shutter members in FIG. 65 and to the upper shutter 3012 in FIG. 66. When the engagement position is provided to the lower shutter 3015 (FIG. 65), the upper shutter 3012 requires an accelerating mechanism so as to move more quickly than the lower shutter 3015 with respect to the movement of the opener. However, when the engagement position is provided to the upper shutter 3012 (FIG. 66), the shutters can be operated when the shutters are designed so that the engagement can be maintained even when the upper shutter 3012 is positioned over the lower shutter 3015.

Thus, effects not only that a disk can be accommodated without increasing the width of the cartridge body in the sliding direction, but also that the shutters are not positioned outside the cartridge beyond its outer periphery even when the shutters are opened and the opening is exposed can be obtained.

In FIGS. 65 and 66 showing the present embodiment, the upper shutter 3012 and the lower shutter 3015 are positioned to the left (at a position further to the position where the upper and lower shutters are located one upon another when being opened) and to the right (at a position nearer to the position where the upper and lower shutters are located one upon another when being opened) respectively in the state in which the opening 3011a is covered. However, the positions of the upper and lower shutters are not always limited to this. The upper and lower shutters may be positioned oppositely.

The shutter was formed of two shutter members. However, needless to say, the same effect can be obtained even when three or more shutter members are used.

Furthermore, FIGS. 65(A) and 66(A) show the configuration in which an end of the upper shutter 3012 and an end of the lower shutter 3015 are in contact with each other when the shutter is closed. However, the upper shutter 3012 and the lower shutter 3015 may overlap slightly each other (for example, about 1 mm). Especially, by providing a L-shaped bend (a hook) at respective overlapping parts, as in FIGS. 65(C) and 66(C) showing enlarged cross-sectional views of the shutter on the plane perpendicular to a disk surface and parallel to its sliding direction, the movement of the shutters can be controlled and ingress of dust or the like from the outside can be avoided.

Ninth Embodiment

Figure 67:
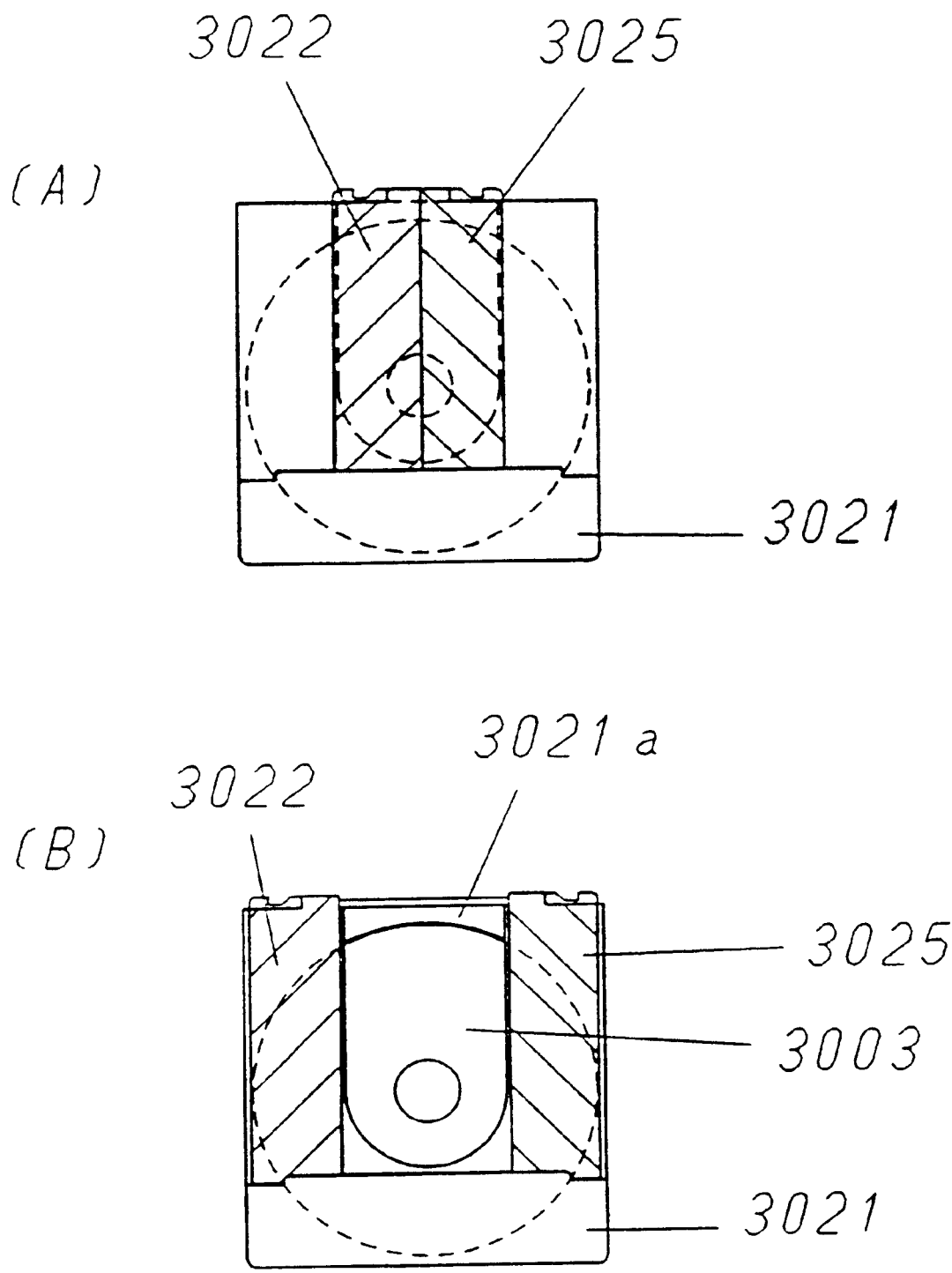
FIG. 67 shows front views illustrating a configuration of a disk cartridge according to a ninth embodiment of the present third invention.

FIG. 67 shows front views of a disk cartridge of a ninth embodiment according to the present invention. FIG. 67(A) shows the same when a shutter is closed and FIG. 67(B) shows the same when the shutter is opened. Similarly, the shutter is illustrated with hatching.

In FIG. 67, numerals 3022 and 3025 indicate a left shutter (a first shutter member) and a right shutter (a second shutter member), respectively. Each shutter is formed of a thin plate made of metal such as aluminum or the like or a synthetic resin plate. The left and right shutters are slidably maintained by a cartridge body 3021 so as to shield a disk 3003 by being positioned adjacent to each other to cover an opening 3021a completely as shown in FIG. 67(A) or so as to expose the disk 3003 by being moved from the opening 3021a to the side to uncover the opening 3021a as shown in FIG. 67(B). Other elements are the same as in the seventh and eighth embodiments shown in FIGS. 64, 65, and 66.

The disk cartridge of the present embodiment is different from that of the eighth embodiment shown in FIGS. 65 and 66 as follows. In the eighth embodiment, the shutter is formed of two upper and lower shutters 3012 and 3015 that are positioned one upon another when being opened. However, in the present embodiments the shutter is formed of the two left and right shutters 3022 and 3025 and they slide in different directions from each other when being opened to be positioned at two positions between ends of the opening 3021a and outer peripheral ends of the cartridge body 3021 respectively, so that the shutters are not positioned outside the cartridge body 3021.

Thus, the effects not only that a disk can be accommodated without increasing the width of the cartridge body in the sliding direction, but also that the shutters are not positioned outside the cartridge beyond its outer peripheral end even when the opening is exposed in the state in which the shutters are opened can be obtained.

The same effects can be obtained even when the present embodiment and the eighth embodiment are combined and, for example, either of the left or right shutter or both the shutters are formed of two upper and lower shutters.

FIG. 67(A) illustrating a state in which the shutter is closed shows a configuration in which an end of the left shutter 3022 and an end of the right shutter 3025 are in contact with each other. However, the both shutters may overlap slightly each other (for example, about 1 mm). Particularly, the movement of each shutter can be controlled and ingress of dust or the like from the outside can be avoided by providing a hook-shaped bend at respective overlapping parts.

As described above, in order to solve the problems in a conventional disk cartridge, the cartridge of the present invention has the configuration in which: for example, when the cartridge is inserted into a disk recording and reproducing unit and the shutters are moved, a part of the shutters is positioned outside the cartridge; the shutter is divided into two parts and the two shutter members are moved to the left and right; and the shutters are moved in one direction but are positioned one upon another after being moved. Therefore, the width of a region where the shutters are positioned after being moved can be decreased, thus decreasing the size of the cartridge itself.

In all the above-mentioned embodiments, an optical disk and a magneto-optical disk on which information is recorded and reproduced by the irradiation of light are illustrated as a disk of a recording medium. However, the recording medium is not always limited to those. Needless to say, the present invention also can be applied to a magnetic disk on which information is recorded and reproduced by the contact with a so-called magnetic head.

Similarly, in all the above-mentioned embodiments, both surfaces of the cartridge body have an opening, which enables double-sided recording and reproducing in optical recording. When information is recorded on and reproduced from only one side, the opening may be provided to only one surface of the cartridge body. Subsequently, the shape of the shutter may be changed from the "U-shape" into an "L-shape" to be simplified. Further, it is not inevitable that the opening is provided so as to reach the center hole of the disk and thus the shutter covers the center hole. For example, the present invention can be applied to a disk cartridge, such as a 3.5-inch floppy disk, in which only a recording surface of a disk used for recording and reproduction is exposed from an opening and is covered by a shutter and a center hole required for rotating the disk is always exposed. In that case, it is better to provide a dustproof means between the vicinity of the center hole that is always exposed and the recording surface that is important for recording as required.

In the seventh, eighth, and ninth embodiments, a return spring for returning a shutter means is provided inside the cartridge body. However, it is not always necessary to provide the spring inside the cartridge body. The sliding movement of the shutter means may be assisted by an opening/closing means (that is referred to as an opener lever in each embodiment) for opening and closing a shutter means of a disk recording and reproducing unit.

As can be noticed from the above description, in the present invention, a cartridge is designed so that it is not required to provide the region where the shutter is positioned after being moved which width is wider than that of the opening, when the shutter of the cartridge is opened by being moved at the time of recording and reproduction. Therefore, an effect that the size of the cartridge body can be decreased according to an accommodated disk size, since it is not necessary to increase the width of the cartridge body in the sliding direction, even in the case where an accommodated disk has a small size, can be obtained.

Each embodiment and example described above aims merely to disclose the technical contents of the present first to third inventions and therefore should not be considered as limiting. The present inventions can be carried out by modifying variously within the range described in claims without departing from the spirit of the present inventions. Therefore, the present inventions should be interpreted broadly.

INDUSTRIAL APPLICABILITY

The present first invention enables information to be recorded on, reproduced and erased from a disk-type recording medium accommodated in a disk cartridge via an adapter in a drive unit designed for a larger disk cartridge than the disk cartridge. In addition, great modification in design of the drive unit is not required. Further, the disc-shaped recording medium can be loaded into the adapter without being touched. Therefore, the present invention enables, for example, recording of information on different disc-shaped recording media according to various standards in a single drive unit. The present invention can be applied extremely widely in an application field of disc-shaped recording media in which various standards coexist.

According to the present second invention, a small and thin double-sided disk cartridge that can be used reversibly can be obtained, thus allowing the size and thickness of a drive unit to be decreased. Therefore, the present invention can be applied suitably, particularly to a disk cartridge for a drive unit that is required to be small and thin.

According to the present third invention, a small disk cartridge whose size is set according to the size of an accommodated disk can be obtained. Therefore, the present third invention can be applied suitably, particularly to a disk cartridge that is required to have a small size, The recording system of a disk to which the present first to third inventions can be applied is not especially limited. The present first to third inventions also can be applied to, for example, disks for an optical recording system, a magneto-optical recording system, a magnetic recording system, or other recording systems. In addition, the present first to third inventions can be applied not only to disks on which information can be recorded but also to disks from which information can be reproduced but on which information cannot be rerecorded, rewritten or overwritten.

What is claimed is:

1. An adapter, for loading a disk from a first-sized disk cartridge to a disk drive unit that is intended to accept a second-sized disk cartridge that is larger than the first-sized disk cartridge, the adapter having a size corresponding to that of the second-sized disk cartridge, the adapter comprising:

an insertion portion, into which or from which the finest-sized disk cartridge can be inserted or ejected;

a first unlocking means for unlocking a first locking means of the first-sized disk cartridge, which fixes and holds an opening/closing cover of the first-sized disk cartridge to a case body of the first-sized disk cartridge, when the disk cartridge is inserted to a predetermined position in the insertion portion;

an opening/closing cover holding means that retains the opening/closing cover of the first-sized disk cartridge in a state in which the first locking means has been unlocked and maintains the opening/closing cover at the predetermined position in the insertion portion after the case body is drawn out from the insertion portion; and a means for releasing the opening/closing cover holding means that releases the opening/closing cover holding means and allows the opening/closing cover to be drawn out from the insertion portion.

2. The adapter according to claim 1,
wherein the opening/closing cover is drawn out together with the case body as one unit by inserting the case body to the predetermined position in the insertion portion, fixing and holding the opening/closing cover to the case body by the first locking means, operating the means for releasing the opening/closing cover holding means, and releasing retention of the opening/closing cover by the opening/closing cover holding means.

3. The adapter according to claim 2,
wherein the adapter has a disk-positioning means for adjusting a position of a disk in its thickness direction so that the disk can be inserted into an opening of the case body that has been inserted into the insertion portion, the disk being accommodated inside the insertion portion together with the opening/closing cover.

4. The adapter according to claim 3,
wherein the disk-positioning means is positioned so as to be movable between the inside and the outside of the insertion portion, a force is provided to the disk-positioning means by a means for providing elasticity so that the disk-positioning means is positioned so as to adjust a position of the disk inside the insertion portion when the case body is not inserted in the insertion portion, and the disk-positioning means comes into contact with the case body and is then moved to the outside of the insertion portion when the case body is inserted into the insertion portion.

5. The adapter according to claim 3,
wherein the disk-positioning means has a first positioning portion that adjusts a position of the disk in its thickness direction so that the disk can be inserted into the opening of the case body and a second positioning portion that adjusts a position of the disk in an allowable range when the disk is used in a disk drive unit.

6. The adapter according to claim 5,
wherein the adapter has a door capable of being opened and closed at an entrance of the insertion portion, and when the door is opened a position of the disk is adjusted by the first positioning portion and when the door is closed a position of the disk is adjusted by the second positioning portion.

7. The adapter according to claim 1,
wherein the opening/closing cover holding means comprises a first opening/closing cover holding means that retains the opening/closing cover in a state in which the first locking means has been unlocked and a second opening/closing cover holding means that maintains the opening/closing cover at the predetermined position in the insertion portion after the case body is drawn out from the insertion portion.

8. The adapter according to claim 7,
wherein the second opening/closing cover holding means comprises an insertion-position maintaining means for holding the opening/closing cover in its insertion direction and a position-in-height maintaining means for maintaining the opening/closing cover in a disk-thickness direction.

9. The adapter according to claim 7,
wherein an operation for unlocking the first locking means by the first unlocking means and an operation for retaining the opening/closing cover by the first opening/closing cover holding means are conducted at the same time.

10. The adapter according to claim 9,
wherein the adapter comprises an operating means for operating the first unlocking means and the first opening/closing cover holding means from the outside of the adapter.

11. The adapter according to claim 7,
wherein the second opening/closing cover holding means can be released by inserting the case body into the insertion portion.

12. The adapter according to claim 1,
wherein the adapter has a door capable of being opened and closed at an entrance of the insertion portion and has a configuration in which the door is not closed when the case body of the disk cartridge is inserted in the insertion portion.

13. The adapter according to claim 12,
wherein the adapter cannot be loaded into a disk drive unit when the door is opened.

14. The adapter according to claim 1,
wherein the adapter has a means for preventing erroneous insertion of the disk cartridge.

15. The adapter according to claim 14,
wherein the means for preventing erroneous insertion is positioned inside the insertion portion and is formed of a convex part formed asymmetrically with respect to a center line of the disk cartridge in its insertion direction.

16. The adapter according to claim 1,
wherein the adapter has a means for locking the means for releasing the opening/closing cover holding means that prevents the means for releasing the opening/closing cover holding means from being operated, and when the case body of the disk cartridge is not inserted into the insertion portion, the means for locking the means for releasing the opening/closing cover holding means prevents the means for releasing the opening/closing cover holding means from being operated.

17. The adapter according to claim 16,
wherein the adapter has a disk-positioning means for adjusting a position-in-thickness direction of a disk accommodated inside the insertion portion together with the opening/closing cover, and a member forming the disk-positioning means forms at least a part of the means for locking the means for releasing the opening/closing cover holding means.

18. The adapter according to claim 1,
wherein at least a part of a disk inserted into the insertion portion can be confirmed from the outside.

19. The adapter according to claim 1,
wherein the adapter has a second unlocking means for unlocking a second locking means, so that the adapter can be adapted to a disk cartridge having the second locking means that prevents the opening/closing cover of the disk cartridge from being separated from the case body after the first locking means is unlocked.

20. The adapter according to claim 1,
wherein the adapter has a third unlocking means for unlocking a third locking means comprising a third locking hole formed in the case body of the disk cartridge and a third locking projection formed in the opening/closing cover so as to engage with the third locking hole at a position where the opening/closing cover closes the opening, so that the adapter can be adapted to a disk cartridge having the third locking means.

21. The adapter according to claim 20, wherein the third unlocking means comprises a convex part formed inside the insertion portion, and when the disk cartridge is inserted to a predetermined position the convex part fits into a concave part formed in the vicinity of the third locking means and on a leading end face of the disk cartridge in its insertion direction, then the case body is elastically deformed, and the engagement between the third locking projection and the third locking hole is released, thus unlocking the third locking means.

22. The adapter according to claim 21, wherein the convex part is formed asymmetrically with respect to a center line of the disk cartridge in its insertion direction.

23. The adapter according to claim 20, wherein the third unlocking means comprises a convex part interconnected with at least a part of the opening/closing cover holding means, and when the disk cartridge is inserted into a predetermined position the convex part is inserted into a concave part interconnected to a movable piece forming a part of wall surfaces of the third locking hole, and then the movable piece is moved to a predetermined position by an operation for retaining the opening/closing cover by the opening/closing cover holding means, thus unlocking the third locking means.

* * * * *

UNITED STATES PATENT AND TRADEMARK OFFICE
CERTIFICATE OF CORRECTION

PATENT NO. : 6,430,147 B1
DATED : August 6, 2002
INVENTOR(S) : Goto et al.

It is certified that error appears in the above-identified patent and that said Letters Patent is hereby corrected as shown below:

<u>Title page,</u>
Item [73], Assignee, "Matushita" should read -- Matsushita --

<u>Column 58,</u>
Lines 49-50, "Finest-sized" should read -- first-sized --

Signed and Sealed this

First Day of June, 2004

JON W. DUDAS
*Acting Director of the United States Patent and Trademark Office*